(12) United States Patent
Aitken et al.

(10) Patent No.: US 11,021,558 B2
(45) Date of Patent: Jun. 1, 2021

(54) POLYMER COMPOSITIONS CONTAINING GRAFTED POLYMERIC NETWORKS AND PROCESSES FOR THEIR PREPARATION AND USE

(71) Applicant: Johnson & Johnson Vision Care, Inc., Jacksonville, FL (US)

(72) Inventors: Brian Aitken, Jacksonville, FL (US); Charles Scales, St. Augustine, FL (US); Scott Joslin, Ponte Vedra Beach, FL (US); Yong Zhang, Jacksonville, FL (US); Dola Sinha, Jacksonville, FL (US); Shivkumar Mahadevan, Jacksonville, FL (US); Patricia Martin, Jacksonville, FL (US); Fang Lu, St. Augustine, FL (US); Donnie Duis, Jacksonville, FL (US); Stephen C. Arnold, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 22 days.

(21) Appl. No.: 15/656,033

(22) Filed: Jul. 21, 2017

(65) Prior Publication Data
US 2018/0037690 A1 Feb. 8, 2018

Related U.S. Application Data

(60) Provisional application No. 62/371,362, filed on Aug. 5, 2016.

(51) Int. Cl.
| | | |
|---|---|---|
| C08F 290/06 | (2006.01) | |
| C08J 7/16 | (2006.01) | |
| C08F 283/12 | (2006.01) | |
| C08L 51/08 | (2006.01) | |
| C09B 69/10 | (2006.01) | |
| G02B 1/04 | (2006.01) | |

(52) U.S. Cl.
CPC ...... *C08F 290/068* (2013.01); *C08F 283/124* (2013.01); *C08J 7/16* (2013.01); *C08L 51/085* (2013.01); *C09B 69/109* (2013.01); *G02B 1/043* (2013.01); *C08L 2201/50* (2013.01); *C08L 2203/02* (2013.01)

(58) Field of Classification Search
CPC .................................................. G02B 1/043
See application file for complete search history.

(56) References Cited

U.S. PATENT DOCUMENTS

| | | |
|---|---|---|
| 3,408,429 A | 10/1968 | Wichterle |
| 3,660,545 A | 5/1972 | Wichterle |
| 3,808,178 A | 4/1974 | Gaylord |
| 4,018,853 A | 4/1977 | Le Boeuf et al. |
| 4,113,224 A | 9/1978 | Clark et al. |
| 4,120,570 A | 10/1978 | Gaylord |
| 4,136,250 A | 1/1979 | Mueller et al. |
| 4,153,641 A | 5/1979 | Deichert et al. |
| 4,190,277 A | 2/1980 | England |
| 4,197,266 A | 4/1980 | Clark et al. |
| 4,680,336 A | 7/1987 | Larsen et al. |
| 4,740,533 A | 4/1988 | Su et al. |
| 4,892,402 A | 1/1990 | Sawamoto et al. |
| 4,910,277 A | 3/1990 | Bambury et al. |
| 5,034,461 A | 7/1991 | Lai et al. |
| 5,039,459 A | 8/1991 | Kindt-Larsen et al. |
| 5,070,215 A | 12/1991 | Bambury et al. |
| 5,244,981 A | 9/1993 | Seidner et al. |
| 5,258,024 A | 11/1993 | Chavel et al. |
| 5,310,779 A | 5/1994 | Lai |

(Continued)

FOREIGN PATENT DOCUMENTS

| | | |
|---|---|---|
| EP | 0080539 B1 | 6/1983 |
| EP | 0632329 A1 | 1/1995 |

(Continued)

OTHER PUBLICATIONS

International Search Report, dated Oct. 30, 2017, for PCT Int'l Appln. No. PCT/US2017/044912.
Corrales et al, Free radical macrophotoinitiators: an overview on recent advances, Journal of Photochemistry and Photobiology A: Chemistry, vol. 159 (2003), pp. 103-114.
De Groot et al, Hydrophilic Polymeric Acylphospine Oxide Photoinitiators/Crosslinkers for in Vivo Blue-Light Photopolymerization, Biomacromolecules, 2001, vol. 2, pp. 1271-1278.
Engel et al, An Aliphatic Bifunctional Free Radical Initiator. Synthese of a Block Copolymer froman Azoperester by Sequential Thermal and Photochemical Initiation, Macromolecules 2003, vol. 36, pp. 3821-3825.

(Continued)

*Primary Examiner* — Michael F Pepitone
(74) *Attorney, Agent, or Firm* — Raef M. Shaltout

(57) ABSTRACT

Provided are polymer compositions made by a process comprising: (a) providing a first reactive composition containing: (i) a polymerization initiator that is capable, upon a first activation, of forming two or more free radical groups, at least one of which is further activatable by subsequent activation; (ii) one or more ethylenically unsaturated compounds; and (iii) a crosslinker; (b) subjecting the first reactive composition to a first activation step such that the first reactive composition polymerizes therein to form a crosslinked substrate network containing a covalently bound activatable free radical initiator, (c) combining the crosslinked substrate network with a second reactive composition containing one or more ethylenically unsaturated compounds; and (d) activating the covalently bound activatable free radical initiator of the crosslinked substrate network such that the second reactive composition polymerizes therein with the crosslinked substrate network to form a grafted polymeric network and a byproduct polymer. Also provided are precursors to the polymer compositions, processes for preparation of the polymer compositions, and methods of using the polymer compositions, for instance in medical devices.

14 Claims, No Drawings

(56) References Cited

U.S. PATENT DOCUMENTS

| | | | |
|---|---|---|---|
| 5,314,960 | A | 5/1994 | Spinelli et al. |
| 5,321,108 | A | 6/1994 | Kunzler et al. |
| 5,331,067 | A | 7/1994 | Seidner et al. |
| 5,371,147 | A | 12/1994 | Spinelli et al. |
| 5,387,662 | A | 2/1995 | Kunzler et al. |
| 5,539,016 | A | 7/1996 | Kunzler et al. |
| 5,726,733 | A | 3/1998 | Lai et al. |
| 5,760,100 | A | 6/1998 | Nicolson et al. |
| 5,944,853 | A | 8/1999 | Molock et al. |
| 5,962,548 | A | 10/1999 | Vanderlaan et al. |
| 5,965,631 | A | 10/1999 | Nicolson et al. |
| 5,998,498 | A | 12/1999 | Vanderlaan et al. |
| 6,020,445 | A | 2/2000 | Vanderlaan et al. |
| 5,849,811 | B1 | 11/2000 | Nicolson et al. |
| 6,367,929 | B1 | 4/2002 | Maiden et al. |
| 6,372,815 | B1 | 4/2002 | Sulc et al. |
| 6,586,038 | B1 | 7/2003 | Chabrecek et al. |
| 6,617,373 | B2 | 9/2003 | Sulc et al. |
| 6,822,016 | B2 | 11/2004 | McCabe et al. |
| 6,867,245 | B2 | 3/2005 | Iwata et al. |
| 6,943,203 | B2 | 9/2005 | Vanderlaan et al. |
| 6,951,894 | B1 | 10/2005 | Nicolson et al. |
| 6,992,118 | B2 | 1/2006 | Sulc et al. |
| 7,052,131 | B2 | 5/2006 | McCabe et al. |
| 7,247,692 | B2 | 7/2007 | Laredo |
| 7,262,232 | B2 | 8/2007 | Sulc et al. |
| 7,396,890 | B2 | 7/2008 | Zanini et al. |
| 7,461,937 | B2 | 12/2008 | Steffen et al. |
| 7,468,398 | B2 | 12/2008 | Nicolson et al. |
| 7,538,146 | B2 | 5/2009 | Nicolson et al. |
| 7,553,880 | B2 | 6/2009 | Nicolson et al. |
| 7,572,841 | B2 | 8/2009 | Chen et al. |
| 7,649,027 | B2 | 1/2010 | Imai |
| 7,666,921 | B2 | 2/2010 | McCabe et al. |
| 7,691,916 | B2 | 4/2010 | McCabe et al. |
| 7,786,185 | B2 | 8/2010 | Rathore et al. |
| 7,825,170 | B2 | 11/2010 | Steffen et al. |
| 7,905,594 | B2 | 3/2011 | Widman et al. |
| 7,915,323 | B2 | 3/2011 | Awasthi et al. |
| 7,994,356 | B2 | 8/2011 | Awasthi et al. |
| 8,022,158 | B2 | 9/2011 | Rathore et al. |
| 8,157,373 | B2 | 4/2012 | Widman et al. |
| 8,163,206 | B2 | 4/2012 | Chang et al. |
| 8,240,849 | B2 | 8/2012 | Widman et al. |
| 8,273,802 | B2 | 9/2012 | Laredo et al. |
| 8,313,828 | B2 | 11/2012 | Widman et al. |
| 8,317,505 | B2 | 11/2012 | Widman et al. |
| 8,318,055 | B2 | 11/2012 | Widman et al. |
| 8,399,538 | B2 | 3/2013 | Steffen et al. |
| 8,415,404 | B2 | 4/2013 | Nicolson et al. |
| 8,415,405 | B2 | 4/2013 | Maggio et al. |
| 8,420,711 | B2 | 4/2013 | Awasthi et al. |
| 8,450,387 | B2 | 5/2013 | McCabe et al. |
| 8,487,058 | B2 | 7/2013 | Liu et al. |
| 8,568,626 | B2 | 10/2013 | Nicolson et al. |
| 8,795,558 | B2 | 8/2014 | Widman et al. |
| 8,883,872 | B2 | 11/2014 | Grüizmacher et al. |
| 8,937,110 | B2 | 1/2015 | Alli et al. |
| 8,937,111 | B2 | 1/2015 | Alli et al. |
| 8,940,812 | B2 | 1/2015 | Reboul et al. |
| 8,980,972 | B2 | 3/2015 | Driver |
| 9,056,878 | B2 | 6/2015 | Fujisawa et al. |
| 9,075,186 | B2 | 7/2015 | Widman et al. |
| 9,120,900 | B2 | 9/2015 | Grutzmacher et al. |
| 9,125,808 | B2 | 9/2015 | Alli et al. |
| 9,140,825 | B2 | 9/2015 | Alli et al. |
| 9,156,934 | B2 | 10/2015 | Alli et al. |
| 9,170,349 | B2 | 10/2015 | Mahadevan et al. |
| 9,180,633 | B2 | 11/2015 | Widman et al. |
| 9,180,634 | B2 | 11/2015 | Widman et al. |
| 9,217,813 | B2 | 12/2015 | Liu et al. |
| 9,244,196 | B2 | 1/2016 | Scales et al. |
| 9,244,197 | B2 | 1/2016 | Alli et al. |
| 9,260,544 | B2 | 2/2016 | Rathore et al. |
| 9,297,928 | B2 | 3/2016 | Molock et al. |
| 9,297,929 | B2 | 3/2016 | Scales et al. |
| 9,417,464 | B2 | 8/2016 | Wildsmith et al. |
| 9,610,742 | B2 | 4/2017 | Widman et al. |
| 9,857,607 | B2 | 1/2018 | Widman et al. |
| 9,927,633 | B2 | 3/2018 | Franklin et al. |
| 2002/0016383 | A1 | 2/2002 | Iwata et al. |
| 2003/0162862 | A1 | 8/2003 | McCabe et al. |
| 2006/0142410 | A1* | 6/2006 | Baba .............. C08F 290/068 523/106 |
| 2010/0120939 | A1 | 5/2010 | Phelan |
| 2012/0142805 | A1* | 6/2012 | Grutzmacher ............ C08F 8/40 522/26 |
| 2013/0176529 | A1* | 7/2013 | Li ................... G02B 1/043 351/159.33 |
| 2015/0146159 | A1 | 5/2015 | Archer et al. |

FOREIGN PATENT DOCUMENTS

| | | | | |
|---|---|---|---|---|
| EP | 1286823 | B1 | 6/2009 | |
| RU | 1500316 | A1 | 8/1989 | |
| RU | 1789208 | A1 | 1/1993 | |
| WO | 9631792 | A1 | 10/1996 | |
| WO | 1999029750 | A1 | 6/1999 | |
| WO | 2000002937 | A1 | 1/2000 | |
| WO | 2001030512 | A2 | 5/2001 | |
| WO | 2001078971 | A1 | 10/2001 | |
| WO | 2003022321 | A2 | 3/2003 | |
| WO | 2003022322 | A2 | 3/2003 | |
| WO | 2004063795 | A1 | 7/2004 | |
| WO | 2008003601 | A1 | 1/2008 | |
| WO | WO-2008003601 | A1 * | 1/2008 | .............. C08F 2/22 |
| WO | 2009026659 | A1 | 3/2009 | |
| WO | 2010121387 | A1 | 10/2010 | |
| WO | 2015038577 | A1 | 3/2015 | |
| WO | 2018026822 | A1 | 2/2018 | |

OTHER PUBLICATIONS

Gunersel et al, Bisacylphosphine Oxides as bifunctional Photoinitiators for block copolymer synthesis, Die Angewandte Makromolekulare Chemie, vol. 264 Nr. 4604, (1999), pp. 88-91.

ISO 18369-4:2006: Ophthalmic optics—Contact lenses—Part 4: Physicochemical properties of contact lens materials.

ISO 9913-1: 1996: Optics and optical instruments—Contact Lenses—Part 1: Determination of oxygen permeability and transmissibility by the FATT method.

Jockusch et al, A Steady-State and Picosecond Pump-Probe Investigation of the Photophysics of an Acyl and a Bis (acyl)phosphine Oxide, J. Am. Chem. Soc., vol. 119, No. 47, 1997, pp. 11495-11501.

Jockusch et al, Phosphinoyl Radicals: Structure and Reactivity, A Laser Flash Photolysis and Time-Resolved ESR Investigation, J. Am. Chem. Soc., vol. 120, No. 45, 1998, pp. 11773-11777.

Sitzmann, Critical photoinitiators for UV-LED Curing: Enabling 3D Printing, Inks and Coatings, BASF, Redondo Beach, CA, Mar. 10, 2015.

Waters et al, Structure and Mechanism of Strength Enhancement in Interpenetrating Polymer Network Hydrogels, Macromolecules 2011, vol. 44, pp. 5776-5787.

International Search Report, dated Jul. 17, 2019, for PCT Int'l Appln. No. PCT/IB2019/050427.

International Search Report, dated Jul. 17, 2019, for PCT Int'l Appln. No. PCT/IB2019/050428.

Kolczak, et al, "Reaction Mechanism of Moacyl- and Bisacylphosphine Oxide Photoinitiators Studied by 31P-, 13C-, and 1H-CIDNP and ESR" in J. Am. Chem. Soc., 1996, 118, pp. 6477-6489.

Helios-Quartz UV Lamps information sheet.

Lima et al, Increased rates of photopolymerisation by ternary type II photoinitiator systems in dental resins, Journal of the Mechanical Behavior of Biomedical Materials, (2019) vol. 96, pp. 71-78.

Ruhland et al, Quantification and elucidation of the UV-light triggered initiation kinetics of TOP and BAPO in liquid acrylate monomer, Journal of Applied Polymer Science, (2019) Wileyonlinelibrary.com/App, DOI: 10.1002/APP.48357.

(56) References Cited

OTHER PUBLICATIONS

International Preliminary Report on Patentability, dated Aug. 4, 2020, for PCT Int'l Appln. No. PCT/IB2019/050427.
International Preliminary Report on Patentability, dated Aug. 4, 2020, for PCT Int'l Appln. No. PCT/IB2019/050428.
International Preliminary Report on Patentability, dated Feb. 5, 2019, for PCT Int'l Appln. No. PCT/US2017/044912.

* cited by examiner

POLYMER COMPOSITIONS CONTAINING GRAFTED POLYMERIC NETWORKS AND PROCESSES FOR THEIR PREPARATION AND USE

RELATED APPLICATIONS

This application claims priority to U.S. Provisional Patent Application No. 62/371,362, filed Aug. 5, 2016, which is incorporated herein by reference in its entirety.

FIELD OF THE INVENTION

The invention relates to polymer compositions that contain grafted polymeric networks and processes for preparing the polymer compositions. The invention also relates to precursors of the polymer compositions, processes for preparing the precursors, as well as methods of using the polymer compositions, for instance in medical devices.

BACKGROUND OF THE INVENTION

The development of polymer materials prepared from individual components that contribute desirable properties is an ongoing goal in many product areas. For instance, polymer materials displaying oxygen permeability and hydrophilicity are desirable for a number of applications within the medical devices area, such as in contact lenses.

A commonly encountered challenge when forming polymeric materials that attempt to combine properties is that, in many cases, the individual components from which the final material is made are not readily compatible with each other. For instance, in the contact lens field, silicone hydrogels have been found to provide lenses with significantly increased oxygen permeability and therefore are capable of reducing corneal edema and hyper-vasculature, conditions that may sometimes be associated with conventional hydrogel lenses. Silicone hydrogels have typically been prepared by polymerizing mixtures containing at least one silicone-containing monomer or reactive macromer and at least one hydrophilic monomer. However, silicone hydrogel lenses can be difficult to produce because the silicone components and the hydrophilic components are often incompatible.

New technologies for creating polymer materials, including where the components are otherwise incompatible, are desirable in many fields, including medical devices.

SUMMARY OF THE INVENTION

We have now found that processes as described herein are capable of providing new compositions derived from a wide variety of component monomers and polymers, including where such component monomers and polymers are generally incompatible. Such processes, and the resultant compositions, find use in various applications, for instance in the medical device field, such as ophthalmic devices and contact lenses.

In one aspect, therefore, the invention provides a polymer composition. The polymer composition is formed by a process comprising:

(a) providing a first reactive composition containing: (i) a polymerization initiator that is capable, upon a first activation, of forming two or more free radical groups, at least one of which is further activatable by subsequent activation; (ii) one or more ethylenically unsaturated compounds; and (iii) a crosslinker;

(b) subjecting the first reactive composition to a first activation step such that the first reactive composition polymerizes therein to form a crosslinked substrate network containing a covalently bound activatable free radical initiator;

(c) combining the crosslinked substrate network with a second reactive composition containing one or more ethylenically unsaturated compounds; and (d) activating the covalently bound activatable free radical initiator of the crosslinked substrate network such that the second reactive composition polymerizes therein with the crosslinked substrate network to form a grafted polymeric network and a byproduct polymer.

In a further aspect, the invention provides a process for making the polymer composition.

In a yet further aspect, the invention provides a medical device comprising a polymer composition as described herein.

In a still further aspect, the invention provides an ophthalmic device, such as a contact lens, comprising a polymer composition as described herein.

In still another aspect, the invention provides a crosslinked substrate network containing a covalently bound activatable free radical initiator and that is a useful precursor for making the polymer compositions described herein. The crosslinked substrate network may be formed by a process comprising:

(a) providing a first reactive composition containing: (i) a polymerization initiator that is capable, upon a first activation, of forming two or more free radical groups, at least one of which is further activatable by subsequent activation; (ii) one or more ethylenically unsaturated compounds; and (iii) a crosslinker; and (b) subjecting the first reactive composition to a first activation step such that the first reactive composition polymerizes therein to form a crosslinked substrate network containing a covalently bound activatable free radical initiator.

In a further aspect, the invention provides a process for making a crosslinked substrate network.

DETAILED DESCRIPTION OF THE INVENTION

Unless defined otherwise, all technical and scientific terms used herein have the same meaning as commonly understood by one of ordinary skill in the art to which the invention belongs. All publications, patent applications, patents, and other references mentioned herein are incorporated by reference.

Unless otherwise indicated, numeric ranges, for instance as in "from 2 to 10" or as in "between 2 and 10" are inclusive of the numbers defining the range (e.g., 2 and 10).

Unless otherwise indicated, ratios, percentages, parts, and the like are by weight.

The phrase "number average molecular weight" refers to the number average molecular weight ($M_n$) of a sample; the phrase "weight average molecular weight" refers to the weight average molecular weight ($M_w$) of a sample; the phrase "polydispersity index" (PDI) refers to the ratio of $M_w$ divided by $M_n$ and describes the molecular weight distribution of a sample. If the type of "molecular weight" is not indicated or is not apparent from the context, then it is intended to refer to number average molecular weight.

As used herein, the term "about" refers to a range of +/−10 percent of the number that is being modified. For example, the phrase "about 10" would include both 9 and 11.

As used herein, the term "(meth)" designates optional methyl substitution. Thus, a term such as "(meth)acrylate" denotes both methacrylate and acrylate.

Wherever chemical structures are given, it should be appreciated that alternatives disclosed for the substituents on the structure may be combined in any combination. Thus, if a structure contained substituents R* and R**, each of which contained three lists of potential groups, 9 combinations are disclosed. The same applies for combinations of properties.

The average number of repeating units in a polymer sample is known as its "degree of polymerization." When a generic chemical formula of a polymer sample, such as [***]n is used, "n" refers to its degree of polymerization, and the formula shall be interpreted to represent the number average molecular weight of the polymer sample.

As used herein, the term "individual" includes humans and vertebrates.

As used herein, the term "medical device" refers to any article that is designed to be used while either in or on mammalian tissues or fluids, and preferably in or on human tissue or fluids. Examples of these devices include but are not limited to wound dressings, sealants, tissue fillers, drug delivery systems, coatings, adhesion prevention barriers, catheters, implants, stents, and ophthalmic devices such as intraocular lenses, corneal inlays, and contact lenses. The medical devices may be ophthalmic devices, preferably contact lenses.

As used herein, the term "ophthalmic device" refers to any device which resides in or on the eye or any part of the eye, including the ocular surface. These devices can provide optical correction, cosmetic enhancement, vision enhancement, therapeutic benefit (for example as bandages) or delivery of active components such as pharmaceutical and nutraceutical components, or a combination of any of the foregoing. Examples of ophthalmic devices include but are not limited to lenses, optical and ocular inserts, including but not limited to punctal plugs, and the like. "Lenses" include soft contact lenses, hard contact lenses, hybrid contact lenses, intraocular lenses, and inlay and overlay lenses. The ophthalmic device preferably may comprise a contact lens.

As used herein, the term "contact lens" refers to an ophthalmic device that can be placed on the cornea of an individual's eye. The contact lens may provide corrective, cosmetic, or therapeutic benefit, including wound healing, the delivery of drugs or nutraceuticals, diagnostic evaluation or monitoring, ultraviolet light blocking, visible light or glare reduction, or any combination thereof. A contact lens can be of any appropriate material known in the art and can be a soft lens, a hard lens, or a hybrid lens containing at least two distinct portions with different physical, mechanical, or optical properties, such as modulus, water content, light transmission, or combinations thereof.

The medical devices, ophthalmic devices, and lenses of the invention may be comprised of silicone hydrogels. These silicone hydrogels typically contain at least one hydrophilic monomer and at least one silicone-containing component that are covalently bound to one another in the cured device. The medical devices, ophthalmic devices, and lenses of the invention may also be comprised of conventional hydrogels, or combination of conventional and silicone hydrogels.

A "macromolecule" is an organic compound having a number average molecular weight of greater than 1500, and may be reactive or non-reactive.

As used herein, the "target macromolecule" is the intended macromolecule being synthesized from the reactive composition comprising monomers, macromers, prepolymers, cross-linkers, initiators, additives, diluents, and the like.

As used herein, a "monomer" is a mono-functional molecule which can undergo chain growth polymerization, and in particular, free radical polymerization, thereby creating a repeating unit in the chemical structure of the target macromolecule. Some monomers have di-functional impurities that can act as cross-linking agents. A "hydrophilic monomer" is also a monomer which yields a clear single phase solution when mixed with deionized water at 25° C. at a concentration of 5 weight percent. A "hydrophilic component" is a monomer, macromer, prepolymer, initiator, cross-linker, additive, or polymer which yields a clear single phase solution when mixed with deionized water at 25° C. at a concentration of 5 weight percent.

As used herein, a "macromonomer" or "macromer" is a linear or branched macromolecule having at least one reactive group that can undergo chain growth polymerization, and in particular, free radical polymerization.

As used herein, the term "polymerizable" means that the compound comprises at least one reactive group which can undergo chain growth polymerization, and in particular, free radical polymerization. Thus, "reactive group" refers to a free radical reactive group, non-limiting examples of which include, without limitation, (meth)acrylates, (meth)acrylamides, styrenes, vinyls, vinyl ethers, N-vinyllactams, N-vinylamides, O-vinylcarbamates, O-vinylcarbonates, O-vinylethers, and other vinyl groups. In one embodiment, the free radical reactive groups comprise acrylate, methacrylate, acrylamide, methacrylamide, N-vinyl lactam, N-vinylamide, styryl functional groups, and mixtures thereof. In contrast, the term "non-polymerizable" means that the compound does not comprise such a free radical reactive group.

Examples of the foregoing include substituted or unsubstituted $C_{1-6}$alkyl(meth)acrylates, $C_{1-6}$alkyl(meth)acrylamides, $C_{2-12}$alkenyls, $C_{2-12}$alkenylphenyls, $C_{2-12}$alkenylnaphthyls, $C_{2-6}$alkenylphenyl$C_{1-6}$alkyls, where suitable substituents on said $C_{1-6}$ alkyls include ethers, hydroxyls, carboxyls, halogens and combinations thereof.

Any type of free radical polymerization may be used including but not limited to bulk, solution, suspension, and emulsion as well as any of the controlled radical polymerization methods such as stable free radical polymerization, nitroxide-mediated living polymerization, atom transfer radical polymerization, reversible addition fragmentation chain transfer polymerization, organotellurium mediated living radical polymerization, and the like.

An "ethylenically unsaturated compound" is a monomer, macromer, or prepolymer that contains at least one reactive group. An ethylenically unsaturated compound may preferably consist of one reactive group.

As used herein, a "silicone-containing component" or "silicone component" is a monomer, macromer, prepolymer, cross-linker, initiator, additive, or polymer in the reactive composition with at least one silicon-oxygen bond, typically in the form of siloxy groups, siloxane groups, carbosiloxane groups, and mixtures thereof. Examples of silicone-containing components which are useful in this invention may be found in U.S. Pat. Nos. 3,808,178, 4,120,570, 4,136,250, 4,153,641, 4,740,533, 5,034,461, 5,070,215, 5,244,981, 5,314,960, 5,331,067, 5,371,147, 5,760,100, 5,849,811, 5,962,548, 5,965,631, 5,998,498, 6,367,929, 6,822,016, 6,943,203, 6,951,894, 7,052,131, 7,247,692, 7,396,890, 7,461,937, 7,468,398, 7,538,146, 7,553,880, 7,572,841, 7,666,921, 7,691,916, 7,786,185, 7,825,170, 7,915,323, 7,994,356, 8,022,158, 8,163,206, 8,273,802, 8,399,538, 8,415,404, 8,420,711, 8,450,387, 8,487,058, 8,568,626, 8,937,110, 8,937,111, 8,940,812, 8,980,972, 9,056,878, 9,125,808, 9,140,825, 9,156,934, 9,170,349, 9,217,813, 9,244,196, 9,244,197, 9,260,544, 9,297,928, 9,297,929, and European Patent No. 080539. These patents are hereby incorporated by reference in their entireties.

A "polymer" is a target macromolecule composed of the repeating units of the monomers and macromers used during polymerization.

A "homopolymer" is a polymer made from one monomer; a "copolymer" is a polymer made from two or more monomers; a "terpolymer" is a polymer made from three monomers. A "block copolymer" is composed of compositionally different blocks or segments. Diblock copolymers have two blocks. Triblock copolymers have three blocks. "Comb or graft copolymers" are made from at least one macromer.

A "repeating unit" is the smallest group of atoms in a polymer that corresponds to the polymerization of a specific monomer or macromer.

An "initiator" is a molecule that can decompose into free radical groups which can react with a monomer to initiate a free radical polymerization reaction. A thermal initiator decomposes at a certain rate depending on the temperature; typical examples are azo compounds such as 1,1'-azobisisobutyronitrile and 4,4'-aobis(4-cyanovaleric acid), peroxides such as benzoyl peroxide, tert-butyl peroxide, tert-butyl hydroperoxide, tert-butyl peroxybenzoate, dicumyl peroxide, and lauroyl peroxide, peracids such as peracetic acid and potassium persulfate as well as various redox systems. A photo-initiator decomposes by a photochemical process; typical examples are derivatives of benzil, benzoin, acetophenone, benzophenone, camphorquinone, and mixtures thereof as well as various monoacyl and bisacyl phosphine oxides and combinations thereof.

A "free radical group" is a molecule that has an unpaired valence electron which can react with a reactive group to initiate a free radical polymerization reaction.

A "cross-linking agent" or "crosslinker" is a di-functional or multi-functional monomer which can undergo free radical polymerization at two or more locations on the molecule, thereby creating branch points and a polymeric network. The two or more polymerizable functionalities on the crosslinker may be the same or different and may, for instance, be independently selected from vinyl groups (including allyl), (meth)acrylate groups, and (meth)acrylamide groups. Common examples are ethylene glycol dimethacrylate, tetraethylene glycol dimethacrylate, trimethylolpropane trimethacrylate, methylene bisacrylamide, triallyl cyanurate, and the like.

A "prepolymer" is a reaction product of monomers (or macromers) which contains remaining reactive groups capable of undergoing further reaction to form a polymer.

A "polymeric network" is a type of polymer that is in the form of a cross-linked macromolecule. Generally, a polymeric network may swell but cannot dissolve in solvents. For instance, the crosslinked substrate network of the invention is a material that is swellable, without dissolving.

"Hydrogels" are polymeric networks that swell in water or aqueous solutions, typically absorbing at least 10 weight percent water (at 25° C.). "Silicone hydrogels" are hydrogels that are made from at least one silicone-containing component with at least one hydrophilic component. Hydrophilic components may also include non-reactive polymers.

"Conventional hydrogels" refer to polymeric networks made from monomers without any siloxy, siloxane or carbosiloxane groups. Conventional hydrogels are prepared from reactive compositions predominantly containing hydrophilic monomers, such as 2-hydroxyethyl methacrylate ("HEMA"), N-vinyl pyrrolidone ("NVP"), N, N-dimethylacrylamide ("DMA") or vinyl acetate.

As used herein, the term "reactive composition" refers to a composition containing one or more reactive components (and optionally non-reactive components) which are mixed (when more than one is present) together and, when subjected to polymerization conditions, form polymer compositions. If more than one component is present, the reactive composition may also be referred to herein as a "reactive mixture" or a "reactive monomer mixture" (or RMM).

The reactive composition comprises reactive components such as the monomers, macromers, prepolymers, crosslinkers, and initiators, and optional additives such as wetting agents, release agents, dyes, light absorbing compounds such as UV-VIS absorbers, pigments, dyes and photochromic compounds, any of which may be reactive or non-reactive but are preferably capable of being retained within the resulting polymer composition, as well as pharmaceutical and nutraceutical compounds, and any diluents. It will be appreciated that a wide range of additives may be added based upon the final product which is made and its intended use. Concentrations of components of the reactive composition are expressed as weight percentages of all components in the reaction composition, excluding diluent. When diluents are used, their concentrations are expressed as weight percentages based upon the amount of all components in the reaction composition and the diluent.

"Reactive components" are the components in the reactive composition which become part of the chemical structure of the resulting material by covalent bonding, hydrogen bonding, electrostatic interactions, the formation of interpenetrating polymeric networks, or any other means.

As used herein, the term "silicone hydrogel contact lens" refers to a contact lens comprising at least one silicone hydrogel. Silicone hydrogel contact lenses generally have increased oxygen permeability compared to conventional hydrogels. Silicone hydrogel contact lenses use both their water and polymer content to transmit oxygen to the eye.

As noted above, in one aspect, the invention provides a polymer composition formed by a process comprising:

(a) providing a first reactive composition containing: (i) a polymerization initiator that is capable, upon a first activation, of forming two or more free radical groups, at least one of which is further activatable by subsequent activation; (ii) one or more ethylenically unsaturated compounds; and (iii) a crosslinker;

(b) subjecting the first reactive composition to a first activation step such that the first reactive composition polymerizes therein to form a crosslinked substrate network containing a covalently bound activatable free radical initiator;

(c) combining the crosslinked substrate network with a second reactive composition containing one or more ethylenically unsaturated compounds; and (d) activating the covalently bound activatable free radical initiator of the crosslinked substrate network such that the second reactive composition polymerizes therein with the crosslinked substrate network to form a grafted polymeric network and a byproduct polymer.

The polymerization initiator may be any composition with the ability to generate free radical groups in two or more separate activation steps. There is no particular requirement in the invention with respect to what type of polymerization initiator is used or the mechanism of activation, as long as the first activation and the second activation can be conducted sequentially. Thus, suitable polymerization initiators may, for example, be activated thermally, by visible light, by ultraviolet light, via electron beam irradiation, by gamma ray irradiation, or combinations thereof. Examples of polymerization initiators for use in the invention include, without limitation, bisacylphosphine oxides ("BAPO"), bis (acyl)phosphane oxides (e.g., bis(mesitoyl)phosphinic acid), azo compounds, peroxides, alpha-hydroxy ketones, alpha-alkoxy ketones, 1, 2-diketones, germanium based compounds (such as bis(4-methoxybenzoyl)diethylgermanium), or combinations thereof.

BAPO initiators are preferred. Examples of suitable BAPO initiators include, without limitation, compounds having the chemical structure of formula I:

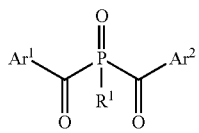

Formula I wherein $Ar^1$ and $Ar^2$ are independently substituted or unsubstituted aryl groups, typically substituted phenyl groups, wherein the substituents are linear, branched, or cyclic alkyl groups, such as methyl groups, linear, branched, or cyclic alkoxy groups, such as methoxy groups, and halogen atoms; preferably $Ar^1$ and $Ar^2$ have identical chemical structures; and wherein $R^1$ is a linear, branched, or cyclic alkyl group having from 1 to 10 carbon atoms, or $R^1$ is a phenyl group, a hydroxyl group, or an alkoxy group having from 1 to 10 carbon atoms.

It should be noted that polymerization initiators that are activatable by different types of energy for the initial and subsequent activations may be used. For instance, materials that undergo a first thermal activation and a second activation via irradiation are within the scope of the invention. Examples of such mixed activation materials include compounds of formulae A-D:

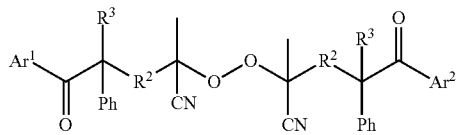

Formula A

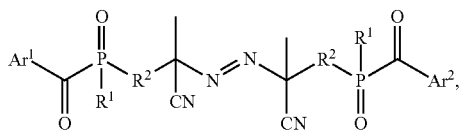

Formula B

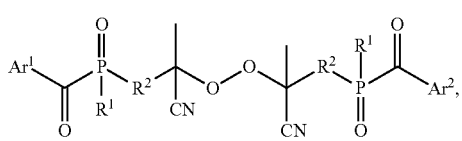

Formula C

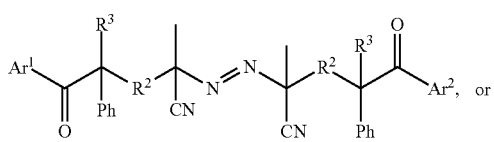, or

Formula D wherein $Ar^1$ and $Ar^2$ are independently substituted or unsubstituted aryl groups, typically substituted phenyl groups, wherein the substituents are linear, branched, or cyclic alkyl groups, such as methyl groups, linear, branched, or cyclic alkoxy groups, such as methoxy groups, and halogen atoms; preferably $Ar^1$ and $Ar^2$ have identical chemical structures; and wherein $R^1$ is a linear, branched, or cyclic alkyl group having from 1 to 10 carbon atoms; wherein $R^2$ is difunctional methylene linking group that may further comprise ether, ketone, or ester groups along the methylene chain having from 1 to 10 carbon atoms; and $R^3$ is a hydrogen atom, a hydroxyl group, or a linear, branched, or cyclic alkoxy group having from 1 to 10 carbon atoms. A further example is tert-butyl 7-methyl-7-(tert-butylazo)peroxyoctanoate.

Furthermore, diazo compounds, diperoxy compounds, or azo-peroxy compounds that exhibit two distinct decomposition temperatures may be used in the prevent invention.

Preferably, the polymerization initiator is a photopolymerization initiator, preferably a bisacylphosphine oxide. Bisacylphosphine oxides are desirable because they can undergo sequential activations steps at different wavelengths and are therefore simple to use. At the longer wavelength, bisacylphosphine oxides can form two free radical groups, one of which is a monoacylphosphine oxide. The monacylphosphine oxide (MAPO) can then undergo a second activation, typically at a shorter wavelength. A particularly preferred bisacylphosphine oxide is bis(2,4,6-trimethylbenzoyl) phenylphosphine oxide, for which the longer wavelength is typically above 420 nm (e.g., 435 nm and above) and the shorter wavelength is typically 420 nm and below. It may be preferable to use an LED or equivalent light in which the bandwidths are relatively narrow as the radiation source, thereby allowing initial irradiation while preserving some or most of the MAPO groups in the crosslinked substrate network.

Other exemplary bisacylphosphine oxide compounds that may be used include bis-(2,6-dimethoxybenzoyl)-2,4,4-trimethylpenthylphosphine oxide, bis(2,4,6-trimethylbenzoyl)-2,4,4-trimethylpenthylphosphine oxide, or bis(2,4,6-trimethylbenzoyl)phosphinic acid or salt thereof.

In the invention, the first reactive composition, which contains the polymerization initiator, one or more ethylenically unsaturated compounds, and a crosslinker, is subjected to a first activation step under conditions that cause the polymerization initiator to undergo its initial activation. For example, if the polymerization initiator is a BAPO, the first reactive composition may be irradiated at 435 nm or above using an appropriate light source. The first reactive composition consequently polymerizes to form a crosslinked substrate network. The crosslinked substrate network contains the residue of the polymerization initiator as a covalently bound activatable free radical initiator.

The activation and polymerization of the first reactive composition may be carried out using techniques known to those skilled in the art. For example, the reactive components of the first reactive composition may be mixed in a vessel. A diluent may optionally be used to facilitate the mixing. The mixture may be filtered, degassed, and heated to a desired temperature and then irradiated under conditions to cause a first activation of the polymerization initiator and consequent formation of the crosslinked substrate network. The vessel for the polymerization may be a mold, for instance where it is desired for the product to have a specific shape.

According to the invention, the crosslinked substrate network described above is combined with a second reactive composition, containing one or more ethylenically unsaturated compounds. The crosslinked substrate network is a swellable material and therefore absorbs some reactive components for the subsequent grafting reaction. Absorption into the crosslinked substrate network may be carried out in various ways. For instance, the crosslinked substrate network may be placed in the second reactive composition and allowed to swell. Or the crosslinked substrate network may be first swollen in a solvent and then combined with the second reactive composition, e.g., by suspending the pre-swollen crosslinked substrate network in the second reactive composition, during which the reactive components partition into the crosslinked substrate network by molecular diffusion and fluid exchange prior. There is no particular minimum amount of reactive components that should absorb into the crosslinked substrate network as long as some is present (greater than 0 weight percent of reactive components). In some embodiments, it may be preferable for the crosslinked substrate network to be swellable in the second reactive composition by at least 0.0001 weight percent, alternatively at least 0.01 weight percent, alternatively at least 0.1 weight percent, alternatively at least 5 weight percent, alternatively at least 10 weight percent, or alternatively at least 25 weight percent, at 25° C., relative to its dry weight.

Following the mixing of the crosslinked substrate network with the second reactive composition, the activatable free radical initiator of the crosslinked substrate network is activated. For example, if the polymerization initiator used in step (a) of the process is a BAPO, then the free radical initiator covalently bound to the crosslinked substrate network (in this example, a monoacylphosphine oxide) may be activated by irradiation at 420 nm or below using an appropriate light source. The second reactive composition then undergoes polymerization, and covalently grafts with the crosslinked substrate network via the free radical initiator in the substrate. The product is thus a grafted polymeric network.

It should be noted that the free radical initiator covalently bound to the crosslinked substrate network forms two free radical groups when activated, one of which may not be covalently bound to the substrate. Consequently, some of the reactive components in the second reactive composition may polymerize via the unbound free radical group to form a polymer that is not covalently bound with the network. Such polymer is referred to herein as a "byproduct polymer." This byproduct polymer may be induced to covalently bind with the grafted polymeric network by inclusion of a crosslinking agent in the second reactive composition. The composition may contain at least a portion of the byproduct polymer that is not covalently bound to the grafted polymeric network. To achieve this, the polymerization of the second reactive composition is conducted in the substantial absence of a crosslinker. By "substantial absence of a crosslinker" is meant that any crosslinker used in the second reactive composition is present in less than a stoichiometric amount. In some embodiments, no crosslinker is present in the second reactive composition.

The activation and polymerization of the second reactive composition and the crosslinked substrate network may, for example, be carried out by mixing the reactive components and the substrate in a vessel. A diluent may optionally be used to facilitate the mixing and to help swell the substrate (e.g., if it is not already swollen or hydrated). The mixture may be degassed, heated, equilibrated, and irradiated under conditions to cause activation of the covalently bound activatable free radical initiator.

The first and second reactive compositions of the invention contain ethylenically unsaturated compounds as reactive components. The ethylenically unsaturated compounds undergo polymerization to form the polymer compositions described herein. As will be appreciated, a wide variety of ethylenically unsaturated compounds may be used in the invention.

The ethylenically unsaturated compounds may be the same or different between the first reactive composition and the second reactive composition, although in some embodiments, it is preferable that at least some of the ethylenically unsaturated compounds in each composition are different. By using materials for the first reactive composition that are different from the second reactive composition, it becomes possible to design interpenetrating networks and graft articles that combine desirable properties from materials that may otherwise not be readily compatible. This is one of the advantages of the invention.

The ethylenically unsaturated compound for inclusion in the first reactive composition and/or the second reactive composition may comprise an independently selected silicone-containing component.

The silicone-containing component may be a monomer or macromer and may comprise at least one reactive group and at least one siloxane group. The silicone-containing components may have at least four repeating siloxane units, which may be any of the groups defined below.

The silicone-containing component may also contain at least one fluorine atom. The silicone-containing component may be selected from the polydisubstituted siloxane macromer of Formula II,

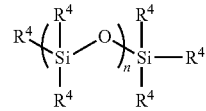

Formula II wherein at least one $R^4$ is a reactive group, and the remaining $R^4$ are independently selected from reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; fluoroalkyl alkyl or aryl groups; partially fluorinated alkyl or aryl groups; halogens; linear, branched or cyclic alkoxy or aryloxy groups; linear or branched polyethyleneoxyalkyl groups, polypropyleneoxyalkyl groups, or poly(ethyleneoxy-co-propyleneoxyalkyl groups; and monovalent siloxane chains comprising between 1-100 siloxane repeat units which may further comprise functionality selected from alkyl, alkoxy, hydroxy, amino, oxa, carboxy, alkyl carboxy, alkoxy, amido, carbamate, halogen or combinations thereof;

wherein n is 0 to 500 or 0 to 200, or 0 to 100, or 0 to 20, where it is understood that when n is other than 0, n is a distribution having a mode equal to a stated value.

In Formula II from one to three $R^4$ may comprise reactive groups. Suitable monovalent alkyl and aryl groups include unsubstituted and substituted monovalent linear, branched or cyclic $C_1$ to $C_{16}$ alkyl groups, or unsubstituted monovalent $C_1$ to $C_6$ alkyl groups, such as substituted and unsubstituted methyl, ethyl, propyl, butyl; substituted or unsubstituted $C_6$-$C_{14}$ aryl groups, or a substituted or un-substituted $C_6$ aryl group, wherein the substituents include amido, ether, amino, halo, hydroxyl, carboxyl, carbonyl groups; or a phenyl or benzyl group, combinations thereof and the like.

When one $R^4$ is a reactive group, the silicone containing compounds may be selected from the polydisubstituted siloxane macromer of Formulae IIIa or IIIb; the styryl polydisubstituted siloxane macromer of Formula IVa or IVb or the carbosilane of Formula IVc:

segment $(OCH_2)_k$ and k is a whole number from one to three, or wherein $R^7$ may be a mixture of alkylene and oxyalkylene segments and the sum of r and k is between 1 and 9; wherein each $R^8$ and $R^9$ are independently a linear, branched, or cyclic alkyl group containing between one and six carbon atoms, a linear, branched, or cyclic alkoxy group containing between one and six carbon atoms, a linear or branched polyethyleneoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof; and wherein $R^{10}$ is a substituted or un-substituted linear or branched alkyl group having 1 to eight carbon atoms, or 1 to 4 carbon atoms, or methyl or butyl; or an aryl group, any of which may be substituted with one or more fluorine atoms.

Non-limiting examples of polysiloxane macromers include mono-methacryloxypropyl terminated mono-n-

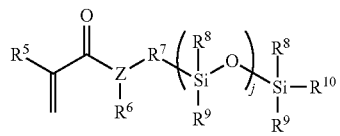

Formula IIIa

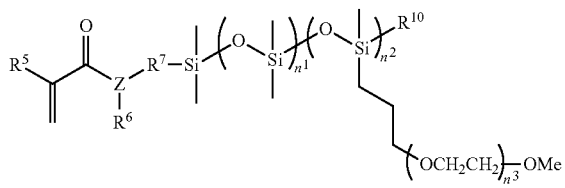

Formula IIIb

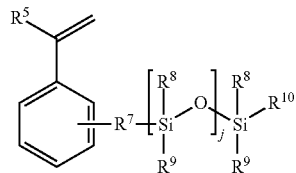

Formula IVa

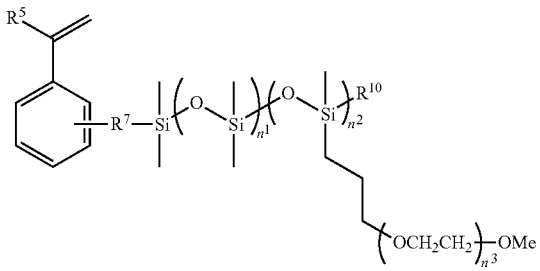

Formula IVb

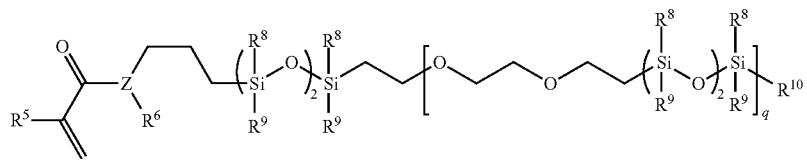

Formula IVc wherein $R^5$ is a hydrogen atom or methyl; wherein Z is selected from O, N, S or $NCH_2CH_2O$; when Z=O or S, $R^6$ is not required; wherein $R^6$ is H or a linear, branched, or cyclic alkyl group containing one to eight carbon atoms, any of which may be further substituted with at least one hydroxy group, and which may be optionally substituted with amide, ether, and combinations thereof; wherein j is a whole number between 1 and 20; q is up to 50, 5 to 30 or 10-25; and $n^1$ and $n^2$ are between 4 to 100; 4 to 50; or 4 to 25; $n^3$ is 1-50, 1-20, or 1-10; wherein $R^7$ is a substituted or unsubstituted $C_{1-6}$, $C_{1-4}$ or $C_{2-4}$ alkylene segment $(CH_2)_r$, each methylene group may optionally be independently substituted with ethers, amines, carbonyls, carboxylates, carbamates and combinations thereof; or an oxyalkylene butyl terminated polydimethylsiloxanes (mPDMS) as shown in Formula V wherein n is between 3 and 15; mono-methacryloxypropyl terminated mono-n-alkyl terminated polydimethylsiloxanes as shown in Formula VIa wherein n is between 4-100, 4 and 20, or between 3 and 15; mono-n-alkyl terminated, polydimethyl-co-polyethylene glycol siloxanes as shown in Formula VIb wherein $n^1$ and $n^2$ are between 4 to 100; 4 to 50; or 4 to 25; $n^3$ is 1-50, 1-20, or 1-10; and $R^5$ through $R^{10}$ are as defined as in Formula IIIa; and macromers having the chemical structures as shown in Formulae VIIa through Xb, wherein n is between 4-100, 4 and 20, or between 3 and 15; $R^5$ and $R^6$ are defined as in Formula IIIa; and $R^{10}$ may be $C_1$-$C_4$ alkyl or methyl or butyl.

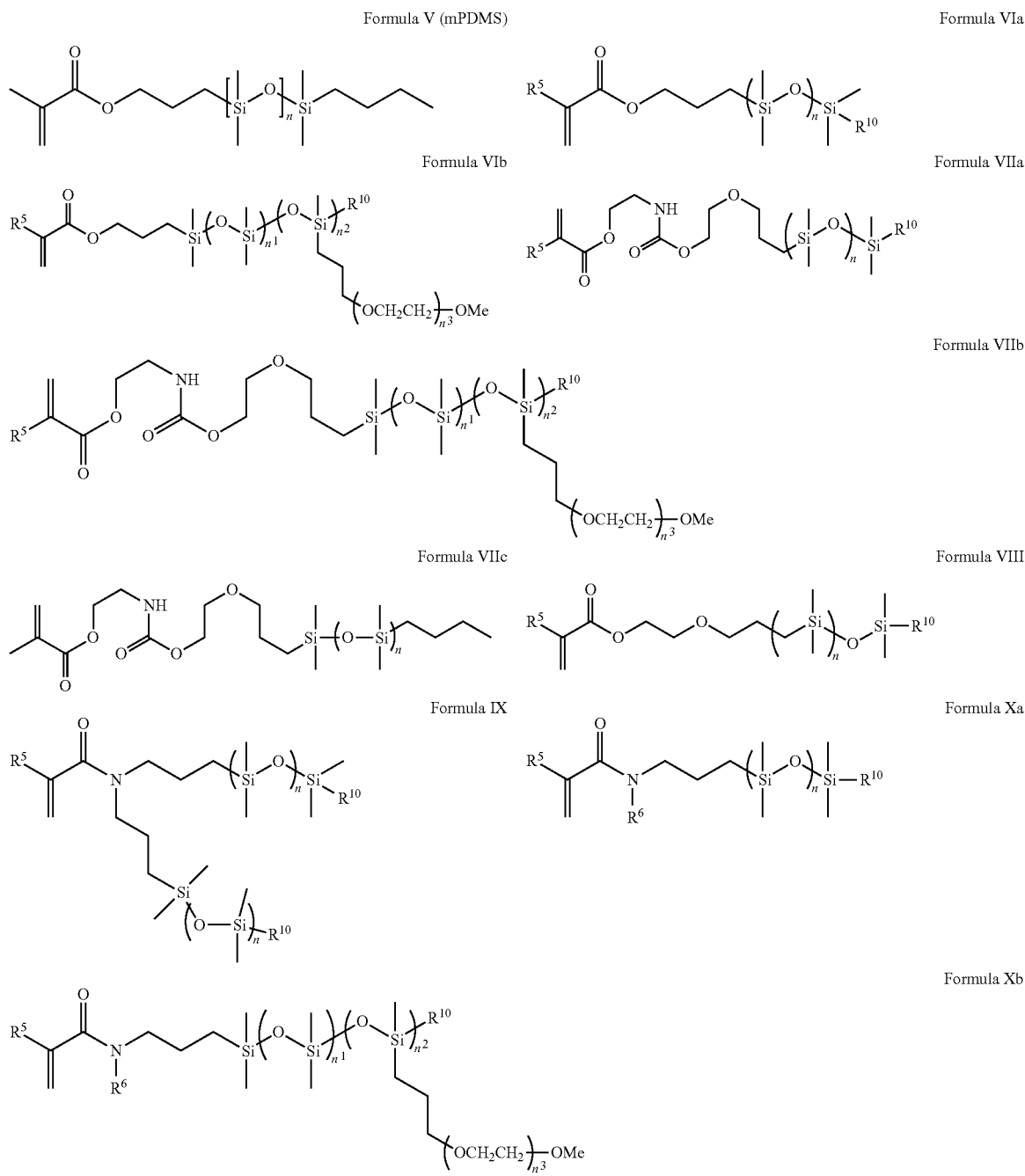

Examples of suitable mono(meth)acryloxyalkylpolydisubstituted siloxanes include mono(meth)acryloxypropyl terminated mono-n-butyl terminated polydimethylsiloxane, mono(meth)acryloxypropyl terminated mono-n-methyl terminated polydimethylsiloxane, mono(meth)acryloxypropyl terminated mono-n-butyl terminated polydiethylsiloxane, mono(meth)acryloxypropyl terminated mono-n-methyl terminated polydiethylsiloxane, mono(meth)acrylamidoalkylpolydialkylsiloxanes mono(meth)acryloxyalkyl terminated mono-alkyl polydiarylsiloxanes, and mixtures thereof.

In Formula II, when n is zero, one or more $R^4$ may comprise a reactive group, two or more $R^4$ comprise tris-triC$_{1-4}$alkylsiloxysilane groups, monovalent siloxane chains comprising between 1-100, 1-10 or 1-5 siloxane repeat units which may further comprise functionality selected from alkyl, alkoxy, hydroxy, amino, oxa, carboxy, alkyl carboxy, alkoxy, amido, carbamate, halogen or combinations thereof; and the remaining $R^4$ are selected from monovalent alkyl groups having 1 to 16, 1 to 6 or 1-4 carbon atoms. Non-limiting examples of silicone components include, 3-methacryloxypropyltris(trimethylsiloxy)silane (TRIS), 3-methacryloxypropylbis(trimethylsiloxy)methylsilane, and 3-methacryloxypropylpentamethyl disiloxane.

The number of siloxane repeating units, n, may also be 2 to 50, 3 to 25, or 3 to 15; wherein at least one terminal $R^4$ comprises a reactive group and the remaining $R^4$ are selected from monovalent alkyl groups having 1 to 16 carbon atoms, or from monovalent alkyl groups having 1 to 6 carbon atoms. Silicone-containing compounds may also include those where n is 3 to 15, one terminal $R^4$ comprises a reactive group, the other terminal $R^4$ comprises a monovalent alkyl group having 1 to 6 carbon atoms and the remaining $R^4$ comprise monovalent alkyl group having 1 to 3 carbon atoms. Non-limiting examples of silicone components include monomethacryloxypropyl n-butyl terminated polydimethylsiloxanes ($M_n$=800-1000), (mPDMS, as shown in Formula V).

Formula II may also include compounds where n is 5 to 400 or from 10 to 300, both terminal $R^4$ comprise reactive groups and the remaining $R^4$ are independently of one another selected from monovalent alkyl groups having 1 to 18 carbon atoms which may have ether linkages between carbon atoms and may further comprise halogen.

One to four $R^4$ in Formula II may comprise a vinyl carbonate or vinyl carbamate of Formula XI:

Formula XI

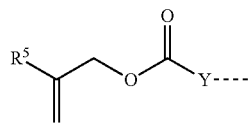

wherein: Y denotes O—, S— or NH—; $R^5$ denotes a hydrogen atom or methyl.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris (trimethylsiloxy)silane]; 3-[tris (trimethylsiloxy)silyl] propyl allyl carbamate; 3-[tris (trimethylsiloxy)silyl] propyl vinyl carbamate; trimethylsilylethyl vinyl carbonate; trimethylsilylmethyl vinyl carbonate, and the crosslinking agent of Formula XII.

Formula XII

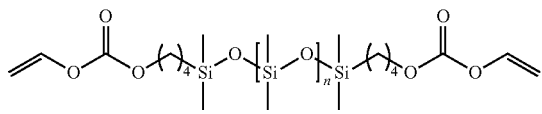

Where materials with moduli below about 200 psi are desired, only one $R^4$ comprises a reactive group and no more than two of the remaining $R^4$ groups comprise monovalent siloxane groups.

Another suitable silicone-containing component is compound of Formula XIII in which the sum of x and y is a number in the range of 10 to 30. The silicone containing component of Formula XXIII is formed by the reaction of fluoroether, hydroxy-terminated polydimethylsiloxane, isophorone diisocyanate and isocyanatoethylmethacrylate.

Formula XIII

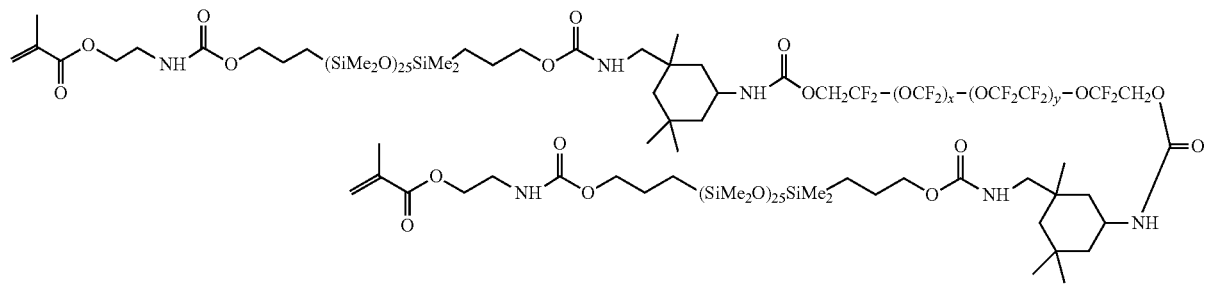

A silicone-containing component may be selected from acrylamide silicones of U.S. Pat. No. 8,415,405. Other silicone components suitable for use in this invention include those described in WO 96/31792 such as macromers containing polysiloxane, polyalkylene ether, diisocyanate, polyfluorinated hydrocarbon, polyfluorinated ether and polysaccharide groups. Another class of suitable silicone-containing components includes silicone-containing macromers made via Group Transfer Polymerization (GTP), such as those disclosed in U.S. Pat. Nos. 5,314,960, 5,331, 067, 5,244,981, 5,371,147, and 6,367,929. U.S. Pat. Nos. 5,321,108, 5,387,662, and 5,539,016 describe polysiloxanes with a polar fluorinated graft or side group having a hydrogen atom attached to a terminal difluoro-substituted carbon atom. US 2002/0016383 describes hydrophilic siloxanyl methacrylates containing ether and siloxanyl linkages and crosslinkable monomers containing polyether and polysiloxanyl groups. Any of the foregoing polysiloxanes can also be used as the silicone-containing component in this invention.

A silicone component may be selected from the group consisting of monomethacryloxypropyl terminated, mono-n-alkyl terminated linear polydisubstituted siloxane; methacryloxypropyl-terminated linear polydisubstituted siloxane; and mixtures thereof.

A containing silicone component may also be selected from monomethacrylate terminated, $C_1$-$C_4$ alkyl terminated, linear polydimethylsiloxanes; and mixtures thereof.

Further examples include those selected from Formula VIa where $R^{10}$ is methyl or butyl, compounds of Formulae V-Xb, and the macromers shown in Formula XIV or XV where n is 1-50 and m is 1-50, 1-20 or 1-10:

Formula XIV

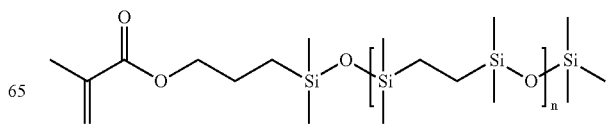

Formula XV

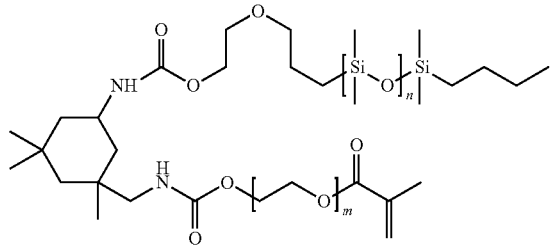

Further examples of silicone-containing components include mPDMS of Formula VIa, compounds of Formulae VIIa or b, or VIII where $R^5$ is methyl and $R^{10}$ is selected from methyl or butyl, and the macromers shown in Formula XIV where n is 1-50 or 4-40, 4-20.

Specific examples of silicone containing components that contain more than one reactive group include bismethacryloxypropyl polydimethylsiloxane, where n may be 4-200, or 4-150, and the following compounds of Formula XVIa-XVIIc, where $n^1$ and $n^2$ are independently selected from 4 to 100; 4 to 50; or 4 to 25; $n^3$ is 1-50, 1-20 or 1-10, m is 1-100, 1-50, 1-20 or 1-10, q is up to 50, 5-30 or 10-25; s is up to 50, 5-30 or 10-25; and Z, $R^5$, $R^6$, $R^8$ and $R^9$ are defined as in Formula IIIa.

Formula XVIa

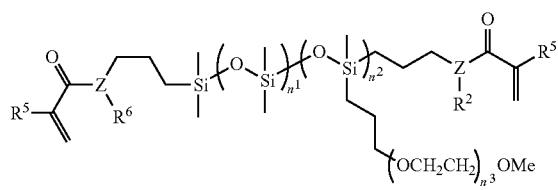

Formula XVIb

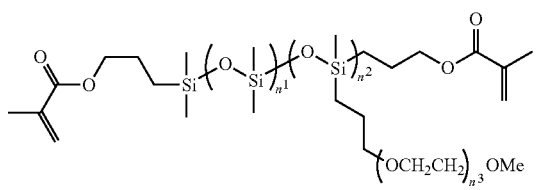

Formula XVIc

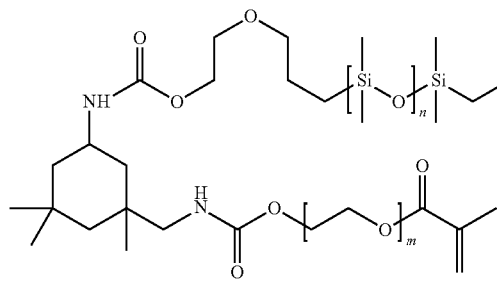
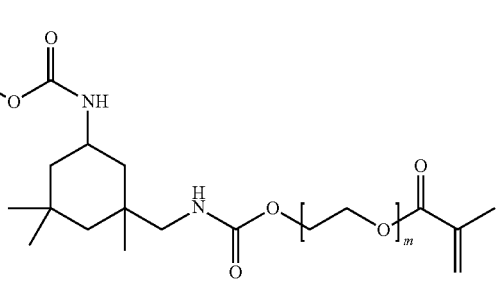

Formula XVIIa

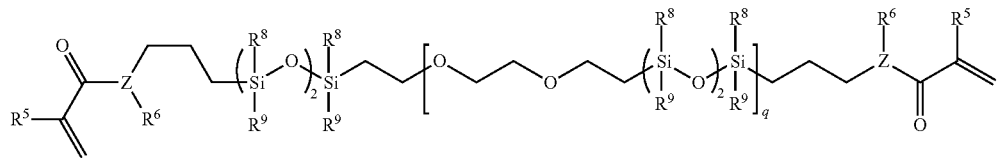

Formula XVIIb

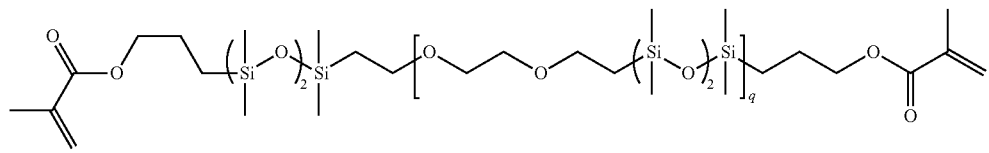

Formula XVIIc

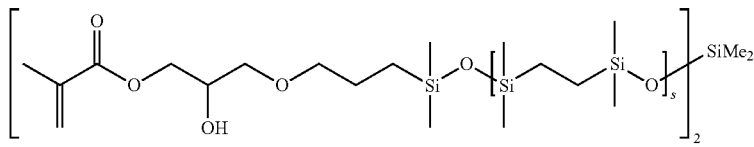

A silicone component may have an average molecular weight of from about 400 to about 4000 Daltons.

When Z is O, the silicone containing component may be a mono-methacryloxypropyl terminated mono-n-butyl terminated polydimethylsiloxanes (mPDMS) as shown in Formula V wherein n is between 3 and 15; mono-methacryloxypropyl terminated mono-n-alkyl terminated polydimethylsiloxanes as shown in Formula VIa wherein n is between 3 and 15 and $R^{10}$ is a linear, branched, or cyclic alkyl group containing between 1 and 8 carbon atoms; and macromers having the chemical structures as shown in Formulae VIIa through XIIc, or VIII where n is between 4 and 20, or between 3-30, 3-25, 3-20 or 3-15.

When Z is N, further examples of polysiloxane silicone-containing components include mono(meth)acrylamidoalkylpolydialkylsiloxanes and may be selected from those disclosed in U.S. Pat. No. 8,415,405, and those shown in Formulae XIII wherein $R^5$, $R^6$, $R^8$, $R^9$, $R^{10}$ are defined as in Formula IIIa, mono(meth)acrylamidoalkyl polydimethylsiloxanes, such as those in Formulae XIX-XXIII, and N-(2,3-dihydroxypropane)-N'-(propyl tetra(dimethylsiloxy) dimethylbutylsilane)acrylamide:

Formula XIII
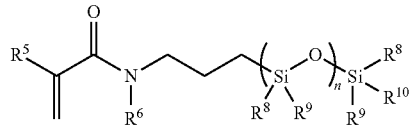

Formula XIX
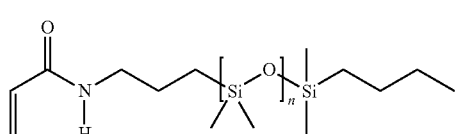

Formula XX
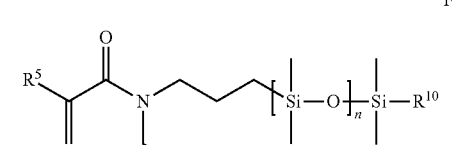

Formula XXI
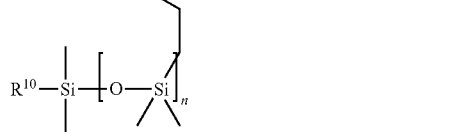

Formula XXII
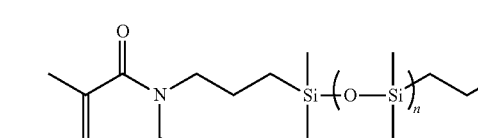

Formula XXIII (SA2)
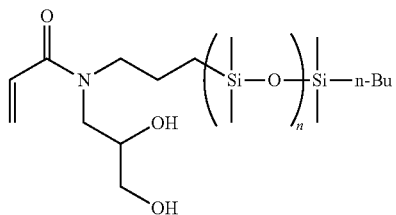

Examples of styryl monomers include tris(trimethylsiloxy)silyl styrene. Examples of styryl macromers are shown below in chemical Formulae XXIV through XIX, wherein n is between 4 and 20, or between 3-30, 3-25, 3-20 or 3-15.

Formula XXIV
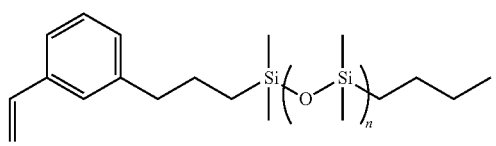

Formula XXV
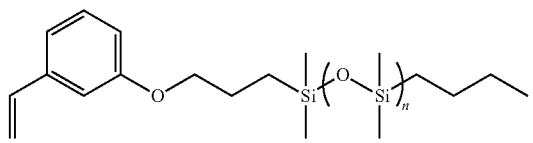

Formula XXVI
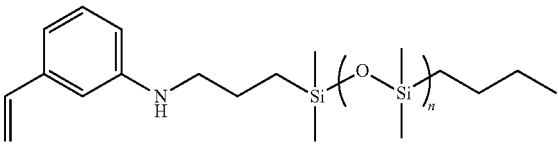

Formula XXVII
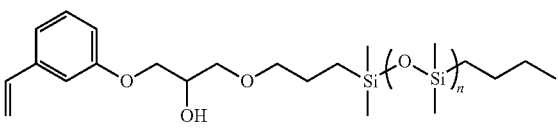

Formula XXVIII
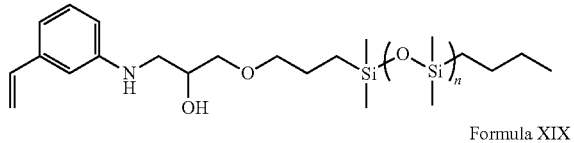

Formula XIX
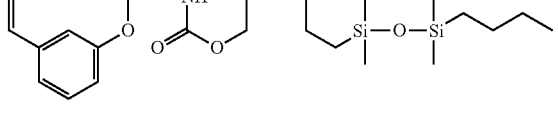

The length of the silicone chain may have an impact on the modulus of the resulting silicone material and may be adjusted along with the other components of the reactive composition to achieve the desired balance of physical and mechanical properties. For instance, the length of the silicone chain may be chosen to attain a water content for a silicone hydrogel that moderates stiffness and increases elongation to break concurrently. As the polydialkylsiloxane chain length increases, modulus will decrease and elongation to break will increase. Polydialkylsiloxane chain lengths between 1 and 20, 1 and 15, 3-30, 3-25, 3-20 or 3-15 may be selected.

The silicone-containing component may further include silicone-containing monomers with branched siloxane groups. Examples include tris(trimethylsiloxy)silylstyrene (Styryl-TRIS), 3-tris(trimethylsiloxy)silylpropyl methacrylate (TRIS), N-[3-tris(trimethylsiloxy)silyl]-propyl acrylamide (TRIS-Am), 2-hydroxy-3-[3-methyl-3,3-di(trimethylsiloxy)silylpropoxy]-propyl methacrylate (SiMAA), and other bulky silicone monomers, such as those in Formulae XXa through XXe, wherein $R^{11}$ is independently linear, branched, or cyclic alkyl groups containing between one and eight carbon atoms, or are trimethylsiloxy groups.

Formula XXa
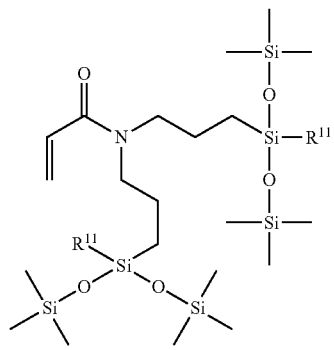

Formula XXXb
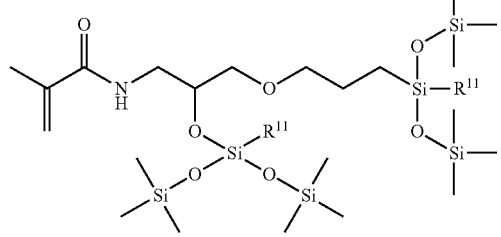

Formula XXc
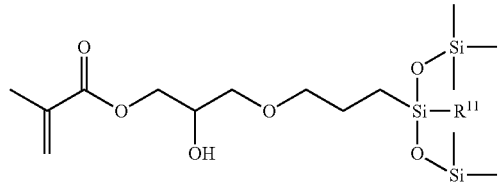

Formula XXd
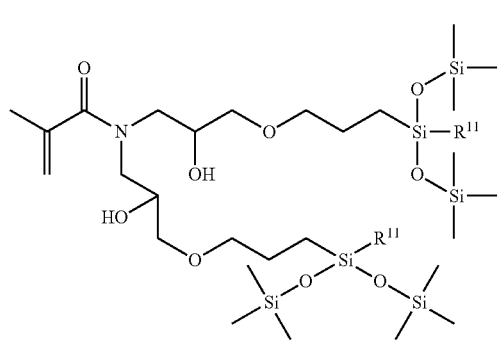

Formula XXe
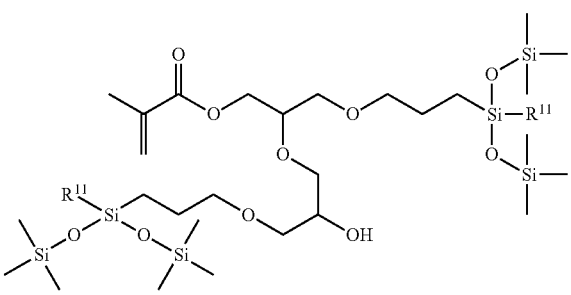

Formula XXf
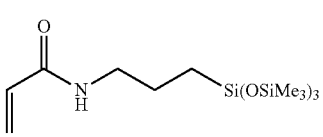

Formula XXg (SiMAA)
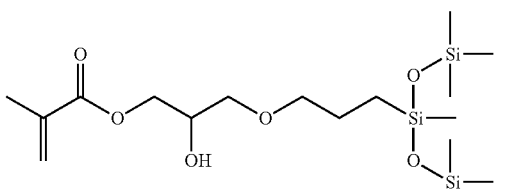

Formula XXh
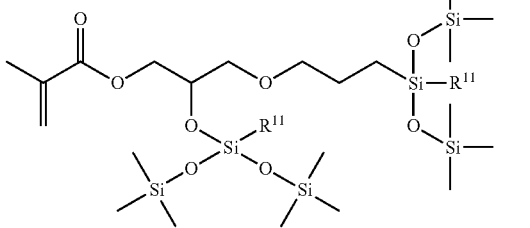

Formula XXi
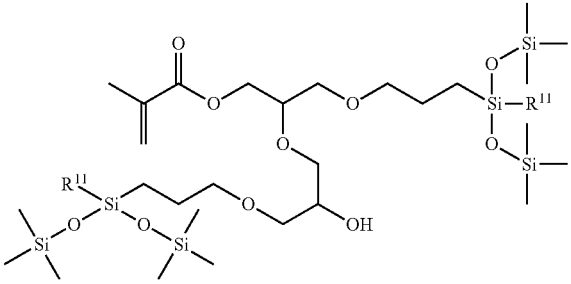

Formula XXj
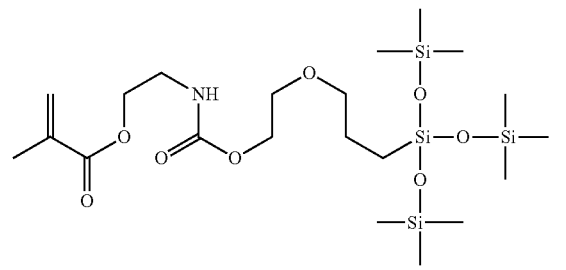

The aforementioned macromers have methacrylate, acrylamide, or methacrylamide reactive groups. These reactive groups may be replaced with any other reactive group capable of undergoing free radical polymerization, such as acrylates, styrenes, vinyl ethers, N-vinyllactams, N-vinylamides, N-vinylimides, N-vinylureas, O-vinylcarbamates, O-vinylcarbonates, and other vinyl compounds. Where moduli greater than about 5000 psi are desired, monomers and macromers with styryl reactive groups are beneficially included.

Alternative silicone-containing components suitable for use include those described in WO 96/31792 and U.S. Pat. Nos. 5,314,960, 5,331,067, 5,244,981, 5,371,147, 6,367,929, 5,321,108, 5,387,662, 5,539,016, 6,867,245, and others will be apparent to one skilled in the art The silicone containing component may also comprise one or more hydroxyl-containing silicone component. Hydroxyl-containing silicone components may help to compatibilize high concentrations of silicone containing components with hydrophilic components, including polymeric hydrophilic components, and silicone components having bulky siloxane groups or longer chains of repeating siloxane units. Hydroxyl-containing silicone components include hydroxyl containing silicone monomers and macromers. The hydroxyl-containing silicone components may have 4 to 200, 4-100 or 4-20 siloxane repeating units and may be monofunctional or multifunctional.

Hydroxyl-containing silicone components having 4 polydisubstituted siloxane repeating units in the siloxane chain are not a distribution and have four repeating units in each monomer. For all hydroxyl-containing silicone components having more than four polydisubstituted siloxane repeating units in the siloxane chain the number of repeating units is a distribution, with the peak of the distribution centered around the listed number of repeat units.

Examples of hydroxyl-containing silicone monomers include propenoic acid-2-methyl-2-hydroxy-3-[3-[1,3,3,3-tetramethyl-1-[(trimethylsilyl)oxy]-1-disiloxanyl]propoxy] propyl ester (SiMAA or SiGMA), and 2-hydroxy-3-methacryloxypropyloxypropyl-tris(trimethylsiloxy)silane, and compounds of Formula XXd.

The hydroxyl-containing silicone components may be selected from monofunctional hydroxyl substituted poly (disubstituted siloxane)s of Formula XXI:

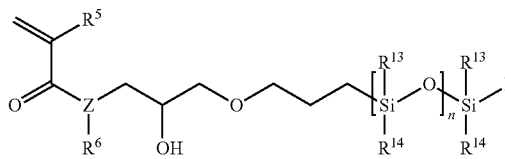

Formula XXI wherein Z is selected from O, N, S or $NCH_2CH_2O$, when Z is O or S $R^6$ is not present; $R^5$ is independently H or methyl; $R^6$ is H or a linear, branched, or cyclic alkyl group containing one to eight carbon atoms, any of which may be further substituted with at least one hydroxy group, and which may be optionally substituted with amide, ether, and combinations thereof; $R^{13}$ and $R^{14}$ are independently a linear, branched, or cyclic alkyl group containing one to eight carbon atoms, any of which may be further substituted with at least one hydroxy group, and which may be optionally substituted with amide, ether, and combinations thereof; $R^3$ and $R^4$ may be independently selected from methyl, ethyl or phenyl, or may be methyl; n is the number of siloxane units and is from 4-100, 4-30, 4-15, and 4-8; and $R^{15}$ is selected from straight or branched $C_1$ to $C_8$ alkyl groups, which may be optionally substituted with one or more hydroxyl, amide, ether, and combinations thereof. $R^{15}$ may be straight or branched $C_4$ alkyl, either of which may optionally be substituted with hydroxyl, or may be methyl.

Examples of monofunctional hydroxyl containing silicone components include mono-(2-hydroxy-3-methacryloxypropyl)-propyl ether terminated mono-n-butyl terminated polydimethylsiloxanes (OH-mPDMS) as shown in Formula XXIIa wherein n is between 4 and 30, 4-8 or 10-20; and polydimethylsiloxanes having the chemical structures as shown in Formulae XXIIb through XXIIId, where n is between 4 and 30, 4 and 8 or 10 and 20; $n^1$ $n^2$, and $n^3$ are independently between 4 to 100; 4 to 50; 4 to 25; $R^5$, $R^{12}$, and $R^{15}$ as defined in Formula XXI; $R^{15}$ may also be selected from straight or branched $C_1$ to $C_8$ alkyl groups, which may be optionally substituted with one or more hydroxyl, amide, ether, polyhydroxyl groups selected from straight or branched $C_1$ to $C_8$ groups having a formula of $C_fH_g(OH)_h$ wherein f=1-8 and g+h=2f+1 and cyclic $C_1$ to $C_8$ groups having a formula of $C_fH_g(OH)_h$ wherein f=1-8 and g+h=2f-1, and combinations thereof; or $R^{15}$ may be selected from methyl, butyl or hydroxyl substituted $C_2$-$C_5$ alkyl, including hydroxyl ethyl, hydroxyl propyl, hydroxyl butyl, hydroxyl pentyl and 2,3-dihydroxypropyl; and polycarbosiloxanes of Formulae XXIVa-b where a is between 4-100 or 4-8; and Z, $R^5$, $R^{12}$, $R^{13}$, $R^{14}$, and $R^{15}$ are as defined as in Formula XXI.

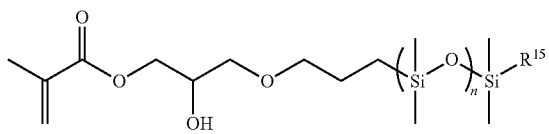

Formula XXIIa

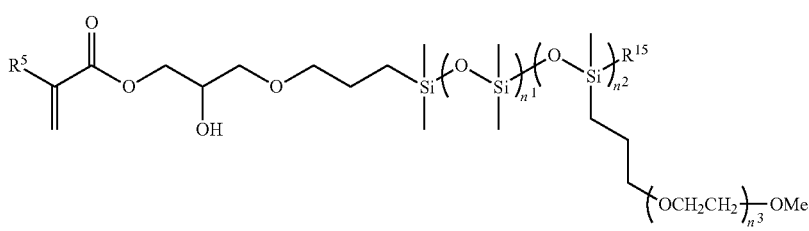

Formula XXIIb

-continued

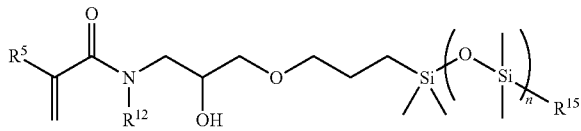
Formula XXIIIa

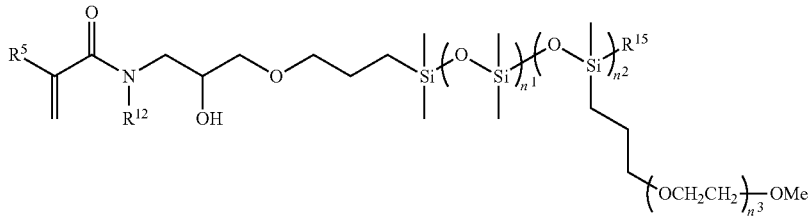
Formula XXIIIb

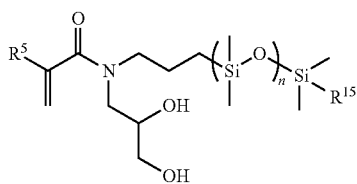
Formula XXIIIc

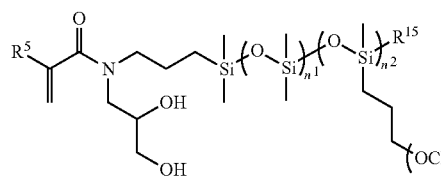
Formula XXIIId

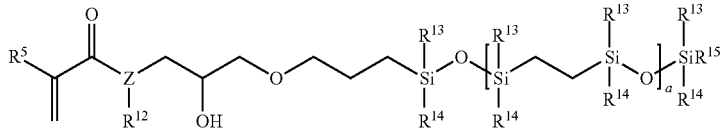
Formula XXIVa

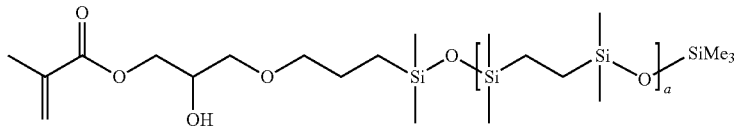
Formula XXIVb

The hydroxyl-containing silicone component may also be selected from multifunctional hydroxyl substituted, poly(disubstituted siloxane) of Formula XXV having 10 to 500, or 10 to 200, or 10 to 100 siloxane repeating units, and mixtures thereof:

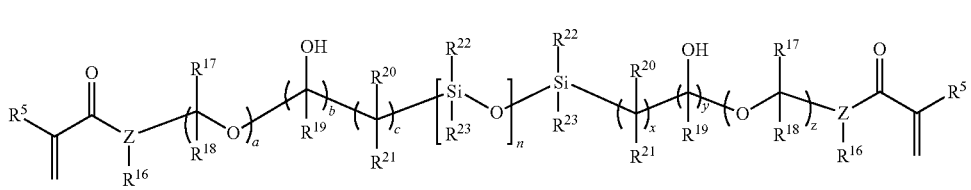
Formula XXV wherein in Formula XXV, Z is selected from O, N, S or $NCH_2CH_2O$; for Z=O and S, $R^{16}$ is not required; $R^5$ is independently a hydrogen atom or methyl group;

$R^{16}$ is H or a linear, branched, or cyclic alkyl group containing one to eight carbon atoms, any of which may be further substituted with at least one hydroxy group, and which may be optionally substituted with amide, ether, and combinations thereof. $R^{17}$, $R^{18}$, $R^{19}$, $R^{20}$, and $R^{21}$ are independently selected from the group consisting of a hydrogen atom or any of the substituents defined for $R^{22}$ and $R^{23}$; $R^{22}$ and $R^{23}$ are independently selected from the group consisting of a linear, branched, or cyclic alkyl group containing one to eight carbon atoms, any of which may be further substituted with at least one hydroxy group, amido, ether, amino, carboxyl, carbonyl groups and combinations; a linear or branched alkyleneoxy group, specifically ethyleneoxy groups, $[CH_2CH_2O]_p$ wherein p is between 1 and 200, or 1 and 100, or 1 and 50, or 1 and 25, or 1 and 20, optionally substituted with one or more hydroxyl, amino, amido, ether, carbonyl, carboxyl, and combinations thereof; a $C_1$-$C_6$ linear or branched fluoroalkyl groups optionally substituted with one or more hydroxyl, amino, amido, ether, carbonyl, carboxyl, and combinations thereof; a substituted or un-substituted aryl groups, specifically phenyl groups, wherein the substituents are selected from halogen, hydroxyl, alkoxy, alkylcarbonyl, carboxy, and linear or branched or cyclic alkyl groups which may be further substituted with halogen, hydroxyl, alkoxy, alkylcarbonyl, and carboxyl groups, and combinations thereof; a, b, c, x, y and z are independently between 0 and 100, between 0 and 50, between 0 and 20, between 0 and 10, or between 0 and 5; and may be ordered in any molecular sequence to make a wide range of substituted hydroxy-oxa-alkylene chains; and n is the number of siloxane repeating units and is from 10 to 500; 10 to 200; 10 to 100; 10 to 50; 10 to 20.

Examples of multifunctional hydroxyl containing silicones include α-(2-hydroxy-1-methacryloxypropyloxypropyl)-ω-butyl-decamethylpentasiloxane and the difunctional polysiloxanes of Formulae XXVI or XXVII, wherein the substituents are defined as in Formula XXV and $n^1$ $n^2$, and $n^3$ are independently between 4 to 100; 4 to 50; 4 to 25:

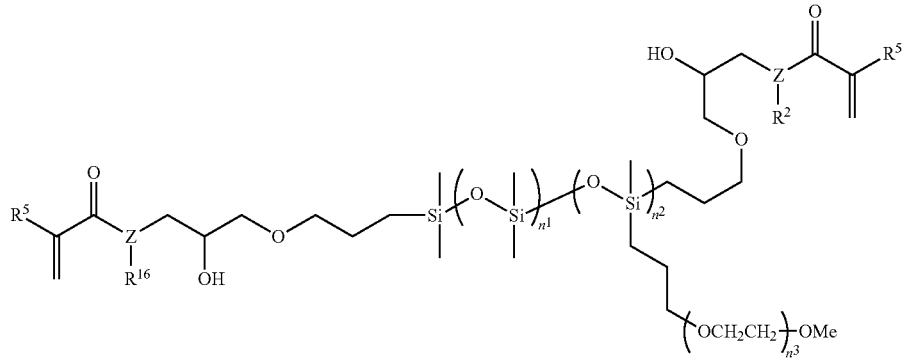

Formula XXVI

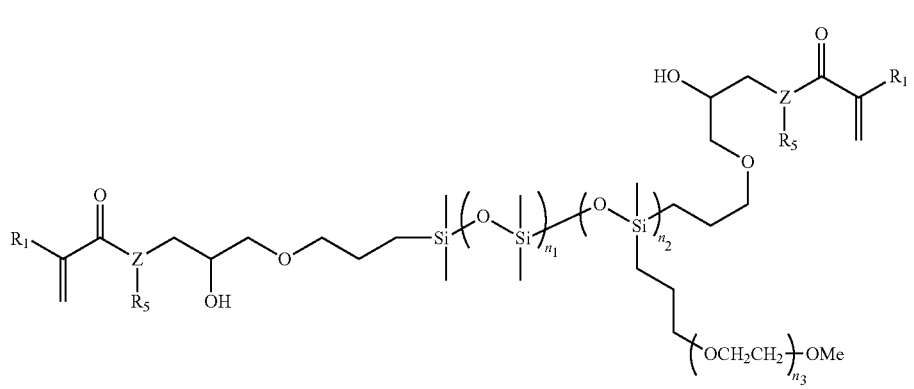

Formula XXVII

Another example is the difunctional polysiloxanes shown in Formula XXXVIII:

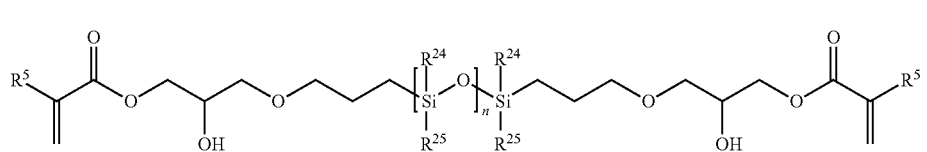

Formula XXVIII wherein R⁵ is independently a hydrogen atom or methyl group; $R^{24}$ and $R^{25}$ are independently a linear, branched, or cyclic alkyl group containing one to eight carbon atoms, any of which may be further substituted with at least one hydroxy group, amido, ether, amino, carboxyl, carbonyl groups and combinations thereof; or are independently selected from unsubstituted $C_{1-4}$ alkyl groups and $C_{1-4}$ alkyl groups substituted with hydroxyl or ether; or are selected from methyl, ethyl or —(CH$_2$CH$_2$O)$_m$OCH$_3$ where m is 1-50, 1-20 and 1-10.

Further examples of silicone containing components for use in the invention include materials of formula XXIX:

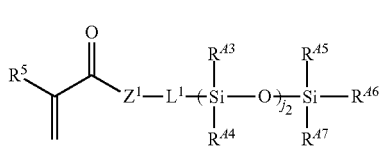

Formula XXIX wherein

R⁵ is hydrogen or methyl;

$Z^1$ is O or N($R^{49}$);

$L^1$ is alkylene containing 1 to 8 carbon atoms, or oxaalkylene containing 3 to 10 carbon atoms, wherein $L^1$ is optionally substituted with hydroxyl;

j2 is from 0 to 220, preferably from 1 to 220;

$R^{43}$, $R^{44}$, $R^{45}$, and $R^{47}$ are independently at each occurrence $C_1$-$C_6$ alkyl, $C_3$-$C_{12}$ cycloalkyl, $C_1$-$C_6$ alkoxy, $C_4$-$C_{12}$ cyclic alkoxy, alkoxy-alkyleneoxy-alkyl, aryl (e.g., phenyl), aryl-alkyl (e.g., benzyl), haloalkyl (e.g., partially or fully fluorinated alkyl), siloxy, fluoro, or combinations thereof, wherein each alkyl in the foregoing groups is optionally substituted with one or more hydroxy, amino, amido, oxa, carboxy, alkyl carboxy, carbonyl, alkoxy, carbamate, carbonate, halo, phenyl, or benzyl, each cycloalkyl is optionally substituted with one or more alkyl, hydroxy, amino, amido, oxa, carbonyl, alkoxy, carbamate, carbonate, halo, phenyl, or benzyl and each aryl is optionally substituted with one or more alkyl, hydroxy, amino, amido, oxa, carboxy, alkyl carboxy, carbonyl, alkoxy, carbamate, carbonate, halo, phenyl, or benzyl;

$R^{46}$ is siloxy, $C_1$-$C_8$ alkyl (e.g., $C_1$-$C_4$ alkyl, or butyl, or methyl), or aryl (e.g., phenyl), wherein alkyl and aryl may optionally be substituted with one or more fluorine atoms; and $R^{49}$ is H, $C_1$-$C_8$ alkyl (preferably $C_1$-$C_4$ alkyl, such as n-butyl, n-propyl, methyl or ethyl), or $C_3$-$C_8$ cycloalkyl (preferably $C_5$-$C_6$ cycloalkyl), wherein alkyl and cycloalkyl are optionally substituted with one or more groups independently selected from hydroxyl, amide, ether, silyl (e.g., trimethylsilyl), siloxy (e.g., trimethylsiloxy), alkyl-siloxanyl (where alkyl is itself optionally substituted with fluoro), aryl-siloxanyl (where aryl is itself optionally substituted with fluoro), and silyl-oxaalkylene- (where the oxaalkylene is itself optionally substituted with hydroxyl).

Preferred compounds of formula XXIX include those wherein $L^1$ is $C_2$-$C_5$ alkylene optionally substituted with hydroxyl. Preferably $L^1$ is n-propylene optionally substituted with hydroxyl.

Preferred compounds of formula XXIX include those wherein $L^1$ is oxaalkylene containing 4 to 8 carbon atoms optionally substituted with hydroxyl. Preferably $L^1$ is oxaalkylene containing five or six carbon atoms optionally substituted with hydroxyl. Examples include —(CH$_2$)$_2$—O—(CH$_2$)$_3$—, and —CH$_2$CH(OH)CH$_2$—O—(CH$_2$)$_3$—.

Preferred compounds of formula XXIX include those wherein $Z^1$ is O.

Preferred compounds of formula XXIX include those wherein $Z^1$ is N($R^{49}$), and $R^{49}$ is H.

Preferred compounds of formula XXIX include those wherein $Z^1$ is N($R^{49}$), and $R^{49}$ is $C_1$-$C_4$ alkyl optionally substituted with 1 or 2 substituents selected from hydroxyl, siloxy, and $C_1$-$C_6$ alkyl-siloxanyl- (e.g., alkyl-[Si($R^{43}$)($R^{44}$)—O]$_n$—, where n is 1 or more).

Preferred compounds of formula XXIX include those wherein j2 is 1.

Preferred compounds of formula XXIX include those wherein j2 is from 2 to 220, or from 2 to 100, or from 10 to 100, or from 24 to 100, or from 4 to 20, or from 4 to 10.

Preferred compounds of formula XXIX include those wherein $R^{43}$, $R^{44}$, $R^{45}$, $R^{46}$, and $R^{47}$ are independently $C_1$-$C_6$ alkyl or siloxy. Preferably $R^{43}$, $R^{44}$, $R^{45}$, $R^{46}$, and $R^{47}$ are independently selected from methyl, ethyl, n-propyl, n-butyl, and trimethylsiloxy. More preferably, $R^{43}$, $R^{44}$, $R^{45}$, $R^{46}$, and $R^{47}$ are independently selected from methyl, n-butyl, and trimethylsiloxy.

Preferred compounds of formula XXIX include those wherein $R^{43}$ and $R^{44}$ are independently $C_1$-$C_6$ alkyl (e.g., methyl or ethyl) or siloxy (e.g., trimethylsiloxy), and $R^{45}$, $R^{46}$, and $R^{47}$ are independently $C_1$-$C_6$ alkyl (e.g., methyl, ethyl, n-propyl, or n-butyl).

The silicone component may, for instance, have a number average molecular weight of from about 400 to about 4000 Daltons.

Examples of silicone-containing components suitable for use in the invention include, but are not limited to, compounds listed in Table A. Where the compounds in Table B contain polysiloxane groups, the number of SiO repeat units in such compounds, unless otherwise indicated, is preferably from 3 to 100, more preferably from 3 to 40, or still more preferably from 3 to 20.

TABLE A

| | |
|---|---|
| 1 | mono-methacryloxypropyl terminated mono-n-butyl terminated polydimethylsiloxanes (mPDMS) (preferably containing from 3 to 15 SiO repeating units) |
| 2 | mono-acryloxypropyl terminated mono-n-butyl terminated polydimethylsiloxane |
| 3 | mono(meth)acryloxypropyl terminated mono-n-methyl terminated polydimethylsiloxane |
| 4 | mono(meth)acryloxypropyl terminated mono-n-butyl terminated polydiethylsiloxane |
| 5 | mono(meth)acryloxypropyl terminated mono-n-methyl terminated polydiethylsiloxane |
| 6 | mono(meth)acrylamidoalkylpolydialkylsiloxanes |
| 7 | mono(meth)acryloxyalkyl terminated mono-alkyl polydiarylsiloxanes |
| 8 | 3-methacryloxypropyltris(trimethylsiloxy)silane (TRIS) |
| 9 | 3-methacryloxypropylbis(trimethylsiloxy)methylsilane |
| 10 | 3-methacryloxypropylpentamethyl disiloxane |
| 11 | mono(meth)acrylamidoalkylpolydialkylsiloxanes |
| 12 | mono(meth)acrylamidoalkyl polydimethylsiloxanes |
| 13 | N-(2,3-dihydroxypropane)-N'-(propyl tetra(dimethylsiloxy) dimethylbutylsilane)acrylamide |
| 14 | N-[3-tris(trimethylsiloxy)silyl]-propyl acrylamide (TRIS-Am) |

TABLE A-continued
15  2-hydroxy-3-[3-methyl-3,3-di(trimethylsiloxy)silylpropoxy]-propyl methacrylate (SiMAA)
16  2-hydroxy-3-methacryloxypropyloxypropyl-tris(trimethylsiloxy)silane
17  mono-(2-hydroxy-3-methacryloxypropyl)-propyl ether terminated mono-n-butyl terminated polydimethylsiloxanes (OH-mPDMS) (containing from 4 to 30, or from 10 to 20, or from 4 to 8 SiO repeat units)
18 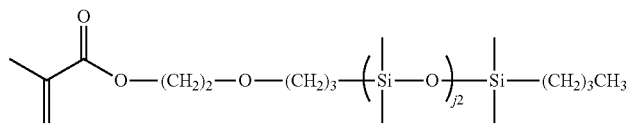
19 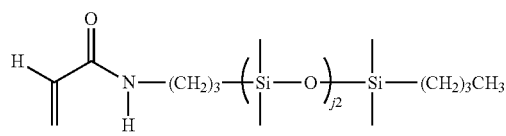
20 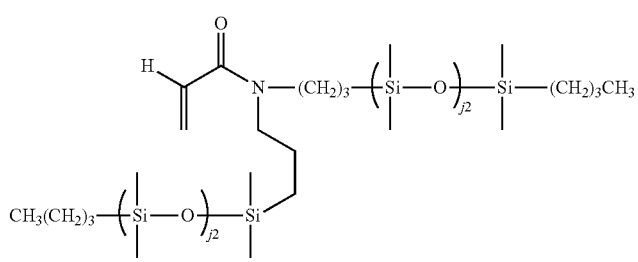
21 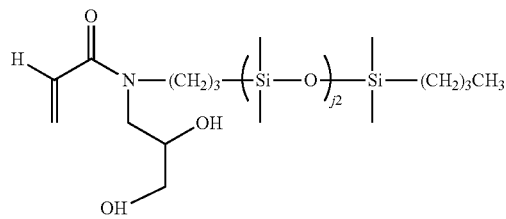
22 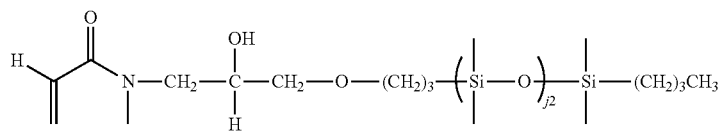
23 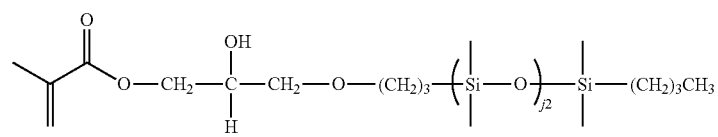
24 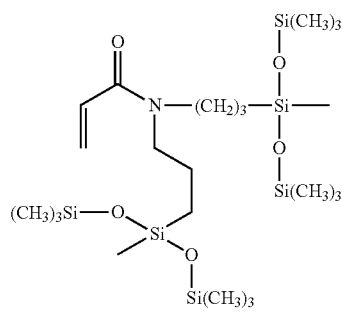

Additional non-limiting examples of suitable silicone-containing components are listed in Table B. Unless otherwise indicated, j2 where applicable is preferably from 1 to 100, more preferably from 3 to 40, or still more preferably from 3 to 15. In compounds containing j1 and j2, the sum of j1 and j2 is preferably from 2 to 100, more preferably from 3 to 40, or still more preferably from 3 to 15.

TABLE B

25 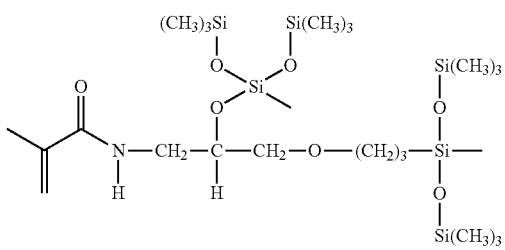

26 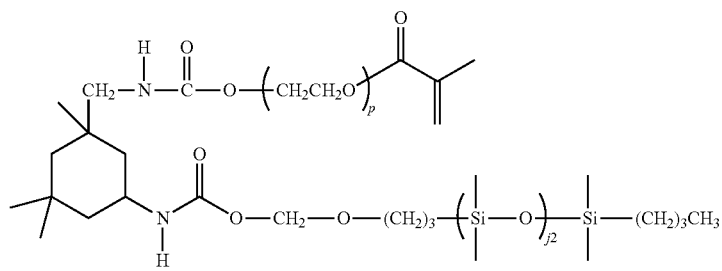

p is 1 to 10

27 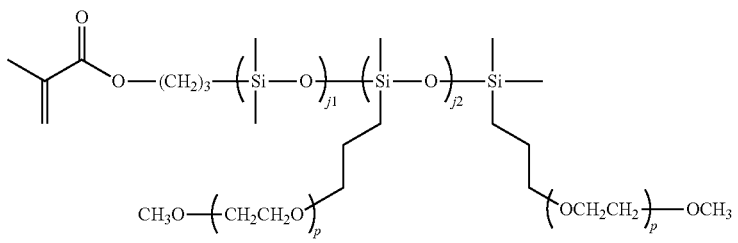

p is 5-10

28 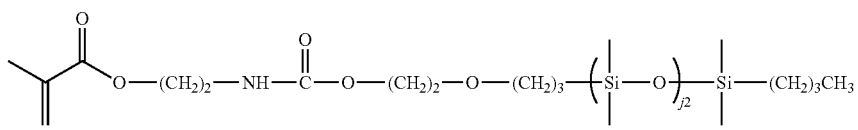

29 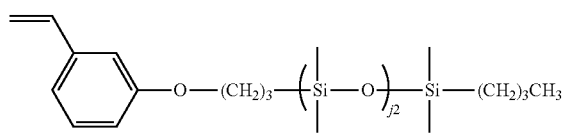

| | |
|---|---|
| 30 | 1,3-bis[4-(vinyloxycarbonyloxy)but-1-yl]tetramethyl-disiloxane |
| 31 | 3-(vinyloxycarbonylthio) propyl-[tris (trimethylsiloxy)silane] |
| 32 | 3-[tris(trimethysiloxy)silyl] propyl allyl carbamate |
| 33 | 3-[tris(trimethylsiloxy)silyl] propyl vinyl carbamate |
| 34 | tris(trimethylsiloxy)silylstyrene (Styryl-TRIS) |

TABLE B-continued
35 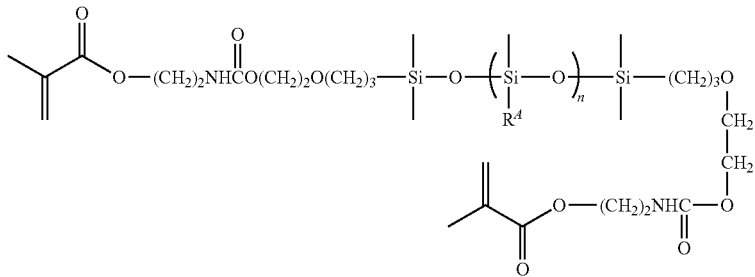
$R^A$ = CH$_3$ (a) or CH$_2$CH$_2$CF$_3$ (b) or
CH$_2$—(CH$_2$)$_2$—[OCH$_2$CH$_2$]$_{1-10}$—OCH$_3$ (c);
a + b + c = n
36 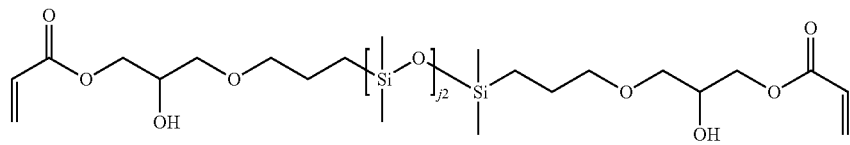
37 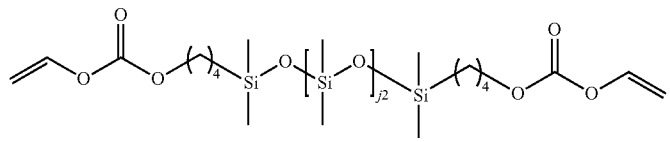
38 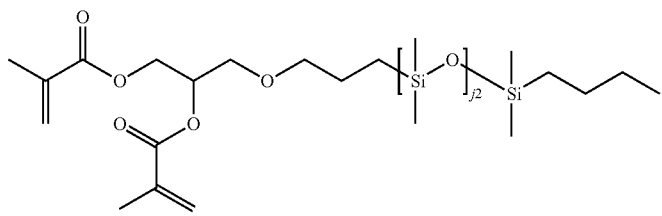
39 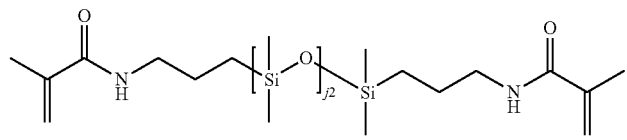
40 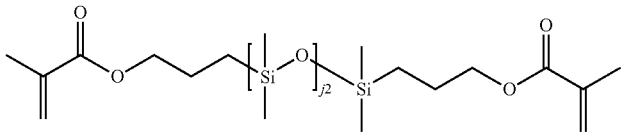
41 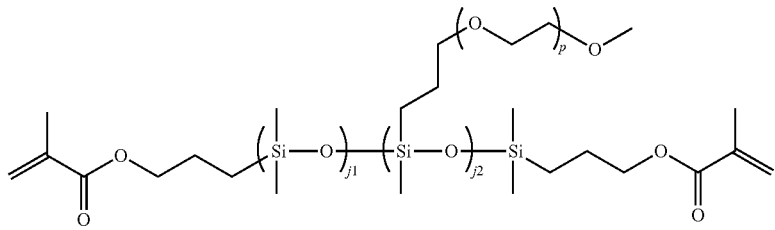
j1 = 80-90
j2 = 5-6
p = 7-8

The ethylenically unsaturated compound for inclusion in the first reactive composition and/or the second reactive composition may comprise an independently selected hydrophilic component. Hydrophilic components include those which are capable of providing at least about 20% or at least about 25% water content to the resulting composition when combined with the remaining reactive components. Suitable hydrophilic components include hydrophilic monomers, prepolymers and polymers. Preferably, the hydrophilic component has at least one reactive group and at least one hydrophilic functional group. Examples of reactive groups include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds.

The term "vinyl-type" or "vinyl-containing" monomers refer to monomers containing the vinyl grouping (—CH═CH$_2$) and are generally highly reactive. Such hydrophilic vinyl-containing monomers are known to polymerize relatively easily.

"Acrylic-type" or "acrylic-containing" monomers are those monomers containing an acrylic group (CH$_2$═CRCOX) wherein R is H or CH$_3$, and X is O or N, which are also known to polymerize readily, such as N,N-dimethyl acrylamide (DMA), 2-hydroxyethyl methacrylamide, polyethyleneglycol monomethacrylate, methacrylic acid, acrylic acid, mixtures thereof and the like.

Hydrophilic monomers with at least one hydroxyl group (hydroxyalkyl monomer) may be used. The hydroxyl alkyl group may be selected from C$_2$-C$_4$ mono or dihydroxy substituted alkyl, and poly(ethylene glycol) having 1-10 repeating units; or is selected from 2-hydroxyethyl, 2,3-dihydroxypropyl, or 2-hydroxypropyl, and combinations thereof.

Examples of hydroxyalkyl monomers include 2-hydroxyethyl (meth)acrylate (HEMA), 3-hydroxypropyl (meth)acrylate, 2-hydroxypropyl (meth)acrylate, 2,3-dihydroxypropyl (meth)acrylate, 2-hydroxybutyl (meth)acrylate, 3-hydroxybutyl (meth)acrylate, 1-hydroxypropyl 2-(meth)acrylate, 2-hydroxy-2-methyl-propyl (meth)acrylate, 3-hydroxy-2,2-dimethyl-propyl (meth)acrylate, 4-hydroxybutyl (meth)acrylate, 2-hydroxyethyl (meth)acrylamide, N-(2-hydroxypropyl) (meth)acrylamide, N,N-bis(2-hydroxyethyl) (meth)acrylamide, N,N-bis(2-hydroxypropyl) (meth)acrylamide, N-(3-hydroxypropyl) (meth)acrylamide, 2,3-dihydroxypropyl (meth)acrylamide, glycerol (meth)acrylate, polyethyleneglycol monomethacrylate, and mixtures thereof.

The hydroxyalkyl monomer may also be selected from the group consisting of 2-hydroxyethyl methacrylate, glycerol methacrylate, 2-hydroxypropyl methacrylate, hydroxybutyl methacrylate, 3-hydroxy-2,2-dimethyl-propyl methacrylate, and mixtures thereof.

The hydroxyalkyl monomer may comprise 2-hydroxyethyl methacrylate, 3-hydroxy-2,2-dimethyl-propyl methacrylate, hydroxybutyl methacrylate or glycerol methacrylate.

When hydrophilic polymers in quantities great than about 3 wt % are desired, Hydroxyl containing (meth)acrylamides are generally too hydrophilic to be included as compatibilizing hydroxyalkyl monomers, and hydroxyl containing (meth)acrylates may be included in the reactive composition and the lower amount of hydroxyalkyl monomers may be selected to provide a haze value to the final lens of less than about 50% or less than about 30%.

It will be appreciated that the amount of hydroxyl component will vary depending upon a number of factors, including, the number of hydroxyl groups on the hydroxyalkyl monomer, the amount, molecular weight and presence of hydrophilic functionality on the silicone containing components. The hydrophilic hydroxyl component may be present in the reactive composition in amounts up to about 15%, up to about 10 wt %, between about 3 and about 15 wt % or about 5 and about 15 wt %.

Hydrophilic vinyl-containing monomers which may be incorporated into the polymer compositions include monomers such as hydrophilic N-vinyl lactam and N-vinyl amide monomers including: N-vinyl pyrrolidone (NVP), N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, N-vinyl acetamide (NVA), N-vinyl-N-methylacetamide (VMA), N-vinyl-N-ethyl acetamide, N-vinyl-N-ethyl formamide, N-vinyl formamide, N-vinyl-N-methylpropionamide, N-vinyl-N-methyl-2-methylpropionamide, N-vinyl-2-methylpropionamide, N-vinyl-N,N'-dimethylurea, 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-N-propyl-3-methylene-2-pyrrolidone, 1-N-propyl-5-methylene-2-pyrrolidone, 1-isopropyl-3-methylene-2-pyrrolidone, 1-isopropyl-5-methylene-2-pyrrolidone, N-vinyl-N-ethyl acetamide, N-vinyl-N-ethyl formamide, N-vinyl formamide, N-vinyl isopropylamide, N-vinyl caprolactam, N-carboxyvinyl-β-alanine (VINAL), N-carboxyvinyl-α-alanine, N-vinylimidazole, and mixtures thereof.

Hydrophilic O-vinyl carbamates and O-vinyl carbonates monomers including: N-2-hydroxyethyl vinyl carbamate and N-carboxy-β-alanine N-vinyl ester. Further examples of the hydrophilic vinyl carbonate or vinyl carbamate monomers are disclosed in U.S. Pat. No. 5,070,215, and the hydrophilic oxazolone monomers are disclosed in U.S. Pat. No. 4,910,277.

Vinyl carbamates and carbonates, including N-2-hydroxyethyl vinyl carbamate, N-carboxy-β-alanine N-vinyl ester, other hydrophilic vinyl monomers, including vinylimidazole, ethylene glycol vinyl ether (EGVE), di(ethylene glycol) vinyl ether (DEGVE), allyl alcohol, 2-ethyl oxazoline, vinyl acetate, acrylonitrile, and mixtures thereof.

(Meth)acrylamide monomers may also be included as hydrophilic monomers. Examples include N—N-dimethylacrylamide, acrylamide, N,N-bis(2-hydroxyethyl)acrylamide, acrylonitrile, N-isopropyl acrylamide, N,N-dimethylaminopropyl(meth)acrylamide, and any of the hydroxyl functional (meth)acrylamides listed above.

The hydrophilic monomers which may be incorporated into the polymers disclosed herein may be selected from N,N-dimethyl acrylamide (DMA), 2-hydroxyethyl acrylamide, 2-hydroxyethyl methacrylamide, N-hydroxypropyl methacrylamide, bishydroxyethyl acrylamide, 2,3-dihydroxypropyl (meth)acrylamide, N-vinylpyrrolidone (NVP), N-vinyl-N-methyl acetamide, N-vinyl methacetamide (VMA), and polyethyleneglycol monomethacrylate.

The hydrophilic monomers may be selected from DMA, NVP, VMA, NVA, and mixtures thereof.

The hydrophilic monomers may be macromers of linear or branched poly(ethylene glycol), poly(propylene glycol), or statistically random or block copolymers of ethylene oxide and propylene oxide. The macromer of these polyethers has one reactive group. Non-limiting examples of such reactive groups are acrylates, methacrylates, styrenes, vinyl ethers, acrylamides, methacrylamides, and other vinyl compounds. The macromer of these polyethers may comprise acrylates, methacrylates, acrylamides, methacrylamides, and mixtures thereof. Other suitable hydrophilic monomers will be apparent to one skilled in the art.

The hydrophilic monomers may also comprise charged monomers including but not limited to acrylic acid, methacrylic acid, 3-acrylamidopropionic acid (ACA1), 4-acrylamidobutanoic acid, 5-acrylamidopentanoic acid (ACA2), 3-acrylamido-3-methylbutanoic acid (AMBA), N-vinyloxycarbonyl-α-alanine, N-vinyloxycarbonyl-β-alanine (VINAL), 2-vinyl-4,4-dimethyl-2-oxazolin-5-one (VDMO), reactive sulfonate salts, including, sodium-2-(acrylamido)-2-methylpropane sulphonate (AMPS), 3-sulphopropyl (meth)acrylate potassium salt, 3-sulphopropyl (meth)acrylate sodium salt, bis 3-sulphopropyl itaconate di sodium, bis 3-sulphopropyl itaconate di potassium, vinyl sulphonate sodium salt, vinyl sulphonate salt, styrene sulfonate, sulfoethyl methacrylate, combinations thereof and the like.

The hydrophilic monomers may be selected from N, N-dimethyl acrylamide (DMA), N-vinylpyrrolidone (NVP), 2-hydroxyethyl methacrylate (HEMA), N-vinyl methacetamide (VMA), and N-vinyl N-methyl acetamide (NVA), N-hydroxypropyl methacrylamide, mono-glycerol methacrylate, 2-hydroxyethyl acrylamide, 2-hydroxyethyl methacrylamide, bishydroxyethyl acrylamide, 2,3-dihydroxypropyl (meth)acrylamide and mixtures thereof.

The hydrophilic monomers may be selected from DMA, NVP, HEMA, VMA, NVA, and mixtures thereof.

The hydrophilic monomer(s) (including the hydroxyl alkyl monomers) may be present in amounts up to about 60 wt %, between about 1 to about 60 weight %, between about 5 to about 50 weight %, or about 5 to about 40 weight %, based upon the weight of all reactive components.

Other hydrophilic monomers that can be employed include polyoxyethylene polyols having one or more of the terminal hydroxyl groups replaced with a reactive group. Examples include polyethylene glycol with one or more of the terminal hydroxyl groups replaced with a reactive group. Examples include polyethylene glycol reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215, and the hydrophilic oxazolone monomers disclosed in U.S. Pat. No. 4,190,277. Other suitable hydrophilic monomers will be apparent to one skilled in the art.

Hydrophilic monomers which may be incorporated into the polymer compositions disclosed herein include hydrophilic monomers such as N,N-dimethyl acrylamide (DMA), 2-hydroxyethyl acrylate, glycerol methacrylate, 2-hydroxyethyl methacrylamide, N-vinylpyrrolidone (NVP), N-vinyl methacrylamide, HEMA, and poly(ethyleneglycol) methyl ether methacrylate (mPEG).

Hydrophilic monomers may include DMA, NVP, HEMA and mixtures thereof.

The first reactive composition and/or the second reactive composition may contain one or more independently selected ethylenically unsaturated zwitterionic compounds, such as an ethylenically unsaturated betaine. Preferably, the zwitterionic compound is in the second reactive composition. Examples of suitable compounds include: N-(2-carboxyethyl)-N,N-dimethyl-3-[(1-oxo-2-propen-1-yl)amino]-1-propanaminium, inner salt (CAS 79704-35-1, also known as 3-acrylamido-N-(2-carboxyethyl)-N,N-dimethylpropane-1-aminium or CBT); 3-methacrylamido-N-(2-carboxyethyl)-N,N-dimethylpropane-1-aminium; N,N-dimethyl-N-[3-[(1-oxo-2-propen-1-yl)amino]propyl]-3-sulfo-1-propanaminium, inner salt (CAS 80293-60-3, also known as 3-((3-acrylamidopropyl) dimethylammonio) propane-1-sulfonate or SBT); 3-((3-methacrylamidopropyl) dimethylammonio) propane-1-sulfonate; 3,5-Dioxa-8-aza-4-phosphaundec-10-en-1-aminium, 4-hydroxy-N,N,N-trimethyl-9-oxo, inner salt, 4-oxide (CAS 163674-35-9, "PBT"); 2-(acrylamidoethoxy)-(2-(trimethylammonio)ethyl) phosphate; 2-(methacrylamidoethoxy)-(2-(trimethylammonio) ethyl) phosphate; 4-hydroxy-N,N,N,10-tetramethyl-9-oxo-3,5,8-trioxa-4-phosphaundec-10-en-1-aminium inner salt, 4-oxide (CAS 67881-98-5, also known as 2-(methacryloyloxy)ethyl (2-(trimethylammonio)ethyl) phosphate or MPC); or 2-(acryloyloxy)ethyl (2-(trimethylammonio) ethyl) phosphate.

The first reactive composition and/or the second reactive composition may contain one or more independently selected ethylenically unsaturated quaternary ammonium salts. Preferably, the quaternary ammonium salt is in the second reactive composition. Examples of suitable compounds include 2-(methacryloyloxy)ethyl trimethylammonium chloride; 2-(acryloyloxy)ethyl trimethylammonium chloride; 3-methacrylamido-N,N,N-trimethylpropan-1-aminium chloride; or 3-acrylamido-N,N,N-trimethylpropan-1-aminium chloride The first reactive composition and/or the second reactive composition may contain one or more independently selected ethylenically unsaturated active pharmaceutical ingredients. Preferably, the active pharmaceutical compound is in the second reactive composition. Examples of suitable compounds include cyclosporine or salicylate monomers.

The first reactive composition and/or the second reactive composition may contain one or more independently selected ethylenically unsaturated peptides. Preferably, the peptide is in the second reactive composition. Exemplary compounds include, for instance, those wherein the amino-terminus of a peptide may be acylated with an acylating agent such as (meth)acryloyl chloride, (meth)acrylic anhydride, isopropenyl α,α-dimethylbenzyl isocyanate and 2-isocyanatoethyl methacrylate along with known co-reagents and catalysts to form a monomer suitable for incorporation into reactive compositions of the present inventions The first reactive composition of the invention contains a crosslinker. Crosslinkers may optionally be present in the second reactive composition. A variety of crosslinkers may be used, including silicone-containing and non-silicone containing cross-linking agents, and mixtures thereof. Examples of suitable crosslinkers include ethylene glycol dimethacrylate (EGDMA), diethyleneglycol dimethacrylate, trimethylolpropane trimethacrylate (TMPTMA), tetraethylene glycol dimethacrylate (TEGDMA), triallyl cyanurate (TAC), glycerol trimethacrylate, 1,3-propanediol dimethacrylate; 2,3-propanediol dimethacrylate; 1,6-hexanediol dimethacrylate; 1,4-butanediol dimethacrylate, methacryloxyethyl vinylcarbonate (HEMAVc), allylmethacrylate, methylene bisacrylamide (MBA), polyethylene glycol dimethacrylate (wherein the polyethylene glycol preferably has a molecular weight up to 5,000 Daltons). The crosslinkers are used in the typical amounts known to those skilled in the art, e.g., from about 0.000415 to about 0.0156 mole per 100 grams of reactive components in the reaction composition.

It should be noted that if the ethylenically unsaturated compound, such as a hydrophilic monomer or a silicone containing monomer, acts as the crosslinker, for instance by virtue of being bifunctional or multifunctional, the addition of a separate crosslinker to the reaction composition is optional. In this case, the ethylenically unsaturated compound is also considered a crosslinker. Examples of hydrophilic monomers which can act as the crosslinking agent and when present do not require the addition of an additional crosslinking agent to the reaction composition include polyoxyethylene polyols described above containing two or more terminal methacrylate moieties. An example of a silicone containing monomer which can act as a crosslinking agent and, when present, does not require the addition of a crosslinking monomer to the reaction composition includes α, ω-bismethacryloypropyl polydimethylsiloxane. In addition, any of the above disclosed multifunctional silicone-containing components may be used as cross-linking agents.

Either or both of the first and second reactive compositions may contain additional components such as, but not limited to, UV absorbers, photochromic compounds, pharmaceutical and nutraceutical compounds, antimicrobial compounds, reactive tints, pigments, copolymerizable and non-polymerizable dyes, release agents and combinations thereof. Other components that can be present in the first and/or second reactive compositions include wetting agents, such as those disclosed in U.S. Pat. No. 6,367,929, WO03/22321, WO03/22322, compatibilizing components, such as those disclosed in US2003/162862 and US2003/125498. The sum of additional components may be up to about 20 wt %. The reactive compositions may comprise up to about 18 wt % wetting agent, or between about 5 and about 18 wt % wetting agent.

As used herein, wetting agents are hydrophilic polymers having a weight average molecular weight greater than about 5,000 Daltons, between about 150,000 Daltons to about 2,000,000 Daltons; between about 300,000 Daltons to about 1,800,000 Daltons; or between about 500,000 Daltons to about 1,500,000 Daltons.

The amount of optional wetting agent which may be added to the reactive compositions of the present invention may be varied depending on the other components used and the desired properties of the resulting product. When present, the internal wetting agents in reactive compositions may be included in amounts from about 1 weight percent to about 20 weight percent; from about 2 weight percent to about 15 percent, or from about 2 to about 12 percent, all based upon the total weight of all of the reactive components.

Wetting agents include but are not limited to homopolymers, statistically random copolymers, diblock copolymers, triblock copolymers, segmented block copolymers, graft copolymers, and mixtures thereof. Non-limiting examples of internal wetting agents are polyamides, polyesters, polylactones, polyimides, polylactams, polyethers, polyacids homopolymers and copolymers prepared by the free radical polymerization of suitable monomers including acrylates, methacrylates, styrenes, vinyl ethers, acrylamides, methacrylamides, N-vinyllactams, N-vinylamides, O-vinylcarbamates, O-vinylcarbonates, and other vinyl compounds. The wetting agents may be made from any hydrophilic monomer, including those listed herein.

The wetting agents may include acyclic polyamides comprise pendant acyclic amide groups and are capable of association with hydroxyl groups. Cyclic polyamides comprise cyclic amide groups and are capable of association with hydroxyl groups.

Examples of suitable acyclic polyamides include polymers and copolymers comprising repeating units of Formula XXIX or Formula XXX:

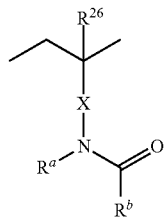

Formula XIX

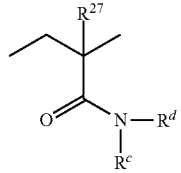

Formula XXX wherein X is a direct bond, —(CO)—, or —(CO)—NHR$^e$—, wherein R$^{26}$ and R$^{27}$ are H or methyl groups; wherein R$^e$ is a $C_1$ to $C_3$ alkyl group; R$^a$ is selected from H, straight or branched, substituted or unsubstituted $C_1$ to $C_4$ alkyl groups; R$^b$ is selected from H, straight or branched, substituted or unsubstituted $C_1$ to $C_4$ alkyl groups, amino groups having up to two carbon atoms, amide groups having up to four carbon atoms, and alkoxy groups having up to two carbon groups; R$^c$ is selected from H, straight or branched, substituted or unsubstituted $C_1$ to $C_4$ alkyl groups, or methyl, ethoxy, hydroxyethyl, and hydroxymethyl; R$^d$ is selected from H, straight or branched, substituted or unsubstituted $C_1$ to $C_4$ alkyl groups; or methyl, ethoxy, hydroxyethyl, and hydroxymethyl wherein the number of carbon atoms in R$^a$ and R$^b$ taken together is 8 or less, including 7, 6, 5, 4, 3, or less, and wherein the number of carbon atoms in R$^c$ and R$^d$ taken together is 8 or less, including 7, 6, 5, 4, 3, or less. The number of carbon atoms in R$^a$ and R$^b$ taken together may be 6 or less or 4 or less. The number of carbon atoms in R$^c$ and R$^d$ taken together may be 6 or less. As used herein substituted alkyl groups include alkyl groups substituted with an amine, amide, ether, hydroxyl, carbonyl, carboxy groups or combinations thereof.

R$^a$ and R$^b$ can be independently selected from H, substituted or unsubstituted $C_1$ to $C_2$ alkyl groups. X may be a direct bond, and R$^a$ and R$^b$ may be independently selected from H, substituted or unsubstituted $C_1$ to $C_2$ alkyl groups.

R$^c$ and R$^d$ can be independently selected from H, substituted or unsubstituted $C_1$ to $C_2$ alkyl groups, methyl, ethoxy, hydroxyethyl, and hydroxymethyl.

The acyclic polyamides of the present invention may comprise a majority of the repeating unit of Formula XXIX or Formula XXX, or the acyclic polyamides can comprise at least about 50 mole % of the repeating unit of Formula XXIX or Formula XXX; including at least about 70 mole %, and at least 80 mole %.

Specific examples of repeating units of Formula XXIX or Formula XXX include repeating units derived from N-vinyl-N-methylacetamide, N-vinylacetamide, N-vinyl-N-methyl-propionamide, N-vinyl-N-methyl-2-methylpropionamide, N-vinyl-2-methylpropionamide, N-vinyl-N,N'-dimethylurea, N,N-dimethylacrylamide, methacrylamide and acyclic amides of Formulae XXXI and XXXII:

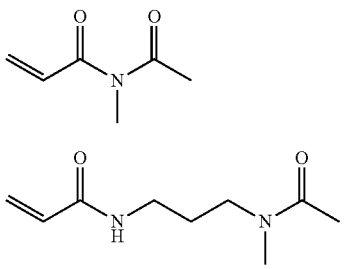

Formula XXXI

Formula XXXII

Examples of suitable cyclic amides that can be used to form the cyclic polyamides of include α-lactam, β-lactam, γ-lactam, δ-lactam, and ϵ-lactam. Examples of suitable cyclic polyamides include polymers and copolymers comprising repeating units of Formula XXXIII:

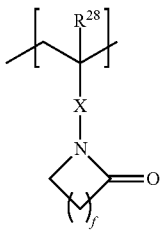

Formula XXXIII wherein f is a number from 1 to 10, X is a direct bond, —(CO)—, or —(CO)—NH—$R^e$—, wherein $R^e$ is a $C_1$ to $C_3$ alkyl group and $R^{28}$ is a hydrogen atom or methyl group. In Formula XXXIII, f may be 8 or less, including 7, 6, 5, 4, 3, 2, or 1. In Formula XXXIII, f may be 6 or less, including 5, 4, 3, 2, or 1, or may be from 2 to 8, including 2, 3, 4, 5, 6, 7, or 8, or may be 2 or 3.

When X is a direct bond, f may be 2. In such instances, the cyclic polyamide may be polyvinylpyrrolidone (PVP).

The cyclic polyamides may comprise 50 mole % or more of the repeating unit of Formula XXXIII, or the cyclic polyamides can comprise at least about 50 mole % of the repeating unit of Formula XXXIII, including at least about 70 mole %, and at least about 80 mole %.

Specific examples of repeating units of Formula XXXIII include repeating units derived from N-vinylpyrrolidone, which forms PVP homopolymers and vinylpyrrolidone copolymers or N-vinylpyrrolidone substituted with hydrophilic substituents such as phosphoryl choline.

The polyamides may also be copolymers comprising cyclic amide, acyclic amide repeating units or copolymers comprising both cyclic and acyclic amide repeating units. Additional repeating units may be formed from monomers selected from hydroxyalkyl(meth)acrylates, alkyl(meth)acrylates or other hydrophilic monomers and siloxane substituted acrylates or methacrylates. Any of the monomers listed as suitable hydrophilic monomers may be used as comonomers to form the additional repeating units. Specific examples of additional monomers which may be used to form polyamides include 2-hydroxyethylmethacrylate, vinyl acetate, acrylonitrile, hydroxypropyl methacrylate, 2-hydroxyethyl acrylate, methyl methacrylate and hydroxybutyl methacrylate, GMMA, PEGS, and the like and mixtures thereof. Ionic monomers may also be included. Examples of ionic monomers include acrylic acid, methacrylic acid, 2-methacryloyloxyethyl phosphorylcholine, 3-(dimethyl(4-vinylbenzyl)ammonio)propane-1-sulfonate (DMVBAPS), 3-((3-acrylamidopropyl)dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), methacryloyloxy)propyl) dimethylammonio)propane-1-sulfonate (MAPDAPS).

The reactive composition may comprise both an acyclic polyamide and a cyclic polyamide or copolymers thereof. The acyclic polyamide can be any of those acyclic polyamides described herein or copolymers thereof, and the cyclic polyamide can be any of those cyclic polyamides described herein or copolymers thereof. The polyamide may be selected from the group polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof.

The wetting agents may be made from DMA, NVP, HEMA, VMA, NVA, and combinations thereof. The wetting agents may also be reactive components, as defined herein, by having reactive groups, for example, made by the acylation reaction between pendant hydroxyl groups on HEMA repeating units of an internal wetting agent and methacryloyl chloride or methacryloyl anhydride. Other methods of functionalization will be apparent to one skilled in the art.

Such internal wetting agents are disclosed in U.S. Pat. Nos. 6,367,929, 6,822,016, 7,052,131, 7,666,921, 7,691,916, 7,786,185, 8,022,158, and 8,450,387.

Generally, the reactive components within a reactive composition may be dispersed or dissolved in a diluent. Suitable diluents are known in the art or can be easily determined by a person of ordinary skill in the art. For example, when silicone hydrogels are being prepared, suitable diluents are disclosed in WO 03/022321 and U.S. Pat. No. 6,020,445 the disclosures of which are incorporated herein by reference.

Classes of suitable diluents for silicone hydrogel reaction mixtures include alcohols having 2 to 20 carbons, amides having 10 to 20 carbon atoms derived from primary amines and carboxylic acids having 8 to 20 carbon atoms. Primary and tertiary alcohols are preferred. Preferred classes include alcohols having 5 to 20 carbons and carboxylic acids having 10 to 20 carbon atoms.

Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy)propylbis(trimethylsiloxy) methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino)ethanol mixtures thereof and the like.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like.

Suitable diluents for non-silicone containing reaction compositions include glycerin, ethylene glycol, ethanol, methanol, ethyl acetate, methylene chloride, polyethylene glycol, polypropylene glycol, low number average molecular weight polyvinylpyrrolidone (PVP), such as disclosed in U.S. Pat. Nos. 4,018,853, 4,680,336 and 5,039,459, including, but not limited to boric acid esters of dihydric alcohols, combinations thereof and the like.

Mixtures of diluents may be used. The diluents may be used in amounts up to about 55% by weight of the total of all components in the reactive composition. More preferably the diluent is used in amounts less than about 45% and more preferably in amounts between about 15 and about 40% by weight of the total of all components in the reactive composition.

The polymer compositions described above may be used in a wide variety of fields. A preferred use is in medical devices. Thus, in a preferred embodiment, the invention provides a medical device comprising a polymer composition, wherein the polymer composition is prepared as described above. Preferred medical devices are ophthalmic devices, such as contact lenses, intraocular lenses, punctal plugs and ocular inserts. Particularly preferred are contact lenses.

In some embodiments, well suited for ophthalmic devices and contact lenses, the polymer composition is a hydrogel.

The polymer composition may be a hydrogel and the first reactive composition may contain one or more silicone containing components. Exemplary silicone containing components include the compounds disclosed above, or mixtures thereof. Preferred silicone containing components include compounds of formula VIa (preferably Formula V), Formula XXc (preferably Formula XXg or SiMAA), or mixtures of thereof. The polymer composition may also contain a hydrophilic component. Preferred hydrophilic components include acrylic containing hydrophilic components, such as N,N-dimethylacrylamide (DMA), 2-hydroxyethyl (meth)acrylate, and mixtures thereof. The polymer composition may contain a wetting agent. Preferred wetting agents include polyamides, such those selected from polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof.

The polymer composition may be a hydrogel and the first reactive composition may contain one or more hydrophilic components. Exemplary hydrophilic components include acrylic containing hydrophilic components and vinyl-containing monomers, such as N,N-dimethylacrylamide (DMA), 2-hydroxyethyl (meth)acrylate, glycerol methacrylate, 2-hydroxyethyl methacrylamide, polyethyleneglycol monomethacrylate, methacrylic acid, acrylic acid, N-vinylpyrrolidone (NVP), N-vinyl methacrylamide, or mixtures thereof. Preferred hydrophilic compounds include 2-hydroxyethyl methacrylate, methacrylic acid, or mixtures thereof. The first reactive composition may be free of silicone containing components.

The polymer composition may be a hydrogel and the second reactive composition may contain one or more silicone containing components. Exemplary silicone containing components include the compounds disclosed above, or mixtures thereof. Preferred silicone containing components include compounds of formula VIa (preferably mPDMS), Formula XXc (preferably SiMAA), or mixtures of thereof. The polymer composition may also contain a hydrophilic component. Preferred hydrophilic components include acrylic containing hydrophilic components, such as N,N-dimethylacrylamide (DMA), 2-hydroxyethyl (meth) acrylate, and mixtures thereof. The polymer composition may contain a wetting agent. Preferred wetting agents include polyamides, such those selected from polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof.

The polymer composition may be a hydrogel and the second reactive composition may contain one or more hydrophilic components. Exemplary hydrophilic components include acrylic containing hydrophilic components and vinyl-containing monomers, such as N,N-dimethylacrylamide (DMA), 2-hydroxyethyl (meth)acrylate, glycerol methacrylate, 2-hydroxyethyl methacrylamide, polyethyleneglycol monomethacrylate, methacrylic acid, acrylic acid, N-vinylpyrrolidone (NVP), N-vinyl methacrylamide, or mixtures thereof. Preferred hydrophilic compounds include 2-hydroxyethyl methacrylate, methacrylic acid, or mixtures thereof. The second reactive composition may be free of silicone containing components.

The polymer composition may be a hydrogel and the ethylenically unsaturated compounds of the first reactive composition and the second reactive composition may be independently selected from: a (meth)acrylate monomer, a (meth)acrylic acid monomer, a silicone containing component, and mixtures of two or more thereof. Preferred reactive components for the second reactive composition of this embodiment may include MPC, 2-hydroxyethyl methacrylate, or a mixture of 2-hydroxyethyl methacrylate and methacrylic acid.

The polymer composition may be a hydrogel and the ethylenically unsaturated compounds of the first reactive composition and the second reactive composition may be independently selected from: a silicone containing component, a (meth)acrylate monomer, a (meth)acrylic acid monomer, an ethylenically unsaturated betaine, a (meth)acrylamide, an ethylenically unsaturated polyethylene glycol, an N-vinyl monomer, an ethylenically unsaturated amino acid, and mixtures of two or more thereof.

The crosslinked substrate network may be a silicone hydrogel (containing MAPO groups) and the second reactive composition may provide, following polymerization, a hydrophilic grafted material (which may optionally be charged), for instance comprising poly(N,N-dimethylacrylamide) (PDMA), polymerized polyethylene glycol monomethacrylate, (poly(mPEG)), or a copolymer of 2-hydroxyethyl methacrylate and methacrylic acid. Such grafted polymer networks may exhibit improved biocompatibility and biometrics, for instance when used in ophthalmic devices.

The crosslinked substrate network may be a conventional hydrogel (e.g., comprising a copolymer of 2-hydroxyethyl methacrylate and methacrylic acid and containing MAPO groups) and the second reactive composition provides, following polymerization, a hydrophilic grafted material (which may optionally be charged), such as a polyamide. Examples include PDMA, polyvinylpyrrolidone (PVP), poly(N-vinyl N-methyl acetamide) (PVMA), and copolymers thereof. Such grafted polymer networks may exhibit improved biocompatibility and biometrics, for instance when used in ophthalmic devices.

The crosslinked substrate network may be a conventional hydrogel (e.g., a copolymer of 2-hydroxyethyl methacrylate and methacrylic acid and containing MAPO groups) and the second reactive composition provides, following polymerization, a hydrophobic siloxane containing material. Such grafted polymeric networks may exhibit desirable physical and mechanical properties, such as oxygen gas permeability (Dk) and modulus, as well as improved biocompatibility and handling.

For ophthalmic devices, such as contact lenses, that contain one or more silicone containing component, the silicone-containing component(s) may preferably be present in amounts up to about 95 weight %, or from about 10 to about 80, or from about 20 to about 70 weight %, based upon all reactive components present, including in the first reactive composition and the reactive second composition. Suitable hydrophilic components may preferably be present in amounts from about 10 to about 60 weight %, or from about 15 to about 50 weight %, or from about 20 to about 40 weight %, based upon all reactive components present, including in the first reactive composition and the second reactive composition.

It should be noted that additional, optional, steps may be included in the process for making the polymer compositions of the invention. For instance, following step (b), an ink or dye may be added to the crosslinked substrate network. Then, the remaining steps (step (c) etc.) may be carried out. This allows for an ink or dye to be sandwiched within the grafted polymeric network.

For ophthalmic devices, such as contact lenses, the crosslinked substrate network is preferably a silicone hydrogel with a balance of properties that makes them useful. These properties include water content, haze, contact angle, modulus, oxygen permeability, lipid uptake, lysozyme uptake and PQ1 uptake. Examples of preferred properties are as follows. All values are prefaced by "about," and the ophthalmic devices may have any combination of the listed properties:

[$H_2O$] %: at least 20%, or at least 25%
Haze: 30% or less, or 10% or less
DCA (°): 100° or less, or 50° or less
Modulus (psi): 120 or less, or 80 to 120
Dk (barrers): at least 80, or at least 100, or at least 150, or at least 200
Elongation to Break: at least 100

For ionic silicon hydrogels, the following properties may also be preferred (in addition to those recited above):

Lysozyme uptake (μg/lens): at least 100, or at least 150, or at least 500, or at least 700
PQ1 uptake (%): 15 or less, or 10 or less, or 5 or less Finished ophthalmic devices may be manufactured by various techniques. For instance, in the case of hydrogel contact lenses, the first reactive composition described above may be cured in a mold, or formed via spincasting or static casting. Spincasting methods are disclosed in U.S. Pat. Nos. 3,408,429 and 3,660,545, and static casting methods are disclosed in U.S. Pat. Nos. 4,113,224 and 4,197,266. In one embodiment, the contact lenses of this invention are formed by the direct molding of the hydrogels, which is economical, and enables precise control over the final shape of the hydrated contact lens. For this method, the first reactive composition is placed in a mold having the desired shape and the reactive composition is subjected to conditions as described above whereby the reactive components polymerize to produce the crosslinked substrate network in the approximate shape of the final desired product.

The crosslinked substrate network formed after such curing may be subjected to extraction to remove unreacted components and release the crosslinked substrate network from the contact lens mold. The crosslinked substrate network may then be immersed in the second reactive composition (which may optionally contain a diluent), and sufficient time is allowed to permit at least a portion of the reactive composition to diffuse into the crosslinked substrate network. Thereafter, the suspension is irradiated to form the grafted polymeric network, and the contact lenses may then be extracted to remove unreacted components.

Extractions of the crosslinked substrate network and the contact lens may be done using conventional extraction fluids, such organic solvents, such as alcohols or may be extracted using aqueous solutions. Aqueous solutions are solutions which comprise water. The aqueous solutions may comprise at least about 30 weight % water, or at least about 50 weight % water, or at least about 70% water or at least about 90 weight % water.

Extraction may be accomplished, for example, via immersion of the crosslinked substrate network or the contact lens in an aqueous solution or exposing the material to a flow of an aqueous solution. Extraction may also include, for example, one or more of: heating the aqueous solution; stirring the aqueous solution; increasing the level of release aid in the aqueous solution to a level sufficient to cause release of the crosslinked substrate network from the mold; mechanical or ultrasonic agitation; and incorporating at least one leach aid in the aqueous solution to a level sufficient to facilitate adequate removal of unreacted components from the crosslinked substrate network or the contact lens. The foregoing may be conducted in batch or continuous processes, with or without the addition of heat, agitation or both.

Some embodiments may also include the application of physical agitation to facilitate leach and release. For example, the crosslinked substrate network mold part to which the crosslinked substrate network is adhered may be vibrated or caused to move back and forth within an aqueous solution. Other embodiments may include ultrasonic waves through the aqueous solution.

Contact lenses may be sterilized by known means such as, but not limited to, autoclaving.

Some embodiments of the invention will now be described in detail in the following Examples.

EXAMPLES

The contact lens diameter (DM) was measured on a calibrated Van Keuren micro optical comparator equipment equipped with Mitutoyo digimatic micrometer heads. The contact lens was placed concave side down into a crystal cell completely filled with borate buffered packing solution. A cap was placed onto the cell ensuring that no air is trapped underneath. The cell was then placed on the comparator stage and the lens image brought into focus and aligned so that one edge of the lens touched the center line on the screen. The first edge was marked, the lens moved along its diameter until the second edge is touching the center line on the screen, and then, the second edge is marked by pushing the data button again. Typically, two diameter measurements are made and the average reported in the data tables.

Water content (WC) was measured gravimetrically. Lenses were equilibrated in packing solution for 24 hours. Each of three test lens are removed from packing solution using a sponge tipped swab and placed on blotting wipes which have been dampened with packing solution. Both sides of the lens are contacted with the wipe. Using tweezers, the test lens are placed in a tared weighing pan and weighed. The two more sets of samples are prepared and weighed. All weight measurements were done in triplicate, and the average of those values used in the calculations. The wet weight is defined as the combined weight of the pan and wet lenses minus the weight of the weighing pan alone.

The dry weight was measured by placing the sample pans in a vacuum oven which has been preheated to 60° C. for 30 minutes. Vacuum was applied until the pressure reaches at least 1 inch of Hg is attained; lower pressures are allowed. The vacuum valve and pump are turned off and the lenses are dried for at least 12 hours, typically overnight. The purge valve is opened allowing dry air or dry nitrogen gas to enter. The oven is allowed reach atmospheric pressure. The pans are removed and weighed. The dry weight is defined as the combined weight of the pan and dry lenses minus the weight of the weighing pan alone. The water content of the test lens was calculated as follows: % water content=(wet weight−dry weight)/wet weight×100. The average and standard deviation of the water content were calculated and the average value reported as the percent water content of the test lens.

The grafted lens weight gain was calculated from the average dry weight of the grafted lens minus the average dry weight of the substrate lens and expressed as a percentage. Both the grafted lens and the substrate lens were equilibrated in deionized water for several hours to remove any residual salts. Typically, at least three lenses are weighed and averaged for each sample.

The refractive index (RI) of a contact lens was measured by a Leica ARIAS 500 Abbe refractometer in manual mode or by a Reichert ARIAS 500 Abbe refractometer in automatic mode with a prism gap distance of 100 microns. The instrument was calibrated using deionized water at 20° C. (+/−0.2° C.). The prism assembly was opened and the test lens placed on the lower prism between the magnetic dots closest to the light source. If the prism is dry, a few drops of saline were applied to the bottom prism. The front curve of the lens was against the bottom prism. The prism assembly was then closed. After adjusting the controls so that the shadow line appeared in the reticle field, the refractive index was measured. The RI measurement was made on five test lenses. The average RI calculated from the five measurements was recorded as the refractive index as well as its standard deviation.

Oxygen permeability (Dk) was determined by the polarographic method generally described in ISO 9913-1:1996 and ISO 18369-4:2006, but with the following modifications. The measurement was conducted at an environment containing 2.1% oxygen created by equipping the test chamber with nitrogen and air inputs set at the appropriate ratio, for example, 1800 mL/min of nitrogen and 200 mL/min of air. The t/Dk is calculated using the adjusted oxygen concentration. Borate buffered saline was used. The dark current was measured by using a pure humidified nitrogen environment instead of applying MMA lenses. The lenses were not blotted before measuring. Four lenses were stacked instead of using lenses of various thickness (t) measured in centimeters. A curved sensor was used in place of a flat sensor; radius was 7.8 mm. The calculations for a 7.8 mm radius sensor and 10% (v/v) air flow are as follows:

$Dk/t$=(measured current−dark current)×(2.97×10-8 mL O2/(μA-sec-cm2-mm Hg)

The edge correction was related to the Dk of the material. For all Dk values less than 90 barrers:

$t/Dk$(edge corrected)=[1+(5.88×$t$)]×($t/Dk$)

For Dk values between 90 and 300 barrers:

$t/Dk$(edge corrected)=[1+(3.56×$t$)]×($t/Dk$)

For Dk values greater than 300 barrers:

$t/Dk$(edge corrected)=[1+(3.16×$t$)]×($t/Dk$)

Non-edge corrected Dk was calculated from the reciprocal of the slope obtained from the linear regression analysis of the data wherein the x variable was the center thickness in centimeters and the y variable was the t/Dk value. On the other hand, edge corrected Dk (EC Dk) was calculated from the reciprocal of the slope obtained from the linear regression analysis of the data wherein the x variable was the center thickness in centimeters and the y variable was the edge corrected t/Dk value. The resulting Dk value was reported in barrers.

Wettability of lenses was determined by a modified Wilhelmy plate method using a calibrated Kruss K100 tensiometer at room temperature (23±4° C.) and using surfactant free borate buffered saline as the probe solution. All equipment must be clean and dry; vibrations must be minimal around the instrument during testing. Wettability is usually reported as the advancing contact angle (Kruss DCA). The tensiometer was equipped with a humidity generator, and a temperature and humidity gage was placed in the tensiometer chamber. The relative humidity was maintained at 70±5%. The experiment was performed by dipping the lens specimen of known perimeter into the packing solution of known surface tension while measuring the force exerted on the sample due to wetting by a sensitive balance. The advancing contact angle of the packing solution on the lens is determined from the force data collected during sample dipping. The receding contact angle is determined from force data while withdrawing the sample from the liquid. The Wilhelmy plate method is based on the following formula: Fg=γρ cos θ−B, wherein F=the wetting force between the liquid and the lens (mg), g=gravitational acceleration (980.665 cm/see), γ=surface tension of probe liquid (dyne/cm), ρ=the perimeter of the contact lens at the liquid/lens meniscus (cm), θ=the dynamic contact angle (degree), and B=buoyancy (mg). B is zero at the zero depth of immersion. Typically, a test strip was cut from the central area of the contact lens. Each strip was approximately 5 mm in width and 14 mm in length, attached to a metallic clip using plastic tweezers, pierced with a metallic wire hook, and equilibrated in packing solution for at least 3 hours. Then, each sample was cycled four times, and the results were averaged to obtain the advancing and receding contact angles of the lens. Typical measuring speeds were 12 mm/min. Samples were kept completely immersed in packing solution during the data acquisition and analysis without touching the metal clip. Values from five individual lenses were averaged to obtain the reported advancing and receding contact angles of the experimental lens.

Wettability of lenses was determined using a sessile drop technique using KRUSS DSA-100™ instrument at room temperature and using deionized water as probe solution (Sessile Drop). The lenses to be tested were rinsed in deionized water to remove carry over from packing solution. Each test lens was placed on blotting lint free wipes which were dampened with packing solution. Both sides of the lens were contacted with the wipe to remove surface water without drying the lens. To ensure proper flattening, lenses were placed "bowl side down" on the convex surface of contact lens plastic molds. The plastic mold and the lens were placed in the sessile drop instrument holder, ensuring proper central syringe alignment. A 3 to 4 microliter drop of deionized water was formed on the syringe tip using DSA 100-Drop Shape Analysis software ensuring the liquid drop was hanging away from the lens. The drop was released smoothly on the lens surface by moving the needle down. The needle was withdrawn away immediately after dispensing the drop. The liquid drop was allowed to equilibrate on the lens for 5 to 10 seconds, and the contact angle was measured between the drop image and the lens surface. Typically, three to five lenses were evaluated and the average contact angle reported.

The mechanical properties of the contact lenses were measured by using a tensile testing machine such as an Instron model 1122 or 5542 equipped with a load cell and pneumatic grip controls. Minus one diopter lens is the preferred lens geometry because of its central uniform thickness profile. A dog-bone shaped sample cut from a −1.00 power lens having a 0.522 inch length, 0.276 inch "ear" width and 0.213 inch "neck" width was loaded into the grips and elongated at a constant rate of strain of 2 inches per minute until it breaks. The center thickness of the dog-bone sample was measured using an electronic thickness gauge prior to testing. The initial gauge length of the sample (Lo) and sample length at break (Lf) were measured. At least five specimens of each composition were measured, and the average values were used to calculate the percent elongation to break: percent elongation=[(Lf−Lo)/Lo]×100. The tensile modulus (M) was calculated as the slope of the initial linear portion of the stress-strain curve; the units of modulus are pounds per square inch or psi. The tensile strength (TS) was calculated from the peak load and the original cross-sectional area: tensile strength=peak load divided by the original cross-sectional area; the units of tensile strength are psi. Toughness was calculated from the energy to break and the original volume of the sample: toughness=energy to break divided by the original sample volume; the units of toughness are in-lbs/in3. The elongation to break (ETB) was also recorded as the percent strain at break.

PQ1 uptake (PQ1) was measured chromatographically. The HPLC was calibrated using a series of standard PQ1 solutions having concentrations 2, 4, 6, 8, 12 and 15 µg/mL. Lenses were placed into polypropylene contact lens cases with 3 mL of Optifree Replenish or similar lens solution (PQ1 concentration=10 micrograms/mL) which is commercially available from Alcon. A control lens case, containing 3 mL of solution, but no contact lens was also prepared. The lenses and control solutions were stored at room temperature for 72 hours. 1 mL of solution was removed from each of the samples and controls and mixed with trifluoroacetic acid (10 µL). The analysis was conducted using HPLC/ELSD and a Phenomenex Luna C5 (4.6 mm×5 mm; 5 µm particle size) column with the following equipment and conditions: Agilent 1200 HPLC or equivalent with an ELSD operating at T=100° C., Gain=12, Pressure=4.4 bar, Filter=3 s; ELSD parameters may vary from instrument to instrument; using mobile phase A of water (0.1% TFA) and mobile phase B of acetonitrile (0.1% TFA), a column temperature of 40° C. and an injection volume of 100 µL. An elution profile was used and listed in Table C. A calibration curve was created by plotting the peak area value as a function of the concentration of the PQ1 standard solutions. The concentration of PQ1 in a sample was then calculated by solving the quadratic equation representing the calibration curve. Three lenses were run for each analysis, and the results were averaged. PQ1 uptake was reported as the percentage loss of PQ1 after soak with lens compared to the PQ1 present in the control without lens.

TABLE C

HPLC Elution Profile

| Time (minutes) | % A | % B | Flow Rate (mL/min) |
|---|---|---|---|
| 0.00 | 100 | 0 | 1.2 |
| 1.00 | 100 | 0 | 1.2 |
| 5.00 | 0 | 100 | 1.2 |
| 8.50 | 0 | 100 | 1.2 |
| 8.60 | 100 | 0 | 1.2 |
| 11.00 | 100 | 0 | 1.2 |

The amount of cholesterol absorbed by a contact lens was determined by a LC-MS method (lipids). Lenses were soaked in a cholesterol solution and then extracted with dichloromethane. The dichloromethane extract was evaporated and reconstituted with a heptane/isopropanol mixture with subsequent analysis by LC-MS. The results were reported as micrograms of cholesterol per lens. A deuterated cholesterol internal standard was used to improve accuracy and precision of the method.

A cholesterol stock solution was prepared by placing 15.0±0.5 milligrams of cholesterol into a wide-mouth 10 mL glass volumetric flask followed by dilution with isopropanol.

A cholesterol soak solution was prepared by placing 0.430±0.010 grams of lysozyme (purity=93%), 0.200±0.010 grams of albumin, and 0.100±0.010 grams of β-lactoglobulin into a 200 mL glass volumetric flask, adding approximately 190 milliliters of PBS to the flask, and swirling to dissolve the contents. 2 Milliliters of the cholesterol stock solution was then added and diluted to volume with PBS. The volumetric flask was capped and shaken well. The concentration of the cholesterol soak solution was approximately 15 µg/mL. Note: The mass of these components may be adjusted to account for lot-to-lot purity variability so that the target concentrations can be achieved.

Six contact lenses were removed from their packages and blotted with lint-free paper towels to remove excess packing solution. The lenses were placed into six separate 8 mL glass vials (one lens per vial), and 3.0 mL of the cholesterol soak solution was added to each vial. The vials were capped and placed into a New Brunswick Scientific incubator-shaker for 72 hours at 37° C. and 100 rpm. After incubation, each lens was rinsed three times with PBS in 100 mL beakers and placed into a 20-mL scintillation vial.

To each lens-containing scintillation vial, 5 mL of dichloromethane and 100 µL of the internal standard solution were added. After a minimum of 16 hours of extraction time, the supernatant liquid was transferred into a 5 mL disposable glass culture tube. The tube was placed into the Turbovap and the solvent completely evaporated. Place 1 mL of the diluent into the culture tube and re-dissolve the contents. The aforementioned diluent was a 70:30 (v/v) mixture of heptane and isopropanol. The diluent was also the mobile phase. The resulting solution was carefully transferred into an autosampler vial and ready for LC-MS analysis.

An internal standard stock solution was prepared by weighing approximately 12.5+2 mg of deuterated cholesterol (2,2,3,4,4,6-$d_6$-cholesterol) in a 25 mL volumetric flask followed by dilution with the diluent. The concentration of the internal standard stock solution was approximately 500 µg/mL.

An internal standard solution was prepared by placing 1.0 mL of the internal standard stock solution in a 50 mL volumetric flask followed by dilution to volume with diluent. The concentration of this intermediate internal standard solution is approximately 10 µg/mL.

A reference standard stock solution was prepared by weighing approximately 50+5 mg of cholesterol in a 100 mL volumetric flask followed by dilution with diluent. The concentration of the cholesterol in this reference stock solution is approximately 500 µg/mL. Working standard solutions were then made according to Table D by placing the appropriate amount of standard solutions into the listed 25 mL, 50 mL or 100 mL volumetric flasks. After the standard solutions were added to the volumetric flasks, the mixture was diluted to volume with diluent and swirled well.

TABLE D

Working Standard Solution Formulations

| Working Standard Name | Volume of Internal Standard Solution (mL) | Volume of Reference Standard Stock Solution (µL) | Final Volume (mL) | Approximate Cholesterol Concentration (µg/mL) |
|---|---|---|---|---|
| Std 1 | 10 | 20 | 100 | 0.10 |
| Std 2 | 5 | 25 | 50 | 0.25 |
| Std 3 | 5 | 50 | 50 | 0.50 |
| Std 4 | 5 | 100 | 50 | 1.00 |
| Std 5 | 2.5 | 125 | 25 | 2.50 |
| Std 6 | 2.5 | 250 | 25 | 5.00 |

The following LC-MS analysis was performed: Make 6 injections of the "Std4" to evaluate system suitability. The RSD % of the peak areas for the working standards and the internal standards must be <5% and RSD (%) of their peak area ratios must be <7% to pass system suitability. Inject working standards 1-6 to create a calibration curve. The square of the correlation coefficient ($r^2$) must be >0.99. Inject test samples followed by a bracketing standard (Std4). The peak area ratio of the bracketing standard must be within ±10% of the averaged peak area ratio from the system suitability injections.

A calibration curve was constructed by plotting the peak area ratio (reference std/internal std) value that corresponds to the concentration of each working standard solution. The concentration of cholesterol in sample is calculated by solving a quadratic equation. Typical equipment and their settings for the LC-MS analysis are listed below and shown in Tables E and F. The values for the instrument tune parameters may change each time the mass spectrometer is tuned.

Turbovap Conditions:
Temperature: 45° C.
Time: 30 minutes or more to dryness
Gas: nitrogen @ 5 psi
HPLC Conditions:
HPLC: Thermo Accela HPLC Instrument or equivalent
HPLC Column: Agilent Zorbax NH2 (4.6 mm×150 mm; 5 µm particle size)
Mobile Phase: 70% heptane and 30% isopropanol
Column Temperature: 30° C.
Injection Volume: 25 µL
Flow Rate: 1000 µL/min

TABLE E

Mass Spectrometry Conditions
Thermo Finnigan TSQ Quantum Ultra

| MS Settings | Value |
|---|---|
| Ionization | APCI |
| Polarity | Positive |
| Scan type | SIM |
| APCI probe position | D |
| Mass (m/z) of Reference Standards | 369.2 |
| Mass (m/z) of Internal Standards | 375.3 |
| Mass width (m/z) | 1.0 |
| Scan time (s) | 0.10 |
| Data type | centroid |
| Peak Width Q3 (FWHM) | 0.40 |
| Skimmer Offset (V) | 10 |

TABLE F

Tune Parameters

| Instrument Tune Parameters | Value |
|---|---|
| Discharge Current (arbitrary units): | 20 |
| Capillary temperature (° C.): | 240 |
| Vaporizer Temperature (° C.): | 500 |
| Tube lens offset (V): | 68 |
| Sheath gas pressure (arbitrary units): | 20 |
| Auxiliary gas flow (arbitrary units): | 15 |

The amount of lysozyme uptake by a contact lens was measured by a HPLC-UV method. Lysozyme uptake was determined as the difference of lysozyme content in phosphate-buffered saline solution (PBS) before contact lenses are immersed and the concentration in the test solution after 72 hours of lens immersion at 37° C.

A lysozyme soak solution was prepared by placing 0.215±0.005 grams of lysozyme (purity=93%) into a 100 mL volumetric flask followed by adding 50 mL of PBS to dissolve the lysozyme by swirling followed by dilution to volume with PBS. The resulting lysozyme soak solution was filtered/sterilized using a Millipore Stericup filtration device. The concentration of the lysozyme soak solution is approximately 2000 µg/mL. The mass of lysozyme may be adjusted to account for lot-to-lot purity variability so that a 2000 µg/mL concentration can be achieved.

Three contact lenses were removed from their packages and blotted with lint-free paper towel to remove excess packing solution. The lenses were placed into three separate 8 mL glass vials (one lens per vial). 1.5 mL of the lysozyme soak solution was added to each vial. The vials were capped and inspected to ensure each lens was completely immersed in the soak solution. As control samples, 1.5 mL of lysozyme soak solution were added into three separate 8 mL glass vials. The samples were then incubated on a New Brunswick Scientific incubator-shaker for 72 hours at 37° C. and 100 rpm.

A diluent was prepared by mixing 900 mL water, 100 mL acetonitrile and 1 mL trifluoroacetic acid into a 1 L glass bottle.

A lysozyme stock solution was prepared by placing 0.240±0.010 grams of lysozyme (purity=93%) into a 100 mL volumetric flask followed by dilution to volume with diluent. The concentration of the lysozyme stock solution is approximately 2200 µg/mL.

As shown in Table G, a series of working standard solutions was prepared by mixing the appropriate amounts of lysozyme stock solution with diluent using 5 mL volumetric flasks.

TABLE G

Working Standards

| Working Standard Name | Volume of Stock Solution (mL) | Final Volume (mL) | Approximate Lysozyme Concentration (μg/mL) |
|---|---|---|---|
| Std 1 | 1.135 | 5 | 500 |
| Std 2 | 1.815 | 5 | 800 |
| Std 3 | 2.725 | 5 | 1200 |
| Std 4 | 3.635 | 5 | 1600 |
| Std 5 | 4.540 | 5 | 2000 |
| Std 6 (stock) | — | — | 2200 |

A 10% (v/v) solution was prepared by adding 1 mL of trifluoroacetic acid into a 10 mL glass volumetric flask followed by dilution with HPLC water. Samples for HPLC-UV analysis were prepared as follows: (1) by placing 1000 μL of test sample and 10 μL of the 10% TFA solution into an autosampler vial or (2) by placing 1000 μL of reference standard and 10 μL of reference standard diluent into an autosampler vial.

The analysis involved the following steps: Perform 6 injections of the "Std4" to evaluate system suitability. The RSD % of the peak areas and retention times must be <0.5% to pass system suitability. Inject working standards 1-6 to create a calibration curve. The square of the correlation coefficient ($r^2$) must be >0.99. Inject test samples followed by a bracketing standard (Std4). The peak area of the bracketing standard must be ±1% of the averaged peak areas from the system suitability injections.

A calibration curve was constructed by plotting the peak area value that corresponds to the concentration of each lysozyme working standard solution. The concentration of lysozyme in the test samples was calculated by solving a linear equation. Typical equipment and their settings are listed below or shown in Table H.

Instrument: Agilent 1200 HPLC with UV detection (or equivalent HPLC-UV)
   Detection: UV @ 280 nm (5 nm bandwidth)
   HPLC Column: Phenomenex Luna C5 (50×4.6 mm) or Agilent PLRP-S (50×4.6 mm)
   Mobile Phase A: $H_2O$ (0.1% TFA)
   Mobile Phase B: Acetonitrile (0.1% TFA)
   Column Temperature: 40° C.
   Injection Volume: 10 μL

TABLE H

HPLC Run Conditions

| Time (minutes) | % A | % B | Flow Rate (mL/min) |
|---|---|---|---|
| 0.0 | 95 | 5 | 1.2 |
| 4.0 | 5 | 95 | 1.2 |
| 4.1 | 95 | 5 | 1.2 |
| 6.5 | 95 | 5 | 1.2 |

Haze may be measured by placing a hydrated test lens in borate buffered saline in a clear glass cell at ambient temperature above a flat black background, illuminating from below with a fiber optic lamp (Dolan-Jenner PL-900 fiber optic light with 0.5" diameter light guide) at an angle 66° normal to the lens cell, and capturing an image of the lens from above, normal to the lens cell with a video camera (DVC 1300C:19130 RGB camera or equivalent equipped with a suitable zoom camera lens) placed 14 mm above the lens holder. The background scatter is subtracted from the scatter of the test lens by subtracting an image of a blank cell with borate buffered saline (baseline) using EPIX XCAP V 3.8 software. The value for high end scatter (frosted glass) is obtained by adjusting the light intensity to be between 900 to 910 mean grayscale. The value of the background scatter (BS) is measured using a saline filled glass cell. The subtracted scattered light image is quantitatively analyzed, by integrating over the central 10 mm of the lens, and then comparing to a frosted glass standard. The light intensity/power setting was adjusted to achieve a mean grayscale value in the range of 900-910 for the frosted glass standard; at this setting, the baseline mean grayscale value was in the range of 50-70. The mean grayscale values of the baseline and frosted glass standard are recorded and used to create a scale from zero to 100, respectively. In the grayscale analysis, the mean and standard deviations of the baseline, frosted glass, and every test lens was recorded. For each lens, a scaled value was calculated according to the equation: scaled value equals the mean grayscale value (lens minus baseline) divided by the mean grayscale value (frosted glass minus baseline) times by 100. Three to five test lenses are analyzed, and the results are averaged.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

The following abbreviations will be used throughout the Examples and have the following meanings:
   BC: back curve plastic mold
   FC: front curve plastic mold
   RMM: reactive monomer mixtures
   NVP: N-vinylpyrrolidone (Acros or Aldrich)
   DMA: N, N-dimethylacrylamide (Jarchem)
   MMA: methyl methacrylate
   HEMA: 2-hydroxyethyl methacrylate (Bimax)
   MAA: methacrylic acid (Acros)
   ACA1: 3-acrylamidopropanoic acid
   Q Salt or METAC: 2-(methacryloyloxy)ethyl trimethylammonium chloride
   CBT: 1-Propanaminium, N-(2-carboxyethyl)-N,N-dimethyl-3-[(1-oxo-2-propen-1-yl)amino]-, inner salt; carboxybetaine; CAS 79704-35-1
   SBT: 1-Propanaminium, N,N-dimethyl-N-[3-[(1-oxo-2-propen-1-yl)amino]propyl]-3-sulfo-, inner salt; sulfobetaine; CAS 80293-60-3
   PBT: 3,5-Dioxa-8-aza-4-phosphaundec-10-en-1-aminium, 4-hydroxy-N,N,N-trimethyl-9-oxo, inner salt, 4-oxide (9CI); phosphobetaine; CAS 163674-35-9
   MPC: 3,5,8-trioxa-4-phosphaundec-10-en-1-aminium, 4-hydroxy-N,N,N,10-tetramethyl-9-oxo, inner salt, 4-oxide; CAS 67881-98-5
   Blue HEMA: 1-amino-4-[3-(4-(2-methacryloyloxy-ethoxy)-6-chlorotriazin-2-ylamino)-4-sulfophenylamino]anthraquinone-2-sulfonic acid, as described in U.S. Pat. No. 5,944,853
   PVP: poly(N-vinylpyrrolidone) (ISP Ashland)
   EGDMA: ethylene glycol dimethacrylate (Esstech)
   TEGDMA: tetraethylene glycol dimethacrylate (Esstech)
   TMPTMA: trimethylolpropane trimethacrylate (Esstech)
   Tegomer V-Si 2250: diacryloxypolydimethylsiloxane (Evonik)
   CGI or Irgacure 819: bis(2,4,6-trimethylbenzoyl)-phenylphosphineoxide (BASF or Ciba Specialty Chemicals)

CGI or Irgacure 1870: blend of bis(2,6-dimethoxybenzoyl)-2,4,4-trimethyl-pentylphosphineoxide and 1-hydroxy-cyclohexyl-phenyl-ketone (BASF or Ciba Specialty Chemicals)
mPDMS: mono-n-butyl terminated monomethacryloxypropyl terminated polydimethylsiloxane ($M_n$=800-1000 g/mol) (Gelest)
ac-PDMS: bis-3-acryloxy-2-hydroxypropyloxypropyl polydimethylsiloxane
HO-mPDMS: mono-n-butyl terminated mono-(2-hydroxy-3-methacryloxypropyl)-propyl ether terminated polydimethylsiloxane ($M_n$=400-1500 g/mol) (Ortec or DSM-Polymer Technology Group)
SiMAA: 2-propenoic acid, 2-methyl-2-hydroxy-3-[3-[1,3,3,3-tetramethyl-1-[(trimethylsilyl)oxy]disiloxanyl]propoxy]propyl ester (Toray), also known as 3-(3-(1,1,1,3,5,5,5-heptamethyltrisiloxan-3-yl)propoxy)-2-hydroxypropyl methacrylate or 2-hydroxy-3-[3-methyl-3,3-di(trimethylsiloxy)silylpropoxy]-propyl methacrylate
mPEG 950: polyethylene glycol methyl ether methacrylate (Aldrich) (CAS 26915-72-0; $M_n$=950 g/mol) which may be purified by crystallization from diethyl ether
D3O: 3,7-dimethyl-3-octanol (Vigon)
DIW: deionized water
IPA: isopropyl alcohol
PG: propylene glycol
BAGE: Boric Acid Glycerol Ester (molar ratio of boric acid to glycerol was 1:2) 299.3 grams (mol) of glycerol and 99.8 grams (mol) of boric acid were dissolved in 1247.4 grams of a 5% (w/w) aqueous EDTA solution in a suitable reactor and then heated with stirring to 90-94° C. under mild vacuum (2-6 torr) for 4-5 hours and allowed to cool down to room temperature.
EDTA: ethylenediaminetetraacetic acid
Norbloc: 2-(2-hydroxy-5-methacrylyloxyethylphenyl)-2H-benzotriazole (Janssen)
Borate Buffered Packing Solution: 18.52 grams (300 mmol) of boric acid, 3.7 grams (9.7 mmol) of sodium borate decahydrate, and 28 grams (197 mmol) of sodium sulfate were dissolved in enough deionized water to fill a 2 liter volumetric flask.
TL03 Lights: Phillips TLK 40W/03 or equivalents
DMBAPO: bis(2,6-dimethoxybenzoyl)-2,4,4-trimethyl-pentyl phosphine oxide
BAPO-OH: bis(mesitoyl)phosphinic acid or hydroxyphosphanediyl)bis(mesitylmethanone); see Macromol. Rapid Commun. 2015, 36, 553-557.

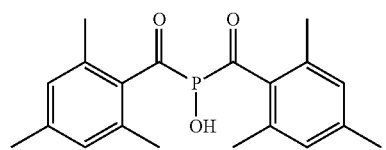

HCPK: 1-hydroxy-cyclohexyl-phenyl-ketone
mPEG475: polyethylene glycol methyl ether methacrylate (Aldrich) ($M_n$=475 g/mol)
nBMA: n-butyl methacrylate
DMF: N,N-dimethylformamide
Fluorescein Acrylamide: N-(3',6'-dihydroxy-3-oxo-3H-spiro[isobenzofuran-1,9'-xanthen]-5-yl)acrylamide (Polysciences)

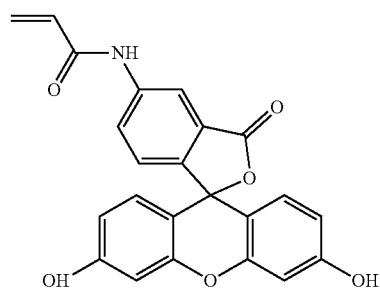 [SMILES: C=CC(=O)Nc1ccc2c(c1)C(=O)OC21c2ccc(O)cc2Oc2cc(O)ccc21]

Fluorescein Methacrylamide: N-(3',6'-dihydroxy-3-oxo-3H-spiro[isobenzofuran-1,9'-xanthen]-5-yl)methacrylamide (Polysciences)

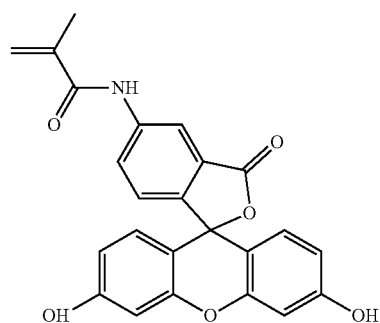 [SMILES: C=C(C)C(=O)Nc1ccc2c(c1)C(=O)OC21c2ccc(O)cc2Oc2cc(O)ccc21]

TPME: tripropylene glycol methyl ether
TEGDA: tetraethylene glycol diacrylate
DCM: Dichloromethane
KI: Potassium iodide
NaI: Sodium iodide:
Tert-BuOH or t-BuOH: tertiary butanol
Et3N: triethylamine
MeLi: methyl lithium
CDI: carbonyldiimidazole
TFA or CF3COOH: trifluoroacetic acid
NaBr: sodium bromide
THF: tetrahydrofuran
Na2CO3: sodium bicarbonate
Na2SO4: sodium sulfate
HMPA: hexamethylphosphoramide
NaOH: sodium hydroxide
NMR: nuclear magnetic resonance spectroscopy
TMS: tetramethylsilane
NT: not tested
WC: water content (wt. %)
EC Dk: edge-corrected oxygen gas permeability (barrers)
M: modulus (psi)
TS: tensile strength (psi)
ETB: elongation to break (%)
RI: refractive index
Kruss DCA (adv): advancing dynamic contact angle
Sessile Drop: advancing contact angle Examples 1-3

Reactive monomer mixtures (representative of the first reactive composition described above) were formed by mixing the reactive components listed in Table 1. These formulations were filtered through a 3 μm filter using a heated or unheated stainless steel or glass syringe depending on viscosity and degassed by applying vacuum (about 40 mm Hg) at ambient temperature for about 10 minutes. With a nitrogen gas atmosphere and about 0.5 percent oxygen gas, 75 μL of the reactive mixture were dosed into the FC. The BC was then placed onto the FC. A pallet containing eight lens mold assemblies was irradiated for 10 minutes at 60° C. or at 70° C. using 435 nm lights having intensity of 6 mW/cm$^2$. The light source was about two inches above the pallets. The lenses may be stored protected from any additional exposure to light and de-molded and hydrated at later times.

Working under yellow lights and limiting general exposure to light (e.g., by wrapping containers with aluminum foil), the lenses were manually de-molded with most lenses adhering to the FC and released by suspending about 64 lenses in about one liter of 70 percent IPA for about one or two hours, sometimes overnight, followed by washing two times with 70 percent IPA, two times with deionized water, and finally stored in deionized water in the refrigerator in aluminum foil covered containers for subsequent grafting experiments. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all lenses without defects and transition from diluent swollen networks to the deionized water or packaging solution swollen hydrogels. The lenses were equilibrated in borate buffered packing solution for at least 24 hours, transferred into vials, and subsequently sterilized by autoclaving at 122° C. for 30 minutes. The physical and mechanical properties of the sterile lenses were measured and listed in Table 2.

The hydrogels of examples 1-3 (representative of cross-linked substrate networks of the invention) were used in the following grafting experiments. These substrate networks were stored in the dark. The diameters and water contents of examples 1-3 were used to calculate the percent change in diameters and water contents of the grafted hydrogels.

Examples 4-27

Generally, in a glove box with a nitrogen gas atmosphere and less than 0.2 percent oxygen gas, the grafting experiments were carried out in 100 mL glass jars in which lenses were suspended in a reactive monomer mixture (representative of the second reactive composition of the invention) at a concentration of one lens per 1-5 mL of reactive monomer mixture. The suspensions were first degassed for 15-30 minutes using vacuum (about 40 torr) and then purged with nitrogen gas aeration, the jars capped, and then their contents equilibrated at 60-65° C. on a shaker bath for about 90 minutes. The caps were replaced by clear plastic covers, and the jars irradiated with TL03 lights (wavelength 380-470 nm; peak 420 nm). After irradiation, the lenses were removed and washed two times in 70% (v/v) aqueous IPA, two times with deionized water, and two times with borate buffered packing solution. The lenses were stored in vials. After about two days of equilibration, the lenses were inspected, sterilized by autoclaving at 122° C. for 30 minutes. The physical and mechanical properties of the sterile lenses were measured.

In some experiments, the light intensity was reduced by placing 1-6 sheets of paper (Berkshire DUR670) between the light source and the jars being irradiated. For all experiments, the actual light intensity was measured with an ITL 1400 radiometer and sometimes reported as a range if variations were detected.

Table 3 lists various reactive monomer mixtures and grafting conditions used to create grafted polymeric networks on the lenses made in Examples 1-3. mPEG950 macromer was purified by dissolution in refluxing diethyl ether and crystallization upon cooling to 4° C. thereby removing the inhibitor. Tables 4-6 list the physical and mechanical properties of the contact lenses made from such grafted networks.

The formation of grafted polymeric networks was consistent with the lens dry weight gains, the lens diameter increases, and the changes in water content and oxygen permeability (Dk) depending on the hydrophilicity or hydrophobicity of the monomers in the grafting reactive monomer mixtures. Examples 4, 5, and 10 exhibited lysozyme uptakes of 2,773 (±30) μg/lens, 2,806 (±16) μg/lens, and 2,231 (±31) μg/lens respectively, and examples 5 and 10 exhibited PQ1 uptakes of 71.2% and 64.4% respectively, because of the grafting of carboxylic acid monomers. The grafting reactive monomer mixture of Example 4 included a crosslinking agent.

TABLE 1

| Component | Weight Percent Examples 1-2 | Weight Percent Example 3 |
|---|---|---|
| mPDMS | 31 | 0 |
| SiMAA | 28 | 0 |
| DMA | 24 | 0 |
| HEMA | 6 | 93.31 |
| MAA | 0 | 0.7 |
| PVP K90 | 7 | 0 |
| TEGDMA | 1.64 | 0 |
| EGDMA | 0 | 0.9 |
| TMPTMA | 0 | 0.09 |
| Norbloc | 2 | 0 |
| CGI 819 | 0.34 | 5 |
| Blue-HEMA | 0.02 | 0 |
| Σ RMM Components | 100 | 100 |
| Diluent D3O | 30 | 0 |
| Diluent BAGE | 0 | 50 |
| Cure Temperature (° C.) | 60 | 70 |

TABLE 2

| Example | Diameter (mm) | WC (Wt. %) | EC Dk (barrers) | M (psi) | TS (psi) | ETB (%) | RI | Kruss DCA (adv) | Sessile Drop (°) | Lipids (μg/lens) |
|---|---|---|---|---|---|---|---|---|---|---|
| Ex 1 | 13.5 | 40 | 94 | 123 (12) | 96 (9) | 169 (32) | 1.4209 | NT | 45 (6) | 3.9 (0.5) |
| Ex 2 | 13.0 | 36.3 | 102 | 104 (7) | 106 (21) | 185 (35) | 1.4213 | 46 (6) | 70 (8) | 2.7 (0.3) |
| Ex 3 | 11.3 | 61 | NT | NT | NT | NT | NT | NT | NT | NT |

TABLE 3

| | RMM Composition % (w/v) | Equilibration Time (mm) | Solvent (v/v) | Light Intensity (mW/cm$^2$) | Cure Time (mm) |
|---|---|---|---|---|---|
| Using Example 1 as the substrate network containing MAPO groups: | | | | | |
| Ex 4 | 5% HEMA, 0.5% MMA, 0.05% EGDMA | 90 1 lens/5 mL | 50:50 PG:DIW | 0.105-0.108 | 30 |
| Ex 5 | 1.25% MAA | 90 1 lens/5 mL | 50:50 PG:DIW | 0.105-0.108 | 40 |
| Ex 6 | 5% MPC | 90 1 lens/5 mL | 50:50 PG:DIW | 0.280-0.320 | 40 |
| Ex 7 | 5% CBT | 90 1 lens/5 mL | 50:50 PG:DIW | 0.280-0.320 | 40 |
| Ex 8 | 5% PBT | 90 1 lens/5 mL | 50:50 PG:DIW | 0.280-0.320 | 40 |
| Ex 9 | 5% SBT | 90 1 lens/5 mL | 50:50 PG:DIW | 0.280-0.320 | 40 |
| Using Example 2 as the substrate network containing MAPO groups: | | | | | |
| Ex 10 | 5% ACA1 | 60 1 lens/2.5 mL | 50:50 PG:DIW | 2.4 | 30 |
| Ex 11 | 5% DMA | 60 1 lens/2.5 mL | 90:10 PG:DIW | | |
| Ex 12 | 10% MMA | 60 1 lens/2.5 mL | 50:50 PG:DIW | | 90 |
| Ex 13 | 50% NVP | 60 1 lens/2.5 mL | 50:50 PG:DIW | | |
| Ex 14 | 10% purified mPEG950 | 90-120 1 lens/2 mL | 50:50 PG:DIW | 0.89 | 30 |
| Ex 15 | | | 50:50 PG:DIW | | 45 |
| Ex 16 | | | 50:50 PG:DIW | | 60 |
| Ex 17 | | | 50:50 PG:DIW | | 75 |
| Ex 18 | | | 50:50 PG:DIW | | 90 |
| Ex 19 | | | 50:50 PG:DIW | 0.41/0.81 | 60@0.41/ 30@/.81 |
| Ex 20 | | | 50:50 PG:DIW | | 60@0.41/ 60@0.81 |
| Using Example 3 as the substrate network containing MAPO groups: | | | | | |
| Ex 21 | 5% DMA | 90-120 1 lens/2.5 mL | 50:50 PG:DIW | 2.4 | 30 |
| Ex 22 | 100% NVP; note cure temperature = 65° C. | | None | 2.4 | 120 |
| Ex 23 | 10% mPEG950 | | 50:50 PG:DIW | 2.4 | 60 |
| Ex 24 | 10% MMA; note cure temperature = 65° C. | | 50:50 PG:DIW | 2.4 | 90 |
| Ex 25 | 5% ACA1 | | 50:50 PG:DIW | 2.4 | 60 |
| Ex 26 | 5% MPC | | 50:50 PG:DIW | 0.3 | 60 |
| Ex 27 | 12% SiMAA; note cure temperature = 65° C. | | 45:45:10 PG:n-propanol:DIW | 2.4 | 120 |

TABLE 4

| | Lens Weight Gain (%) | DM (mm) | WC (wt %) | EC Dk (barrers) | M (psi) | TS (psi) | ETB (%) | RI | Kruss DCA (adv) | Sessile Drop (°) | Lipids (μg/lens) |
|---|---|---|---|---|---|---|---|---|---|---|---|
| Ex 1 | | 13.5 | 40 | 94 | 123 (12) | 96 (9) | 169 (32) | 1.4209 | NT | 45 (6) | 3.9 (0.5) |
| Ex 4 | 33.7 | 15.8 | 52 | 62 | 116 (19) | 80 (10) | 106 (8) | 1.4083 | NT | 65 (5) | 4.5 (0.3) |
| Ex 5 | 22.4 | 16.7 | 66 | 47 | 155 (14) | 43 (22) | 41 (18) | 1.3920 | NT | NT | 3.0 (1.5) |
| Ex 6 | 10.5 | 14.9 | 48 | 66 | 96 (10) | 91 (16) | 158 (27) | 1.4077 | 32 (8) | 29 (2) | 1.9 (0.2) |
| Ex 7 | 3.9 | 14.5 | 44 | 77 | 96 (6) | 69 (14) | 130 (20) | 1.4149 | 52 (3) | 50 (6) | 3.9 (0.7) |
| Ex 8 | 2.5 | 14.3 | 45 | 88 | 108 (4) | 81 (11) | 134 (29) | 1.4141 | 47 (5) | 44 (4) | 4.3 (0.5) |
| Ex 9 | 1.2 | 14.3 | 42 | 90 | 103 (4) | 94 (27) | 99 (18) | 1.4183 | 48 (9) | 42 (4) | 3.9 (0.3) |

TABLE 5

| | Lens Weight Gain (%) | DM (mm) | WC (wt %) | EC Dk (barrers) | M (psi) | TS (psi) | ETB (%) | RI | Kruss DCA (adv) | Sessile Drop (°) | Lipids (μg/lens) |
|---|---|---|---|---|---|---|---|---|---|---|---|
| Ex 2 | | 13.0 | 36.3 | 102 | 104 (7) | 106 (21) | 185 (35) | 1.4213 | 46 (6) | 70 (8) | 2.7 (0.3) |
| Ex 10 | 11.1 | 15.4 | 60 | 68 | 109 (8) | 24 (9) | 81 (12) | NT | 48 (5) | NT | 2.9 (0.9) |
| Ex 11 | 7.4 | 13.9 | 49 | 81 | 89 (8) | 77 (26) | 137 (39) | NT | 49 (6) | NT | NT |
| Ex 12 | 634 | >18 | 31 | NT | NT | NT | NT | NT | NT | NT | NT |
| Ex 13 | 21.8 | 15.3 | 56 | NT | NT | NT | NT | NT | NT | NT | NT |
| Ex 14 | 0.9 | 13.3 | 41 | 100 | 102 (23) | 97 (25) | 179 (28) | 1.4196 | 39 (14) | NT | 5.42 |
| Ex 15 | 4.8 | 13.6 | 43 | 98 | 105 (8) | 98 (9) | 167 (23) | 1.4100 | 54 (1) | NT | 3.7 |
| Ex 16 | 5.8 | 13.8 | 44 | 90 | 98 (4) | 104 (19) | 181 (31) | 1.4133 | 87 (13) | NT | 3.77 |
| Ex 17 | 25.6 | 14-15 | 57 | 57 | 91 (18) | 58 (44) | 82 (51) | 1.3972 | 48 (16) | NT | 3.47 |
| Ex 18 | 29.5 | 15-16 | 50 | 61 | 124 (6) | 61 (16) | 86 (30) | 1.3944 | 54 (3) | NT | 3.17 |
| Ex 19 | 1.3 | 13.8 | 44 | 99 | 93 (8) | 104 (43) | 180 (65) | 1.4132 | NT | NT | NT |
| Ex 20 | 6.4 | 14.3 | 47 | 86 | 90 (7) | 98 (29) | 177 (50) | 1.4085 | 59 (2) | NT | 3.54 |

TABLE 6

| | Lens Weight Gain (%) | DM (mm) | DM Increase (%) | WC (%) | WC Change (%) | EC Dk (barrers) |
|---|---|---|---|---|---|---|
| Ex 3 | NT | 11.3 | NT | 61 | NT | NT* |
| Ex 21 | 29.8 | 13.0 | 15.5 | 66 | 8.2 | NT |
| Ex 22 | 20 | 11.7 | 3.5 | 69.3 | 13.6 | NT |
| Ex 23 | 188 | 17.6 | 56 | 76.8 | 25.9 | NT |
| Ex 24 | 458 | 16.4 | >45 | 43.8 | (28.2) | NT |
| Ex 25 | 36.8 | 15.4 | 37 | 89 | 45.9 | NT |
| Ex 26 | 26 | 12.8 | 13.5 | 66 | 8.2 | NT |
| Ex 27 | 233 | 14.1 | 24 | 35.5 | (41.8) | 58.5 |

*Lenses with similar formulations such as etafilcon typically exhibit Dk between 25 and 30 barrers.

Examples 27-31

Reactive monomer mixtures were formed by mixing the reactive components listed in Table 7. These formulations were filtered through a 3 μm filter and degassed. In a glove box with a nitrogen gas atmosphere and less than 0.2 percent oxygen gas, about 75-100 μL of the reactive mixture were dosed using an Eppendorf pipet at room temperature into the FC. The BC was then placed onto the FC. The molds were equilibrated for a minimum of twelve hours in the glove box prior to dosing. A plate containing about four pallets, each pallet containing eight lens mold assemblies, was transferred into an adjacent glove box maintained at 65° C., and the lenses were cured from the top for 15 minutes using 435 nm lights having intensity of 4 mW/cm². The light source was about six inches above the trays.

Working under yellow lights and limiting general exposure to additional light exposure (e.g., by wrapping containers with aluminum foil, etc.). The lenses were manually de-molded with most lenses adhering to the FC and released by suspending about 64 lenses in about one liter of 70 percent IPA for about one or two hours, sometimes overnight, followed by washing two times with 70 percent IPA, two times with deionized water, and finally stored in deionized water in the refrigerator in aluminum foil covered containers. Each washing step lasted about 30 minutes. Some lenses were equilibrated in borate buffered packing solution for at least 24 hours, transferred into vials, and subsequently sterilized by autoclaving at 122° C. for 30 minutes. The physical and mechanical properties of the sterile lenses were measured and listed in Table 8.

In a glove box with a nitrogen gas atmosphere and less than 0.2 percent oxygen gas, lenses from example 27 were suspended in 100 mL glass jars at a concentration of one lens/2 mL of reactive monomer mixture. The reactive monomer mixture was a solution of 5% (v/v) HEMA, 0.5% (v/v) MAA, and 0.05% (v/v) EGDMA in 50:50 (v/v) propylene glycol:deionized water solution. The suspensions were first degassed for 15-30 minutes using vacuum (about 40 torr) and then purged with nitrogen gas aeration, the jars capped, and then their contents equilibrated at 60° C. on a shaker bath for 90-120 minutes. The caps were replaced by clear plastic covers, and the jars irradiated with TL03 lights using paper filters to reduce the intensity to 0.107 mW/cm². Jars were removed after 15 minutes (example 28), 30 minutes (example 29), 45 minutes (example 30), and 60 minutes (example 31) to monitor the rate of grafting. After irradiation, the lenses were removed and washed two times in 70% (v/v) aqueous IPA, two times with deionized water, and two times with borate buffered packing solution. The lenses were stored in vials. After about two days of equilibration, the lenses were inspected, sterilized by autoclaving at 122° C. for 30 minutes. The physical and mechanical properties of the sterile lenses were measured and listed in Table 8.

TABLE 7

| Component | Weight Percent Example 27 |
|---|---|
| OH-mPDMS (n = 4) | 10 |
| OH-mPDMS (n = 15) | 50 |
| ac-PDMS Tegomer V Si 2250 | 10 |
| DMA | 10 |
| HEMA | 10.73 |
| PVP K90 | 7 |
| Norbloc | 1.75 |
| Blue-HEMA | 0.02 |
| CGI 819 | 0.5 |
| Σ RMM Components | 100 |
| Diluent D3O | 23 |

TABLE 8

|  | Lens Weight Gain (%) | DM (mm) | WC (Wt %) | EC Dk (barrers) | M (psi) | TS (psi) | ETB (%) | RI | Sessile Drop (°) | Lipids (µg/lens) | Lysozyme Uptake (µg/lens) | PQ1 Uptake (%) |
|---|---|---|---|---|---|---|---|---|---|---|---|---|
| Ex 27 | — | 12.07 | 23.4 | 169 | NT | NT | NT | NT | NT | NT | NT | NT |
| Ex 28 | 21.2 | 13.7 | 37.1 | 154 | 186 | 80 | 67 | 1.4204 | 74.7 | 9.41 | 704 | 56 |
| Ex 29 | 53.8 | 15.5 | 47.4 | 97 | 203 | 65 | 55 | 1.4103 | 58.5 | 10.99 | 2796 | 73 |
| Ex 30 | 99.8 | 17.3 | 51.9 | 60 | 230 | 65 | 48 | 1.4050 | 52.1 | 11.31 | 2915 | >80 |
| Ex 31 | 128.1 | 18.6 | 53.8 | 54 | 259 | 154 | 89 | 1.4019 | 35.1 | 8.84 | 2933 | >80 |

The formation of grafted networks was consistent with the increases in lens dry weight, lens diameter, water content, lysozyme uptake, and PQ1 uptake as a function of grafting time as well as the downward trend in edge corrected Dk and sessile drop wettability.

Example 32

A reactive monomer mixture was formed by mixing the reactive components listed in Table 9. This formulation was filtered through a 3 µm filter using a heated or unheated stainless steel or glass syringe and degassed by applying vacuum (about 40 mm Hg) at ambient temperature for about 10 minutes. With a nitrogen gas atmosphere and about 0.2 percent oxygen gas, 75 µL of the reactive mixture were dosed into the FC. The BC was then placed onto the FC. A plate containing about four pallets, each pallet containing eight lens mold assemblies, was transferred into an adjacent glove box maintained at 60-65° C., and the lenses were cured from the top for 12 minutes using 435 nm LEDs having intensity of 4 mW/cm². The light source was about six inches above the trays. The lenses were stored protected from any additional exposure to light and de-molded and hydrated at later times.

Working under yellow lights and limiting general exposure to light (e.g., by wrapping containers with aluminum foil), the lenses were manually de-molded with most lenses adhering to the FC and released by suspending about 64 lenses in about one liter of 70 percent IPA for about one or two hours, followed by washing two times with 70 percent IPA, two times with deionized water, and finally stored in deionized water in the refrigerator in covered containers for subsequent grafting experiments. Each washing step lasted about 30 minutes. After one day of equilibration, the lenses were inspected and sterilized by autoclaving at 122° C. for 30 minutes. The lenses equilibrated 3-4 days after sterilization, and then, the physical and mechanical properties of the sterile lenses were measured. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all lenses without defects and transition from diluent swollen networks to the deionized water or packaging solution swollen hydrogels.

25 Lenses were suspended in 50 mL of a 0.05% (w/v) methacrylic acid solution of 50:50 (v/v) aqueous 1, 2-propylene glycol in a 100 mL glass jar and degassed for 15 minutes under reduced pressure (ca. 40 mm Hg) and purged with nitrogen gas aeration. The jar was capped and transferred into glove box with a nitrogen gas atmosphere with less than 0.2 percent oxygen gas and a temperature of 64° C. and equilibrated on a shaker (180 rpm) for 90 minutes. The temperature of the suspension was then 55° C. The cap was replaced by a clear plastic cover, and the suspension was irradiated using 420 LEDs from the top having an intensity of 2 mW/cm² for 35 minutes while still being shaken. After irradiation, the lenses were removed and washed two times with deionized water and two times with borate buffered packing solution. The lenses were stored in vials. After one day of equilibration, the lenses were inspected and sterilized by autoclaving at 122° C. for 30 minutes. The lenses were equilibrated 3-4 days after sterilization, and then, the physical and mechanical properties of the sterile lenses were measured. Table 10 lists the physical and mechanical properties of the grafted and un-grafted lenses.

TABLE 9

| Component | Weight Percent Example 32 |
|---|---|
| HEMA | 4.65 |
| NVP | 52.76 |
| TRIS | 19.97 |
| TEGDMA | 2.4 |
| mPDMS 1000 | 19.86 |
| Blue HEMA | 0.02 |
| Irgacure 819 | 0.34 |
| Σ RMM Components | 100 |
| Monomer Content in RMM | 83 |
| Ethanol | 50 |
| Ethyl Acetate | 50 |
| Σ Diluent Components | 100 |
| Diluent Content in RMM | 17 |

TABLE 10

| Ex 32 | Lens Weight Gain (%) | WC (wt. %) | M (psi) | TS (psi) | ETB (%) | Toughness (in-lb/in³) | Sessile Drop (°) |
|---|---|---|---|---|---|---|---|
| Un-grafted Lens | — | 36.9 (0.02) | 101 (4) | 143 (26) | 271 (46) | 187 (53) | 91 (9) |
| Grafted Lens | 30.3 | 66.7 (0.01) | 169 (12) | 60 (18) | 59 (13) | 17 (12) | 28 (2) |

The formation of grafted networks was consistent with the increases in lens dry weight and equilibrium water content upon hydration as well as the decrease in sessile drop wettability. Grafting methacrylic acid also changed the mechanical properties of the lenses.

Example 33

A reactive monomer mixture was formed by mixing the reactive components listed in Table 11. This formulation was filtered through a 3 μm filter using a heated or unheated stainless steel or glass syringe and degassed by applying vacuum (about 40 mm Hg) at ambient temperature for about 10 minutes. With a nitrogen gas atmosphere and about 0.2 percent oxygen gas, 75 μL of the reactive mixture were dosed into the FC. The BC was then placed onto the FC.

A plate containing about four pallets, each pallet containing eight lens mold assemblies, was transferred into an adjacent glove box maintained at 60-65° C., and the lenses were cured from the top and bottom for 15 minutes using 435 nm lights having intensity of 4.5 mW/cm². The light sources were about six inches above the trays. The lenses were stored protected from any additional exposure to light and de-molded and hydrated at later times.

Working under yellow lights and limiting general exposure to light (e.g., by wrapping containers with aluminum foil), the lenses were manually de-molded with most lenses adhering to the FC and released by suspending about 64 lenses in about one liter of 70 percent IPA for about one or two hours, followed by washing two times with 70 percent IPA, two times with deionized water, and finally stored in deionized water in the refrigerator in covered containers for subsequent grafting experiments. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of lenses without defects and transition from diluent swollen networks to the deionized water or packaging solution swollen hydrogels.

25 Lenses were suspended in 50 mL of a 5% (w/v) mPEG475 solution of 50:50 (w/v) aqueous 1, 2-propylene glycol in a 100 mL glass jar and degassed for 20 minutes under reduced pressure (ca. 40 mm Hg) and purged with nitrogen gas aeration. The jar was capped and transferred into glove box with a nitrogen gas atmosphere with less than 0.2 percent oxygen gas and a temperature of 64-65° C. and equilibrated on a shaker (180 rpm) for 90 minutes. The temperature of the suspension was then 54-55° C. The cap was replaced by a clear plastic cover, and the suspension was irradiated using 420 LEDs from the top having an intensity of 1.45 mW/cm² for 40 minutes while still being shaken. After irradiation, the lenses were removed and washed two times with deionized water and two times with borate buffered packing solution. The lenses were stored in vials. After one day of equilibration, the lenses were inspected and sterilized by autoclaving at 122° C. for 30 minutes. The lenses equilibrated 3-4 days after sterilization, and then, the physical properties of the sterile lenses were measured. Table 12 lists the physical properties of the grafted and un-grafted lenses.

TABLE 11

| Component | Weight Percent Example 33 |
| --- | --- |
| mPDMS | 31 |
| SiMAA | 28 |

TABLE 11-continued

| Component | Weight Percent Example 33 |
| --- | --- |
| DMA | 24 |
| HEMA | 6 |
| PVP K90 | 7 |
| TEGDMA | 1.64 |
| Norbloc | 1.84 |
| BAPO-OH | 0.5 |
| Blue-HEMA | 0.02 |
| Σ RMM Components | 100 |
| Monomer Content in RMM | 70 |
| Diluent D3O | 100 |
| Diluent Content in RMM | 30 |

TABLE 12

| Ex 33 | Lens Weight Gain (%) | WC (wt. %) | Lens Diameter (mm) | % Increase in Diameter |
| --- | --- | --- | --- | --- |
| Un-grafted Lens | — | 36.2 | 14.0 | — |
| Grafted Lens | 9.53 | 43.4 | 14.9 | 6.43 |

The formation of grafted networks was consistent with the increases in lens dry weight, hydrated lens diameter and equilibrium water content.

Example 34

A reactive monomer mixture of 14.25 grams of nBMA, 75 milligrams of EGDMA, and 75 milligrams of CGI 819 was prepared and degassed under vacuum (ca. 40 mm Hg) for 15 minutes. In a nitrogen gas atmosphere and about 0.2 percent oxygen gas, 100 μL of the reactive mixture were dosed into the FC. The BC was then placed onto the FC. A plate containing about four pallets, each pallet containing eight lens mold assemblies, was transferred into an adjacent glove box maintained at 60° C., and the lenses were cured from the top and bottom for 15 minutes using 435 nm lights having intensity of 14 mW/cm². The light sources were about six inches above the trays. The lenses were mechanically release and 30 lenses were swollen in DMF to remove residual monomer and initiator. The DMF was exchanged with fresh DMF one time.

A grafting solution was prepared by mixing 3 grams of DMA, 3 milligrams of fluorescein acrylamide [N-(3',6'-dihydroxy-3-oxo-3H-spiro[isobenzofuran-1,9'-xanthen]-5-yl)acrylamide], and 27 grams of DMF. 5 Lenses were suspended in this grafting solution in a jar and degassed under vacuum (ca. 40 mm Hg) for 25 minutes. The jar was transferred into a glove box preheated to 65° C. and allowed to equilibrate for one hour before being irradiated from above by TL03 light bulbs having an intensity of 3 mW/cm². The jar was swirled at 85 rpm during the irradiation.

The grafted lenses were soaked in acetone to remove the DMF overnight. The grafted lenses were then soaked in fresh acetone for one hour, removed from suspension, and vacuum dried at room temperature for one hour. Seven un-grafted lenses were simultaneously taken through the same DMF swelling and acetone exchange treatments and vacuum drying cycle. The un-grafted lenses were then further vacuum dried at 60° C. for 3 hours. The grafted and un-grafted lenses were weighed and averages calculated. The grafted lenses showed a dry weight increase of 32 weight percent over the un-grafted lenses.

The dried lenses were subsequently suspended in about 500 mL of borate buffered packing solution in a jar and rolled overnight. The hydrated grafted and un-grafted lenses were weighed and averages calculated. The grafted lenses were uniformly yellow in color and stored in jars in borate buffered packing solution. The hydrated grafted lenses absorbed significantly more water than the un-grafted lenses. The water content of the hydrated grafted lenses was 18 weight percent while the water content of the hydrated un-grafted lenses was 0.6 weight percent. The formation of grafted networks was consistent with the increases in lens dry weight and equilibrium water content.

A hydrated grafted lens was staged and subjected to confocal fluorescence microscopy using a Zeiss LSM 700 Series Confocal Fluorescence Microscope. The excitation wavelengths were 488 nm (2.0% laser power) and 555 nm (2.0% laser power); the emission wavelength was about 512 nm; the scan area was 128×128 microns; and the Z step width was 0.5 microns. Confocal microscopy showed uniform fluorescence throughout the grafted lenses which is consistent with the grafting reaction occurring randomly and equally distributed throughout the entire lens under the grafting conditions used in this experiment.

Example 35

A reactive monomer mixture was formed by mixing the reactive components listed in Table 13. This formulation was filtered through a 3 μm filter using a heated or unheated stainless steel or glass syringe and degassed by applying vacuum (about 40 mm Hg) at ambient temperature for about 10 minutes. With a nitrogen gas atmosphere and about 0.2 percent oxygen gas, 75 μL of the reactive mixture were dosed into the FC. The BC was then placed onto the FC. A plate containing about four pallets, each pallet containing eight lens mold assemblies, was transferred into an adjacent glove box maintained at 50-60° C., and the lenses were cured from the top and bottom for 15 minutes using 435 nm LEDs having intensity of 5.25 mW/cm². The light sources were about six inches above the trays. The lenses were stored protected from any additional exposure to light and de-molded and hydrated at later times.

Working under yellow lights and limiting general exposure to light (e.g., by wrapping containers with aluminum foil), the lenses were manually de-molded with most lenses adhering to the FC and released by suspending and rolling about 32 lenses in about 500 mL of 70 percent IPA overnight, followed by washing two times with 70 percent IPA, two times with 25 percent IPA, three times with deionized water, and finally stored in deionized water in the refrigerator in covered containers for subsequent grafting experiments. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all lenses without defects and transition from diluent swollen networks to the deionized water or packaging solution swollen hydrogels.

About 10 lenses were suspended in 50 mL of a 1000 ppm solution of fluorescein acrylamide [N-(3',6'-dihydroxy-3-oxo-3H-spiro[isobenzofuran-1,9'-xanthen]-5-yl)acrylamide] in 50:50 (w/v) aqueous TPME in a 100 mL glass jar and degassed for 20 minutes under reduced pressure (ca. 40 mm Hg) and purged with nitrogen gas aeration. The jar was capped and transferred into glove box with a nitrogen gas atmosphere with less than 0.2 percent oxygen gas and a temperature of 60° C. and equilibrated on a shaker for about 90 minutes. The cap was replaced by a clear plastic cover, and the suspension was irradiated using TL03 light bulbs from the top having an intensity of about 4 mW/cm² for about 25 minutes while still being shaken. After irradiation, the lenses were removed and washed four times with 70% IPA, three times with deionized water and two times with borate buffered packing solution. The grafted lenses were uniformly yellow in color and stored in jars in borate buffered packing solution.

A hydrated grafted lens was staged and subjected to confocal fluorescence microscopy using a Zeiss LSM 700 Series Confocal Fluorescence Microscope. The excitation wavelengths were 488 nm and 555 nm; the emission wavelength was about 512 nm; the scan area was 128×128 microns; and the Z step width was 0.5 microns. The laser power was adjusted depending on the concentration of the chromophore in the sample, typically between 0.1% and 15% laser power. Confocal microscopy showed uniform fluorescence throughout the grafted lenses which is consistent with the grafting reaction occurring randomly and equally distributed throughout the entire lenses.

TABLE 13

| Component | Weight Percent Example 34 |
|---|---|
| mPDMS | 31 |
| SiMAA | 28 |
| DMA | 25 |
| HEMA | 6 |
| PVP K90 | 7 |
| TEGDMA | 2 |
| Irgacure 819 | 1 |
| Σ RMM Components | 100 |
| Monomer Content in RMM | 70 |
| Diluent D3O | 100 |
| Diluent Content in RMM | 30 |

Example 36

This example was based azoperester free radical polymerization initiators in which the first activation mode was irradiation and the second mode was thermal. In particular, tert-butyl 7-methyl-7-(tert-butylazo)peroxyoctanoate was synthesized as described in Macromolecules 2003, 36, 3821-3825, and as shown schematically in the following Scheme:

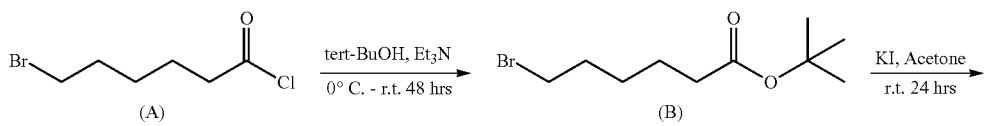

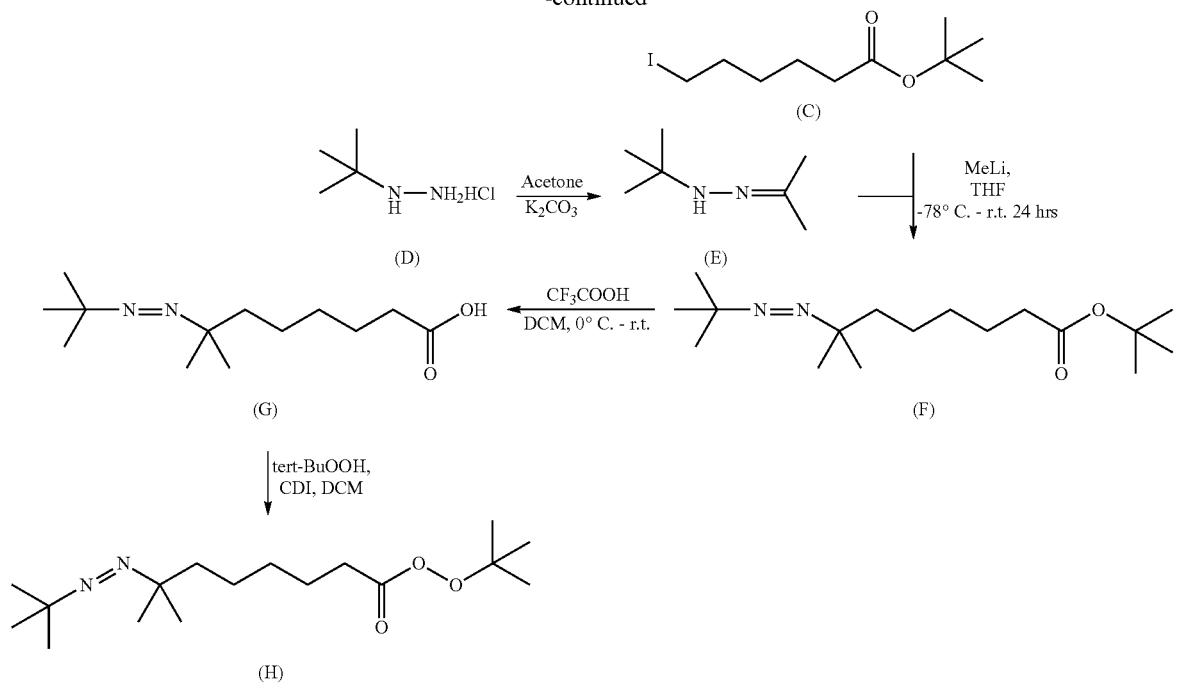

All NMR spectra (500 MHz) were run in CDCl₃ unless otherwise specified. All chemical shifts are in ppm from TMS. All the reagents and solvents were purchased from Sigma-Aldrich and were used without further purification. tert-Butyl 7-methyl-7-(tert-butylazo)peroxyoctanoate was used to make a crosslinked substrate network by ultraviolet irradiation with covalently bound peroxyester groups which was then used to form a grafted polymeric network by a thermally induced free radical polymerization.

tert-Butyl 6-bromohexanote (B)

To a stirred solution of anhydrous tert-butanol (31.29 mL, 0.586 mol) and triethylamine in anhydrous DCM (100 mL) was added 6-bromohexanoyl chloride (25.00 g, 0.117 mol) drop wise at 0° C. and stirred the reaction mixture at room temperature overnight. Upon completion, water (100 mL) was added and extracted with DCM (2×50 mL). The combined organic extracts were washed with aqueous NaHCO₃ (2×25 mL), brine (25 mL), dried over Na₂SO₄, filtered and concentrated. The crude product was passed through silica-gel column and eluted with 10% ethyl acetate in hexanes to afford (B) as clear oil in 71% yield. ¹H NMR (500 MHz, CDCl3): 3.36-3.42 (t, 2H), 2.18-2.24 (t, 2H), 1.80-1.91 (m, 2H), 1.54-1.66 (m, 2H), 1.37-1.50 (m, 11H).

tert-Butyl 6-iodohexanote (C)

tert-Butyl 6-bromohexanote (8.00 g, 31.9 mmol) was dissolved in acetone (50 mL), NaI (4.78 g, 31.9 mmol) was added, and the mixture was refluxed under nitrogen in the dark for 10 hours. Solvent was then removed, and the crude product was taken up in diethyl ether (50 mL) and filtered to remove NaBr. Solvent was evaporated under reduced pressure, and the crude product was passed through silica-gel column and eluted with 5% ethyl acetate in hexanes to afford (C) as clear oil in 98% yield. ¹H NMR (500 MHz, CDCl₃): 3.16-3.21 (t, 2H), 2.19-2.25 (t, 2H), 1.78-1.89 (m, 2H), 1.54-1.66 (m, 2H), 1.36-1.47 (m, 11H).

Acetone tert-butyl hydrazine (E)

tert-Butyl hydrazine hydrochloride (25.80 g, 207.1 mmol), potassium hydroxide (26.10 g, 465.2 mmol) and acetone (26.10 g, 449.4 mmol) were mixed together and stirred at room temperature under nitrogen for 3 hours. Upon completion, the supernatant liquid was decanted into another flask, the remaining liquid was carefully removed under reduced pressure, and the residue was purified by distillation at 60° C. (76.0 mm Hg) to afford (E) as clear oil in 71% yield. ¹H NMR (500 MHz, CDCl₃): 1.91 (s, 3H), 1.70 (s, 3H), 1.16 (m, 9H).

tert-Butyl 7-Methyl-7-(tert-butylazo)octanoate (F)

To a solution of acetone tert-butyl hydrazone (1.0 g, 7.8 mmol) in THF (20 mL) at −78° C. was added MeLi (8.2 mmol, 5.1 mL of 1.5 M in hexane). After the solution had been stirred for 1.5 h at −78° C., HMPA (1.4 g, 7.8 mmol) was added; then a solution of tert-butyl 6-iodohexanote (2.4 g, 8.0 mmol) in THF (5 mL) was added. The solution was stirred for another 30 min at −78° C., slowly warmed to room temperature, and stirred for 3 more hours. Ether (40 mL) was added, and the organic solution was washed with water and then brine. After drying over Na₂SO₄ and filtered, the solvent was removed by rotary evaporation. The product (F) (1.2 g, 52%) was obtained by flash column chromatography on silica gel (ethyl acetate-hexanes, 1:20). ¹H NMR: 1.07 (s, 6H), 1.14 (s, 9H), 1.15-1.30 (m, 4H), 1.43 (s, 9H), 1.50-1.62 (m, 4H), 2.15-2.21 (t, 2H).

7-Methyl-7-(tert-butylazo)octanoic acid (G)

tert-Butyl 7-Methyl-7-(tert-butylazo)octanoate (2.00 g, 67.01 mmol) was dissolved in TFA:DCM (1:1, 25 mL) at 0°

C. and stirred at same temperature for 15 minutes, followed by room temperature for 1-2 hours. Upon completion, the solvent was removed and the crude product was purified by silica-gel column and eluted with 10% ethyl acetate in hexanes to afford (G) as clear oil in 99% yield. $^1$H NMR (500 MHz, CDCl$_3$): 1.07 (s, 6H), 1.14 (s, 9H), 1.18-1.39 (m, 4H), 1.57-1.65 (m, 4H), 2.30-2.36 (t, 2H).

tert-Butyl 7-methyl-7-(tert-butylazo)peroxyoctanoate (H)

To a stirred solution of 7-methyl-7-(tert-butylazo)octanoic acid (1.40 g, 5.69 mmol) in anhydrous THF (5 mL) was added a solution of 1,1'-carbonyldiimidazole (1.20 g, 7.40 mmol) in anhydrous THF (15 mL) slowly, the mixture was stirred at room temperature for 1 hour and then cooled to 0° C. (ice-bath) and thereafter tert-butyl hydroperoxide (0.821 g, 9.11 mmol) was added and stirred under nitrogen for 6 hours at room temperature. Upon completion, diethyl ether (50 mL) was added to the reaction mixture which was stirred for 30 more minutes. The reaction mixture was then washed with 10% NaOH (25 mL) and water (50 mL), dried over Na$_2$SO$_4$, filtered and concentrated under reduced pressure to afford a crude oil that was purified by silica-gel column and eluted with 5% ethyl acetate in hexanes to afford (H) as clear oil in 75% yield. $^1$H NMR (500 MHz, CDCl$_3$): 1.05 (s, 6H), 1.12 (s, 9H), 1.15-1.34 (m, 4H), 1.30 (s, 9H), 1.54-1.67 (s, 4H), 2.24-2.30 (t, 2H).

55 Milligrams (0.18 mmol) of compound (H) were dissolved in 9.95 grams (32.9 mmol) of TEGDA in a round-bottom flask and degassed under vacuum (ca. 1 mm Hg) for 15 minutes. The vacuum was broken with nitrogen gas and the flask transferred into a glove box set up for photocuring at 60° C. and 0-0.2% oxygen gas. About 100 microliters of this reactive mixture were added to each FC in a pallet. Each pallet held eight FC. A quartz plate was placed on top of the pallets to hold the FC in place. The reactive mixtures were irradiated using an UVA lamp (P339 bulbs with peak output at 312 nm and an intensity of 3.7 mW/cm$^2$ at the pallet location) for 2 hours located three inches above the quartz plate. The lens-like plugs were placed in 100 mL of DMF in a jar, and the jar placed on a roller and rolled over the weekend. Lenses were stored in DMF.

10 Lens-like plugs were removed from the DMF suspension and transferred into a 250 mL 3-necked round bottom flask containing 20 mL of DMA and 80 mL of DMF and equipped with a condenser, magnetic stirring bar, a septum, nitrogen gas inlet, and nitrogen gas outlet on top of the condenser. The lens-like plugs were stirred for 2 hours during the last hour with nitrogen gas purging. The lens-like plug suspension was heated to 130° C. for 5 hours and allowed to cool down to room temperature.

The grafted lens-like plugs were transferred into a jar containing 500 mL of acetone to extract unreacted monomer and solvent. After about 24 hours, the acetone was replaced with fresh acetone. The grafted lens-like plugs were stored in acetone.

Un-modified lens-like plugs were taken through the same solvent treatments without thermally induced free radical polymerization. Both these un-modified and grafted lens-like plugs were vacuum dried at 60° C. overnight in a vacuum oven (<1 mm Hg). 5 Un-modified lens-like plugs were weighed on an analytical balance and their weights summed to 0.1095 grams. 5 Grafted lens-like plugs were weighed on an analytical balance and their weights summed to 0.1138 grams, representing a 3.9 weight percent increase in mass over the un-modified lens-like plugs. The above experiment was repeated except that grafting reaction at 130° C. lasted for 17 hours instead of 5 hours. In that case, a 6.6 weight percent increase in mass was observed for the grafted lenses over the un-modified lens-like plugs.

We claim:

1. A polymer composition formed by a process comprising:
   (a) providing a first reactive composition containing: (i) a bisacylphosphine oxide polymerization initiator; (ii) one or more ethylenically unsaturated compounds; and (iii) a crosslinker;
   (b) subjecting the first reactive composition to a first activation step such that the first reactive composition polymerizes therein to form a crosslinked substrate network containing a covalently bound activatable monacylphosphine oxide free radical initiator, wherein the first activation step is conducted by irradiating the bisacylphosphine oxide with light consisting essentially of wavelengths of at least 420 nm;
   (c) combining the crosslinked substrate network with a second reactive composition containing one or more ethylenically unsaturated compounds; and
   (d) activating the covalently bound monacylphosphine oxide of the crosslinked substrate network such that the second reactive composition polymerizes therein with the crosslinked substrate network to form a grafted polymeric network and a byproduct polymer.

2. The polymer composition of claim 1 wherein step (d) is conducted in the presence of a crosslinker such that the byproduct polymer is covalently bound with the grafted polymeric network.

3. The polymer composition of claim 1 wherein step (d) is conducted in the substantial absence of a crosslinker such that at least a portion of the byproduct polymer is not covalently bound to the grafted polymeric network.

4. The polymer composition of claim 1 wherein the one or more ethylenically unsaturated compounds of step (a) comprise one or more reactive groups independently selected from: (meth)acrylate, (meth)acrylamide, styryl, vinyl, N-vinyl lactam, N-vinylamide, O-vinylether, O-vinylcarbonate, O-vinylcarbamate, C$_{2-12}$ alkenyl, C$_{2-12}$ alkenylphenyl, C$_{2-12}$ alkenylnaphthyl, and C$_{2-6}$ alkenylphenyl-C$_{1-6}$ alkyl.

5. The polymer composition of claim 1 wherein the one or more ethylenically unsaturated compounds of step (c) comprise one or more reactive groups independently selected from: (meth)acrylate, (meth)acrylamide, styryl, vinyl, N-vinyl lactam, N-vinylamide, O-vinylether, O-vinylcarbonate, O-vinylcarbamate, C$_{2-12}$ alkenyl, C$_{2-12}$ alkenylphenyl, C$_{2-12}$ alkenylnaphthyl, and C$_{2-6}$ alkenylphenyl-C$_{1-6}$ alkyl.

6. The polymer composition of claim 1 that is in the form of a hydrogel and wherein the first reactive composition contains silicone reactive components and the second reactive composition contains hydrophilic reactive components.

7. The polymer composition of claim 1 that is in the form of a hydrogel and wherein the first reactive composition contains hydrophilic reactive components and the second reactive composition contains silicone reactive components.

8. The polymer composition of claim 1 wherein the first reactive composition further comprises one or more of a polyamide, a UV-VIS absorber, a dye, a tint, a pigment, an antimicrobial, a pharmaceutical, and a nutraceutical.

9. The polymer composition of claim 1 wherein the second reactive composition further comprises one or more of a polyamide, a UV-VIS absorber, a dye, a tint, a pigment, an antimicrobial, a pharmaceutical, and a nutraceutical.

10. A medical device comprising the polymer composition of claim 1.

11. An ophthalmic device comprising the polymer composition of claim 1.

12. The ophthalmic device of claim 11 selected from the group consisting of a contact lens, an intraocular lens, a punctal plug and an ocular insert.

13. A contact lens comprising a polymer composition, wherein the polymer composition is formed by the process of claim 1.

14. The contact lens of claim 13 wherein the first reactive composition, the second reactive composition, or both the first reactive composition and the second reactive composition contain one or more additives selected from UV absorbers, photochromic compounds, pharmaceutical compounds, nutraceutical compounds, antimicrobial compounds, reactive tints, pigments, copolymerizable dyes, non-polymerizable dyes, release agents, wetting agents, and release agents.

* * * * *